United States Patent
Inti et al.

(10) Patent No.: US 12,533,075 B1
(45) Date of Patent: Jan. 27, 2026

(54) CONTACTLESS AND REAL-TIME SLEEP MONITORING

(71) Applicant: Amazon Technologies, Inc., Seattle, WA (US)

(72) Inventors: Durga Laxmi Narayana Swamy Inti, San Jose, CA (US); Saravanan Sathananda Manidas, Milpitas, CA (US); Vitor Baisi Hadad, Menlo Park, CA (US); Wesley Terrence Hong, Sunnyvale, CA (US); Kandarp Shah, San Jose, CA (US); Sai Prashanth Chinnapalli, Dublin, CA (US); Joel Norman Kristian Carlson, Toronto (CA)

(73) Assignee: Amazon Technologies, Inc., Seattle, WA (US)

(*) Notice: Subject to any disclaimer, the term of this patent is extended or adjusted under 35 U.S.C. 154(b) by 159 days.

(21) Appl. No.: 18/119,781

(22) Filed: Mar. 9, 2023

(51) Int. Cl.
*A61B 5/00* (2006.01)
*A61B 5/05* (2021.01)
*A61B 5/08* (2006.01)

(52) U.S. Cl.
CPC .............. *A61B 5/4812* (2013.01); *A61B 5/05* (2013.01); *A61B 5/0816* (2013.01); *A61B 5/7267* (2013.01); *A61B 5/4815* (2013.01)

(58) Field of Classification Search
CPC ....... A61B 5/4812; A61B 5/05; A61B 5/0816; A61B 5/7267; A61B 5/4815
See application file for complete search history.

(56) References Cited

U.S. PATENT DOCUMENTS

| | | | |
|---|---|---|---|
| 2011/0046498 A1* | 2/2011 | Klap | A61B 5/0205 600/534 |
| 2018/0064388 A1* | 3/2018 | Heneghan | A61B 5/743 |
| 2018/0078197 A1* | 3/2018 | Ware | G16H 40/63 |
| 2020/0178887 A1* | 6/2020 | Correa Ramírez | A61B 5/4809 |
| 2020/0205726 A1* | 7/2020 | Lee | A61B 5/1126 |
| 2021/0377657 A1* | 12/2021 | Cnaan | A61B 5/4815 |
| 2022/0047209 A1* | 2/2022 | Shin | G06V 10/778 |
| 2022/0273269 A1* | 9/2022 | Capodilupo | A61B 5/0004 |

* cited by examiner

*Primary Examiner* — Kaitlyn E Sebastian
(74) *Attorney, Agent, or Firm* — Eversheds Sutherland (US) LLP

(57) ABSTRACT

Technologies of contactless and real-time sleep tracking are described. One method of a sleep-monitoring device includes receiving radar data from a radar unit, the radar data representing a user's breathing. The method determines, using the radar data, sleep-stage data, presence data, and user identification data associated with the user. The method determines, using the i) sleep-stage data, ii) the presence data, and iii) the user identification data, a first event corresponding to sleep associated with the user and a second event corresponding to the sleep associated with the user, the second event occurring after the first event. The method modifies, using the presence data, the user identification data, the first event, and the second event, the sleep-stage data to obtain modified sleep-stage data. The method generates, using the modified sleep-stage data, a hypnogram of the sleep associated with the user.

20 Claims, 30 Drawing Sheets

US 12,533,075 B1

CONTACTLESS AND REAL-TIME SLEEP MONITORING

BACKGROUND

Monitoring devices can be used to monitor a user's activity. Some monitoring devices monitor a user's breathing activity and patterns while the user sleeps. Respiratory activity tracking can be used to identify sleep patterns (e.g., generate sleep scores and hypnograms) and monitor issues relating to cardiovascular or respiratory diseases or conditions. The monitoring device is typically positioned next to the user's bed (e.g., on a nightstand adjacent to the bed) and uses radar to detect movement within a detection zone to identify a respiratory waveform of a user. Monitoring devices can use radar sensors to detect the range, velocity, and identity of objects in motion. Radar sensors were originally designed for military and flight applications but have more recently been manufactured as systems-on-a-chip in smaller form factors, making them adaptable for a wider range of commercial applications.

BRIEF DESCRIPTION OF DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
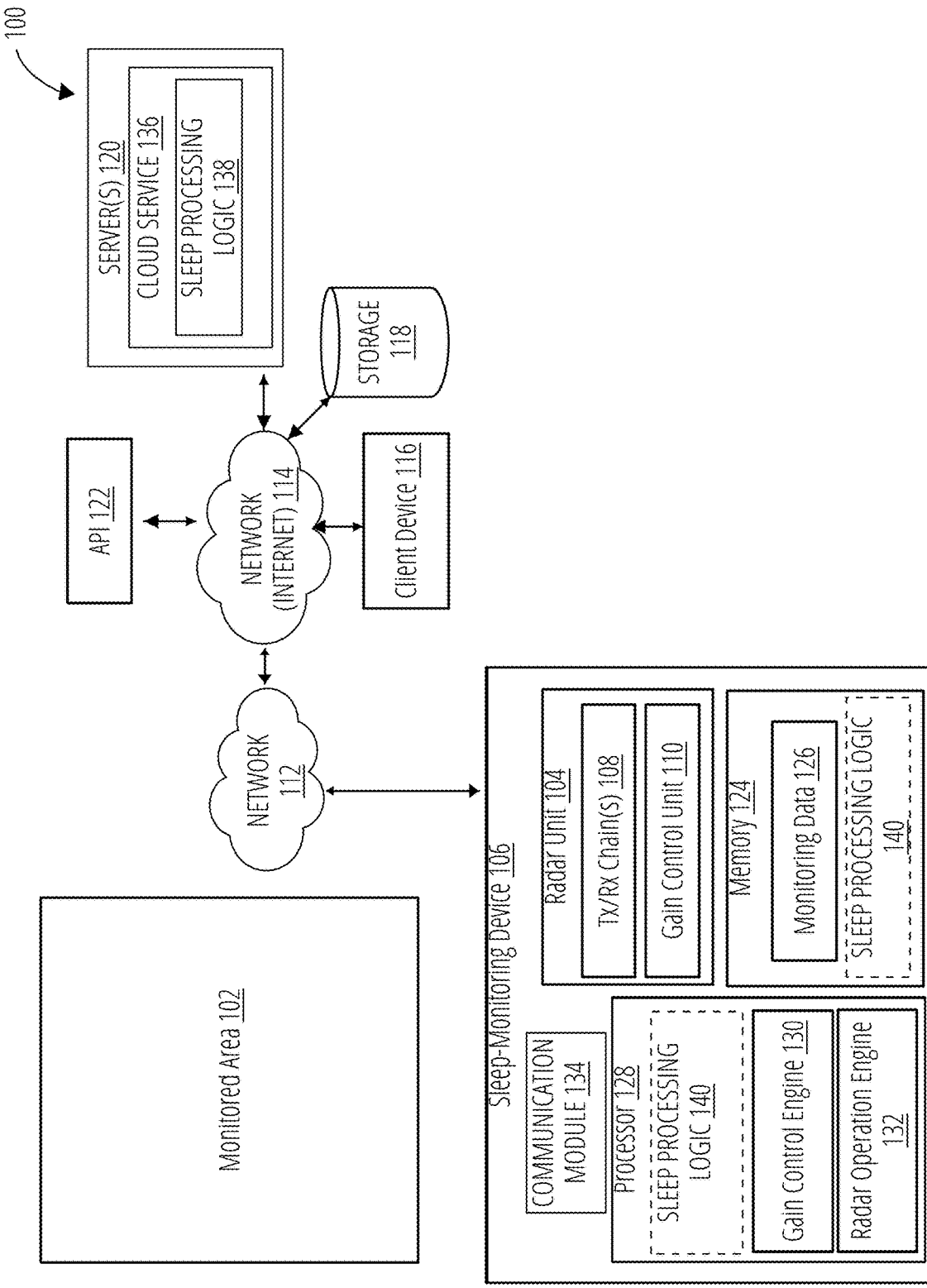
FIG. 1 depicts a sleep-monitoring system with a sleep-monitoring device for streaming radar data to a cloud service with sleep processing logic according to at least one embodiment.

Technologies of contactless and real-time sleep tracking are described. A contactless sleep-monitoring device can use 60 GHz radar technology to monitor a user's breathing. Breathing data can be input into a machine learning (ML) model to predict different sleep stages based on the breathing data. Specifically, the sleep-monitoring device selects a body voxel to generate the ideal sleeping respiration waveform for ML-based sleep-stage classification. However, in dual-user scenarios, disambiguating between the breathing of an intended user (IU) sleeping closer to the radar unit from an unintended user (UU) sleeping farther from the radar unit is critical. One challenge for the cloud-based sleep-monitoring algorithm is to disambiguate between IU and UU based on the strongest breathing voxel information without actually having centroid information of the persons present in the room. That is, a sleep score and a hypnogram should only be generated for the IU. Another challenge for the cloud-based sleep-monitoring algorithms is determining when the IU is actually trying to sleep and when the IU is done sleeping. The sleep score and hypnogram should not include data before the IU is actually trying to sleep and after the IU is done sleeping.

Aspects and embodiments of the present disclosure address the above and other deficiencies by providing a sleep-monitoring system with multiple algorithms or modules that process the same radar data. The outputs of the multiple algorithms can be input into a reconciliation algorithm or module that filters out data associated with the UU and only uses the data associated with the IU for final hypnogram and sleep score calculations. The sleep-monitoring system can be implemented as cloud-based algorithms that receive data from a sleep-monitoring device. The cloud-based algorithms can be implemented in parallel sleep-processing pipelines. The parallel sleep-processing pipelines can include a sleep-stage classification pipeline, a primary user identification (PUI) pipeline, a presence detection pipeline, and an intent-to-sleep classification pipeline. The outputs of the parallel sleep-processing pipelines can be input into the reconciliation module to filter the data. A trimming module can trim the data before the final sleep score and hypnogram are calculated. The pipelines can be time-synchronized, reconciled, and trimmed appropriately to generate the final hypnogram and corresponding sleep score.

Aspects and embodiments of the present disclosure address the above and other deficiencies by providing a sleep-monitoring system that disambiguates between IU and UU based on at least the strongest breathing voxel information reported by the sleep-monitoring device reconciles classification results and trims the data appropriately before generating the final hypnogram and sleep score. Aspects and embodiments of the present disclosure can provide contactless sleep monitoring of an intended user sleeping closer to the sleep-monitoring device up to 1.5 meters (m) and without calibration.

One method of a sleep-monitoring device includes receiving radar data from a radar unit, the radar data representing a user's breathing. The method determines, using the radar data, sleep-stage classifications associated with the user, presence classifications associated with the user, and user identifications (classifications) associated with the user. The method determines, using the i) sleep-stage classifications, ii) the presence classifications, and iii) the user identifications, a first event corresponding to sleep associated with the user and a second event corresponding to the sleep associated with the user, the second event occurring after the first event. The method modifies, using the sleep-stage classifications, the presence classifications, the user identifications, the first event, and the second event, the radar data to obtain modified radar data. The method generates, using the modified radar data, a hypnogram of the sleep associated with the user.

Radar, also referred to as radio detection and ranging, is a detection system that uses radio waves to determine a distance (range), an angle, and/or a velocity of one or more objects. A radar unit includes a transmitter that produces electromagnetic waves in the radio or microwave domain and one or more receivers to measure electromagnetic waves reflected off an object. A radar unit can also be referred to as a radar sensor or a radar device. Although sometimes referred to as a radar sensor, it should be noted that a radar sensor has both a transmitter and one or more receivers to transmit a radar signal (radio waves) and receive or measure the reflected signals (reflected waves) from the radar signal encountering an object. The radio waves (pulsed or continuous) from the transmitter and reflected off the object provide information about the object's location and speed. Aspects of the present disclosure can also be used with other sensing systems, such as an ultrasound unit. A sensing system can include at least one transmitter to transmit sound or electromagnetic waves and at least one receiver to measure reflected waves to determine a distance value between the sensing system and an object and an angle value between the sensing system and the object. Radar, as used herein, may be leveraged to measure human vital signs such as heart rate and respiratory rate such as to track sleep patterns to determine the quality of sleep metrics.

In at least one embodiment, an electronic device includes a radar unit that operates in a millimeter-wave (mmWave) frequency range. The electronic device may include a processing device coupled to the radar unit. The electronic device may further include a memory coupled to the processing device to store data generated by the radar unit. The memory may further store computer-executable instructions that, if executed, cause the electronic device to perform operations. The radar data may be associated with monitoring an environment of the monitoring device. For example, the monitored environment may include a sleeping environment, such as illustrated and described below.

Technologies of a primary user identification system with a streaming mode are described. A contactless sleep-monitoring device can use 60 GHz radar technology to monitor the breathing of a user. Breathing data can be input into a machine learning (ML) model to predict different sleep stages based on the breathing data. Specifically, the sleep-monitoring device selects a body voxel to generate the ideal sleeping respiration waveform for ML-based sleep stage classification. However, in dual-user scenarios, disambiguating between the breathing of an intended user (IU) sleeping closer to the radar unit from an unintended user (UU) sleeping farther from the radar unit is critical. The sleep score of only the IU should be determined by a sleep-processing pipeline. The sleep-processing pipeline can include a cloud-based primary user identification (PUI) algorithm. The output of the cloud-based PUI algorithm can be an input to a reconciliation module that filters out data associated with the UU and only uses the data associated with the IU for final hypnogram computations.

The biggest challenge for the cloud-based PUI algorithm is to disambiguate between IU and UU based on the strongest breathing voxel information without actually having centroid information of the persons present in the room. In addition, the cloud-based PUI algorithm needs to operate within the constraints of a streaming mode and latency requirements.

Aspects and embodiments of the present disclosure address the above and other deficiencies by providing a PUI system with a streaming mode that disambiguates between IU and UU based on at least the strongest breathing voxel information, [insert other inputs] reported by the sleep-monitoring device. Aspects and embodiments of the present disclosure can provide contactless sleep monitoring of an intended user sleeping closer to the sleep-monitoring device up to 1.5 meters (m) and without calibration.

FIG. 1 depicts a sleep-monitoring system 100 with a sleep-monitoring device 106 for streaming radar data to a cloud service 136 with sleep processing logic 138 according to at least one embodiment. The sleep-monitoring device 106 may include a communication module 134 (e.g., a Wi-Fi communication chip), a processor 128, a radar unit 104, and a memory 124. The sleep-monitoring device 106 may be configured to monitor a monitored area 102 (e.g., a sleeping environment such as an environment including a bed). The processor 128 may include, and may also be referred to as, a controller or a microcontroller. The processor 128 may include multiple processors in some embodiments. The processor 128 can implement the sleep processing logic 140. In at least one embodiment, the sleep processing logic 138 can receive radar data, including the breathing data, from the radar unit 104, and send the radar data to the cloud service 136 to be processed by the sleep processing logic 138. The sleep processing logic 138 can receive radar data, including the breathing data, from the radar unit 104, and process the first radar data to determine a first event that represents a start event indicative of an intent to sleep. The first event can be used to start a sleep session and automatically start streaming the radar data to the cloud service 136. The sleep processing logic 138 can process later radar data to determine a second event representing a stop event indicative of an end to the intent to sleep. The second event can be used to stop the sleep session and automatically stop streaming the radar data to the cloud service 136. Additional details of sleep processing logic 140 and sleep processing logic 138 are described herein.

The sleep-monitoring device 106 may include a radar unit 104 that includes one or more transmission (Tx) chains and receiving (Rx) chains 108 to transmit and/or receive signals corresponding to respiratory-related motion occurring within a monitored area 102. The Tx/Rx chains 108 may include one or more millimeter-wave (mmWave) radar sensors to acquire radar data, such as detecting a breathing waveform (also referred to as a respiration waveform) of a user located within the monitored area 102. The radar unit 104 may further include a gain control unit 110. In an embodiment, the gain control unit 110 may include a fixed number of gain states. A gain state may include a representation of a gain value or, more generally, the gain of a transmitted radar signal. The gain of a radar antenna is a measure of the concentrated energy in the beam relative to the energy which would impinge upon a target if the same transmitted energy were emitted by an isotropic antenna. Each gain state adjusts a signal power associated with transmitting and/or receiving a radar signal. The gain state may be selected and updated according to a signal strength of the radar unit (e.g., dependent on the internal operating temperature).

According to an embodiment, the radar unit 104 includes one or more sensors (e.g., inertial measurement unit (IMU) sensors, magnetometer sensors, radar sensors, motion detectors, etc.) to collect and process data corresponding to monitored area 102, such as to monitor the respiratory activity of a user. For example, the radar unit 104 may be configured to detect the motion of a user. Motion data may be leveraged to initiate one or more procedures associated with gain control engine 130, and/or radar operation engine 132.

As shown in FIG. 1, the sleep-monitoring device 106 includes a processor 128 or other computing units. The processor 128 can execute the instructions stored in memory 124 to perform the operations described herein. The instructions can be computer-executable instructions that, if executed, cause the processor 128 (or sleep-monitoring device 106) to perform operations as described herein. As shown in FIG. 1, the processor 128 includes a gain control engine 130, and a radar operation engine 132. The various engines may be leveraged and coordinated by the processor 128 to carry out the methodology described herein. Though the processor 128 is described as having multiple processing engines, the division of functionality of the processor between each of the processing engines is purely exemplary.

The gain control engine 130 directs the radar unit 104 to perform gain control calibration. Gain control calibration may include sweeping the gain control unit 110 through various gain states and mapping a resulting signal power level associated with using each gain state. A gain state may be determined based on determining signal power levels corresponding to each gain state. In an embodiment, the gain state is determined by turning on the internal transmitter embedded in the Rx chain (separate from the Tx chain, not connected to any antenna) and measuring the power using the Rx chain. The feedback power is then converted to Effective Isotropic Radiated Power (EIRP) (e.g., based on calibration for each radar chip during production).

The radar operation engine 132 configured the radar unit 104 to transmit and acquire radar data. For example, the radar operation engine 132 may leverage Tx/Rx chains to acquire radar data, such as detecting a breathing waveform of a user located within the monitored area 102.

In an embodiment, the breathing waveform can be detected according to a suitable waveform extraction algorithm (e.g., a Doppler radar for noncontact vitals monitoring methodology). For example, the waveform extraction algorithm can include multistage processing of radar outputs raw In-phase and Quadrature (I/Q) data of received echo signals. In an embodiment, the one or more radar sensors are used to "bin" the receive signals such that the receive signals are stored in a set of bins by the time of arrival relative to a transmit pulse. In an embodiment, the radar operation engine 132 checks the receive signal strength in the respective bins to enable the sorting of the returns across the different bins, which correspond to different ranges.

In an embodiment, a fast Fourier Transform (FFT) is implemented over these samples (a fast-time domain) to identify a channel response for each distance bin. In this example, another FFT is implemented over the frames within the respiration window (slow-time domain) for a set of candidate bins to determine which bin contains the respiration signal. In an embodiment, the bin corresponding to the desired respiration signal is selected based on a metric for periodicity and phase of that bin along the time domain to identify a selected or target waveform to be extracted.

In an embodiment, the one or more sensors of the radar unit measure a displacement of a user's chest to identify a respiratory rate associated with the user. In an embodiment, radar operation engine 132 uses three-dimensional imaging to generate a set of energy voxels corresponding to chest displacement movements and periodicity corresponding to a breathing pattern of the user. In an embodiment, the set of energy voxels is processed by the respiratory activity tracker to generate the respiration or breathing waveform corresponding to the user during a given sleep session.

In an embodiment, the processor 128 can generate a breathing waveform representing a respiratory rate or number of breaths a user takes per minute, referred to as respirations per minute (RPM) values. In an embodiment, the respiratory rate data and associated waveform can be further processed to generate one or more analytics indicative of a quality of sleep of the primary user. For example, the breathing waveform can be analyzed to generate a sleep score (e.g., an indication or score indicative of a quality of sleep). In an embodiment, a sleep score can be determined in accordance with a suitable sleep score generation methodology as a function of one or more factors, including an overall sleep time, a duration of the rapid eye movement (REM) sleep stage, a duration of a light sleep stage, a duration of a deep sleep stage, etc. In an embodiment, the sleep stages (also referred to herein as sleep-stage classifications) can be estimated using a machine learning (ML) model (e.g., a deep neural network) that takes the breathing waveform as the input. In an embodiment, the user classifications (user identification data) and presence classifications (presence data) can be determined using a primary user identification (PUI) algorithm, as described herein. The user classification is a classification of a user being identified as the IU or the UU. The presence classification is a classification of any user being detected in the environment being monitored. In another embodiment, the sleep processing logic 138 can determine intent-to-sleep classifications to determine when a user is attempting to fall asleep, as described in more detail herein. The sleep-stage data, the presence data, the user identification data, and intent-to-sleep data can be used to modify the radar data to obtain modified radar data for determining a sleep score and generating a final hypnogram, as described herein. The sleep-stage data can be a time-series data structure where each entry includes a timestamp and a probability score of each class of multiple sleep classes, including an awake class, a light-sleep class, a deep-sleep class, or a rapid eye movement (REM) class. The presence data can be a time-series data structure where each entry includes a timestamp an indication of a presence or absence of a user. The user identification data can be a time-series data structure where each entry includes a timestamp and an indication of an intended user (IU) or an unintended user (UU). The intent-to-sleep data can be a time-series data structure where each entry includes a timestamp and a probability score of a user's activity representing an intent to sleep, as compared to other activities in the environment (e.g., actively watching TV, talking to their partner, reading a book). The probability score can represent a likelihood that the activity represents the user falling asleep. As described herein, the sleep-monitoring device 106 can stream the radar data to the server(s) 120 for primary user identification (PUI) processing, estimating sleep stages, presence detection, intent-to-sleep classifications, sleep scores, and hypnograms. In at least one embodiment, sleep processing logic 138 determines, using the radar data, sleep-stage classifications associated with the user, presence classifications associated with the user, and user classifications associated with the user. The sleep processing logic 138 determines, using the i) sleep-stage classifications, ii) the presence classifications, and iii) the user classifications, a first event corresponding to sleep associated with the user. The first event can represent a start event indicative of an intent to sleep. The sleep processing logic 138 can determine, using the i) sleep-stage classifications, ii) the presence classifications, and iii) the user classifications, a second event corresponding to the sleep associated with the user, the second event occurring after the first event. The second event can represent a stop event indicative of an end of the intent to sleep. The sleep processing logic 138 can modify, using the sleep-stage classifications, the presence classifications, the user classifications, the first event, and the second event, the radar data to obtain modified radar data. The sleep processing logic 138 can generate, using the modified radar data, a hypnogram of the sleep associated with the user. The sleep processing logic 138 can also calculate a sleep score associated with the user's sleep. In some cases, the sleep processing logic 138 can process the radar data for detecting an event of a user entering a first region (entering a bed) or exiting the first region (exiting a bed).

The memory 124 may be transitory and/or non-transitory and may represent one or both of volatile memory (e.g., static random access memory (SRAM), dynamic random access memory (DRAM), computational random-access memory (RAM), other volatile memory, or any combination thereof) and non-volatile memory (e.g., FLASH, read-only memory (ROM), magnetic media, optical media, other non-volatile memory, or any combination thereof). Part or all of the memory 124 may be integrated with the processor 128. The memory 124 can store monitoring data 126 (e.g., radar data including, for example, motion data, respiration rate data, etc.) measured in the monitored area 102. The memory 124 can store instructions corresponding to a gain control engine 130, a radar operation engine 132, and the sleep processing logic 138.

In an embodiment, one or more radar sensors of the sleep-monitoring device 106 perform localization of reflected signal in the 3D geometry, which is further subdivided into voxels. A voxel is a discrete volume element of graphic information in a three-dimensional (3D) space. The voxel can be used in the radar domain to represent the smallest volume element governed by a combination of range and angular resolution (e.g., also referred to as a range bin, angular bin individually in a two-dimensional (2D) space). Each voxel carries information derived from a phase and amplitude of a reflected signal from corresponding geometric volume in the real world.

In an example mode of operation, the sleep-monitoring device 106 communicates with a wireless network 112 of a user. Although the wireless network 112 is referred to herein as "wireless," in some embodiments may not be wireless, such as where the sleep-monitoring device 106 is connected to the user's network via an Ethernet connection, for example. The wireless network 112 is connected to another network 114. The networks 112 and 114 may be the same network in some of the present embodiments. The networks 112 and 114 may include but are not limited to the Internet, a Wi-Fi® network compatible with the IEEE 1702.11 standard and/or other wireless communication standards(s) including but not limited to WAP (Wireless Application Protocol), GPRS (General Packet Radio Service), GSM (Global System for Mobile Communication), LTE, VOLTE, LoRaWAN, LPWAN, RPMA, LTE Cat-"X" (e.g., LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, Global Positioning System (GPS), CDPD (cellular digital packet data), Z-Wave, RIM (Research in Motion, Limited) duplex paging network, Bluetooth radio, an IEEE 1702.11-based radio frequency network, or a combination thereof.

As described below, the sleep-monitoring device 106 may communicate with a client device 116 of the user via the wireless network 112 and/or the network 114. The client device 116 may include, for example, a computer, a laptop, a tablet, a mobile telephone (may also be referred to as a cellular telephone), such as a smartphone, a personal digital assistant (PDA), or another communication device capable of receiving and/or transmitting data across one or both of the networks 112 and 114. The client device 116 may include a display and related components capable of displaying data associated with the sleep-monitoring device 106. The client device 116 may also include a speaker and related components capable of providing alerts to the user or another person responsible for the user and may also include a microphone. In some embodiments, one or more of the networks 114, one or more server(s) 120, one or more remote storage device(s) 118, Application Programming Interface (API) 122, and client device 116 are associated with a cloud service. For example, one or more functions of the sleep-monitoring device 106 may be performed by the cloud service using one or more of network 114, server(s) 120, remote storage device(s) 118, API 122, and client device 116.

The sleep-monitoring device 106 may also communicate with one or more remote storage device(s) 118, server(s) 120, and/or API 122 via the wireless network 112 and the network 114 (Internet/PSTN). While FIG. 1 illustrates the remote storage device(s) 118, server(s) 120, and API 122 as components separate from the network 114, it is to be understood that the remote storage device(s) 118, server(s) 120, and API 122 may be considered to be components of the network 114.

In response to the detection of certain conditions by the sleep-monitoring device 106, the sleep-monitoring device 106 sends an alert to the client device 116 via the wireless network 112 and/or the network 114. The sleep-monitoring device 106 may also send motion data and/or respiration data (e.g., breathing waveform) to the client device 116 of the user (e.g., via the network 114 and/or the server(s) 120).

The motion data (e.g., radar data), respiration rate data, and/or sleep quality data captured by the radar unit 104 may be uploaded and recorded on the remote storage device(s) 118. In some of the present embodiments, the motion data, respiration rate data, and/or sleep quality data may be recorded on the remote storage device(s) 118, even if the user (or administrator) chooses to ignore the alert sent to the user's client device 116. In such embodiments, the user (or administrator) may access the motion data (e.g., radar data), respiration rate data, and/or sleep quality at a later time by accessing the remote storage device(s) 118 using the user's client device 116.

The API 122 may include, for example, a server (e.g., a bare-metal server, a virtual machine, or a machine running in a backend infrastructure as a service) or multiple servers networked together, exposing at least one API to the client(s) accessing it. These servers may include components such as application servers (e.g., software servers), depending upon what other components are included, such as a caching layer, database layers, or other components. The API 122 may, for example, include many such applications, each of which communicates with one another using their public APIs. In some embodiments, the API 122 may hold the bulk of the user data and offer the user management capabilities, leaving the clients with a very limited state.

The API 122 is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself or even understand how the application works. An API may be for a web-based system, an operating system, or a database system, and it provides facilities to develop applications for that system using a given programming language. In addition to accessing databases or computer hardware like hard disk drives or video cards, an API can ease the work of programming graphical user interface (GUI) components. For example, an API can facilitate the integration of new features into existing applications (a so-called "plug-in API"). An API can also assist otherwise distinct applications with sharing data, which can help to integrate and enhance the functionalities of the applications. In at least one embodiment, the APIs can include routine APIs or a voice-assistant service API.

In various embodiments, the API 122 includes one or more services (also referred to as network services). A network service is an application that provides data storage, manipulation, presentation, communication, and/or other capabilities. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface and sometimes other associated hardware.

The cloud service 136 can be a sleep processing service hosted on a cloud computing system (not illustrated in FIG. 1). The sleep processing logic 138 can begin to send binary files to a storage service from a sleep-monitoring device. For example, the sleep-monitoring device can upload the binary files into a cloud object storage (e.g., S3 bucket). The cloud service 136 can access the binary files in the cloud object storage and pre-process the binary data, including converting the binary data to data frames. Alternatively, the data frames of the radar data that are processed by the sleep processing logic 138 can be sent in one or more files. A data frame can contain radar data corresponding to a given period. For example, a first period can include a set of data frames (e.g., 200). The cloud service 136 can be used to detect other conditions using the breathing data, range values, and confidence values, as well as other features of the data, such as out-of-bed indicator (OOBI) information, RPM values, or the like. For example, the cloud service 136 can perform sleep data reconciliation, reconciling sleep stage predictions with primary user identification (PUI) and presence output states. The cloud service 136 can input the sleep data into a sleep monitoring service for sleep score computation and hypnogram generation.

In at least one embodiment, the sleep processing logic 138 can save data frame input in one or more databases (e.g., DynamoDB). The cloud service 136 can perform frame-level processing for PUI state boundary and state transition predictions. The frame-level processing can be done with a processing chunk, including the radar data of the current data frame and some radar data of a previous data frame. For example, a 7-minute processing chunk can include a previous 2-minute chunk of radar data from a previous frame and a current 5-minute chunk of radar data. The cloud service 136 can generate intended user (IU) annotations or unintended user (UU) annotations for the 5-minute chunk of radar data (i.e., the current frame) based on the frame-level predictions. The cloud service 136 can generate timestamp annotations for the 5-minute chunk of radar data (i.e., the current frame). The cloud service 136 can save the PUI results, presence outputs, and the last two-minutes of radar data of the current data frame into the PUI datastore and continue processing a next data frame. The last-two minutes of radar data are used with the next data frame.

In a further embodiment, the various frame-level operations performed on each frame can include some post-processing functions to handle duplicate out-of-bed indicator (OOBIs) and any rewrites for IU→IU or IU→UU transitions. Once the session begins, IU is the default start state. However, the session could have been started by IU or UU. So, in order to handle the scenario of UU in bed before IU, the post-processing functions need to rewrite all the data marked as IU until the actual IU enters the bed. This leads to rewriting for older data to UU when IU followed by an IU scenario (IU→IU transition) is encountered.

As described above, in dual-user scenarios, disambiguating between the breathing of an intended user (IU) sleeping closer to the radar unit from an unintended user (UU) sleeping farther from the radar unit is critical. The sleep score of only the IU should be determined. As described above, the PUI processing logic can disambiguate between IU and UU from the radar data by processing the radar data at a frame level using a PUI algorithm. The goal of the PUI algorithm is to distinguish between UU's sleep data from UI's sleep data and correctly capture the IU's sleep data to minimize the missing detection rate of incorrectly discarding the IU's sleep data. The PUI algorithm can detect transitions in the radar data using different types of transition logic. In at least one embodiment, the PUI algorithm can use a hybrid approach to detecting transitions in the radar data.

PUI Post Processing

The cloud service 136 performs post-processing functions. The post-processing functionality can be implemented in a post-processing module or post-processing logic that is added on top of the PUI predictions to handle different user scenarios where changes need to be made to the predicted output stored in the PUI data store (e.g., DynamoDB). These functions also introduce the time and memory aspect needed for making corrections to PUI predictions at a session level. Following are the three major functionalities of the PUI post-processing module: handling duplicate OOBIs and IU rewrite.

Handling Duplicate OOBIs

Two minutes of the previous chunk data is added while processing the current chunk. So, there is a possibility that the same OOBI (present in these two minutes) is qualified twice. In some cases, the state change decisions made in these two instances are different, although they have the same absolute timestamp (OOBI). This happens because the samples used for post- and pre-averaging data will differ. The decision made in the second instance is more accurate as it has better data for post- and pre-averaging. In these cases, the entries in the PUI data store (e.g., DynamoDB) made by the first instance are deleted and updated as per the decisions made by the second instance.

IU→IU Rewrite

Once the session begins, IU is the default start state. However, the session could have been started by IU or UU. So, in order to handle the scenario of UU in bed before IU, the post-processing module needs to rewrite all the data marked as IU until the actual IU enters the bed. This leads to rewriting for older data to UU when IU followed by an IU scenario (IU→IU transition) is encountered.

Figure 2:
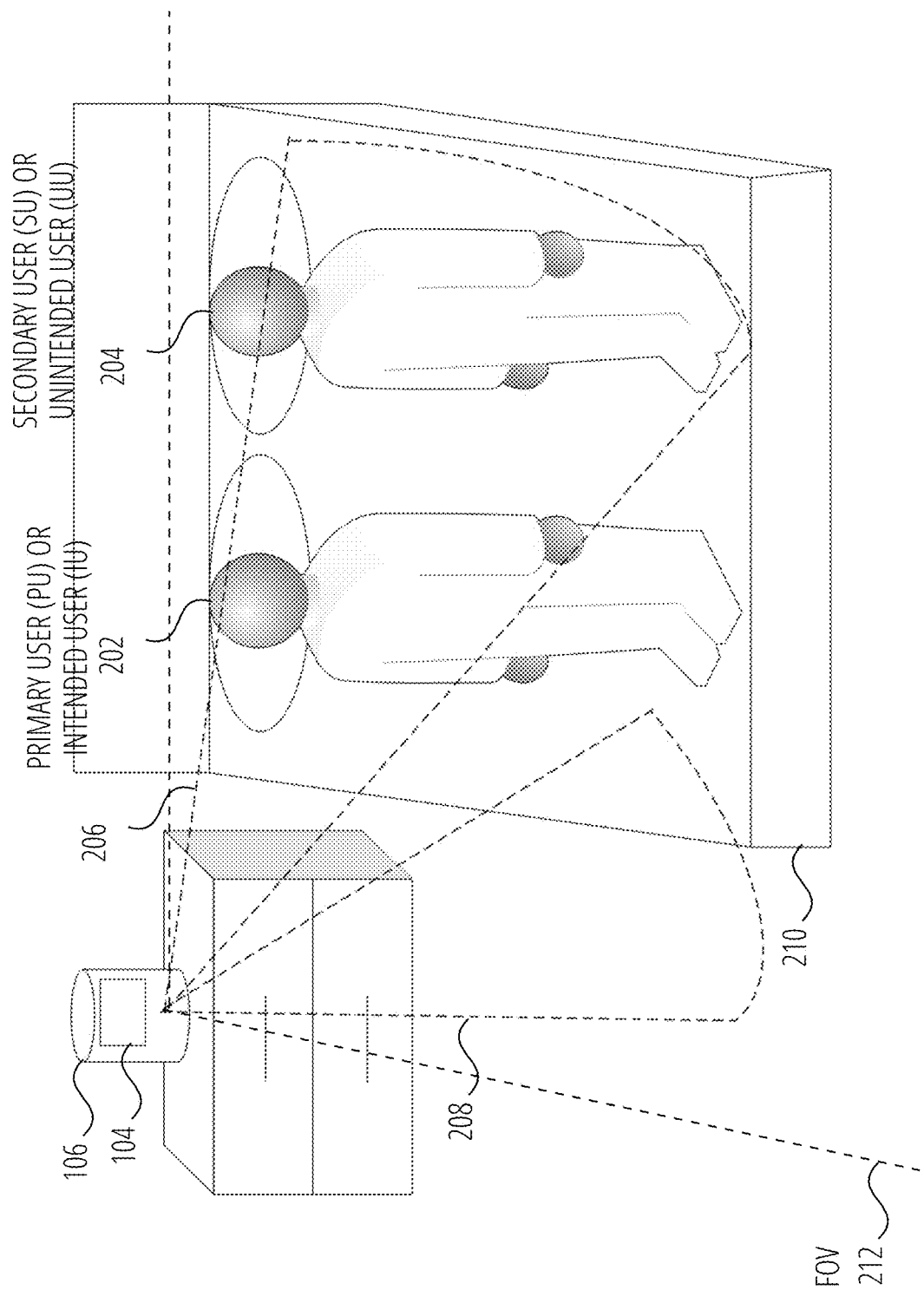
FIG. 2 illustrates a monitored area adjacent to the sleep-monitoring device of FIG. 1, according to at least one embodiment.

In at least one embodiment, the sleep-monitoring device 106 can monitor human activity within a field of view (FOV) 212 of the radar unit 104, as illustrated in FIG. 2.

FIG. 2 illustrates a monitored area 102 adjacent to the sleep-monitoring device 106 of FIG. 1, according to at least one embodiment. The sleep-monitoring device 106 can generate radar data, including any combination of the following: i) first data representing breathing associated with a user, ii) range values representing a physical distance between a body of the user and the radar unit 104, iii) respirations per minute (RPM) values of the breathing waveform, iv) confidence values associated with the RPM values; v) second data representing an amount of motion of the body in a first region 206, vi) third data representing an amount of motion of the body in a second region 208, and vii) a breathing score waveform (or set of breathing scores) associated with the breathing data. The breathing score waveform represents how closely the breathing data, reported by the radar unit 104, represents a human breathing waveform. The breathing score waveform can factor in RPM variances and confidence levels as inputs. In some instances, the breathing score is referred to herein as a least squares method (LSM) or LSM value.

The first region 206 can correspond to a bed 210, located in an environment around the sleep-monitoring device 106. The second region 208 can be adjacent to the bed 210. The sleep-monitoring device 106 can generate a digital boundary representing the first region 206 within the field of view of the radar unit 104. The sleep-monitoring device 106 can generate a digital boundary representing the second region 208 within the field of view of the radar unit 104.

In at least one embodiment, the sleep-monitoring device 106 can detect, using the radar unit 104, the presence and/or motion of one or more users, including an intended user (IU) 202 (also referred to as primary user (PU) and an unintended user (UU) 204 (also referred to as secondary user (SU), within the digital boundary corresponding to the first region 206. The sleep-monitoring device 106 can detect, using the radar unit, the presence and/or motion of the one or more users within the digital boundary corresponding to the second region 208. The radar unit 104 can report to the cloud service 136 radar data, including, for example, the presence and/or motion within the second region 208 as an out-of-bed (OOB) indicator (OOBI). The radar unit 104 can report to the cloud service 136 the presence and/or motion within the second region 208 as IN/OUT activity. In the example illustrated in FIG. 2, IU 202 and UU 204 lie on the bed 210 and are within the FOV 212 of the radar unit 104 within the first region 206. Digital data generated by the radar unit, or "radar data" in short, may be used by the sleep processing logic 138 to start and stop streaming of the radar data to the cloud service 136, as described in more detail below with respect to FIG. 15 to FIG. 30.

In at least one embodiment, the sleep-monitoring device 106 may be a smart-home IoT device, such as a voice-assistant device. The sleep-monitoring device 106 may connect to at least one access point device and/or a network (e.g., a wireless local area network (WLAN), a wide area network (WAN), or cellular). The sleep-monitoring device 106 may be located in a room (or other space) in a building in order to detect and identify users within the room (or other space). The sleep-monitoring device 106 can transmit wirelessly over multiple channels to one or more other devices (not illustrated in FIG. 1), such as an access point device. The access point device may be in the same or a different room than the sleep-monitoring device 106. In some embodiments, the sleep-monitoring device 106 can operate in frequency bands other than 2.4 GHz, such as other industrial, scientific, and medical (ISM) bands like 5 GHZ, cellular frequency bands (e.g., 4G, LTE, 5G), or the like. In at least one embodiment, the radar unit 104 can collect radar data and send the radar data to the sleep processing logic 140. The sleep processing logic 140 can process the radar data to detect a first event representing an intent to sleep by the user. The sleep processing logic 140 can send the radar data to the cloud service 136 responsive to the first event. The sleep processing logic 140 can process the radar data to detect a second event representing an end to the intent to the sleep by the user. The sleep processing logic 140 can cease sending additional radar data to the cloud service 136 responsive to the second event.

Figure 3:
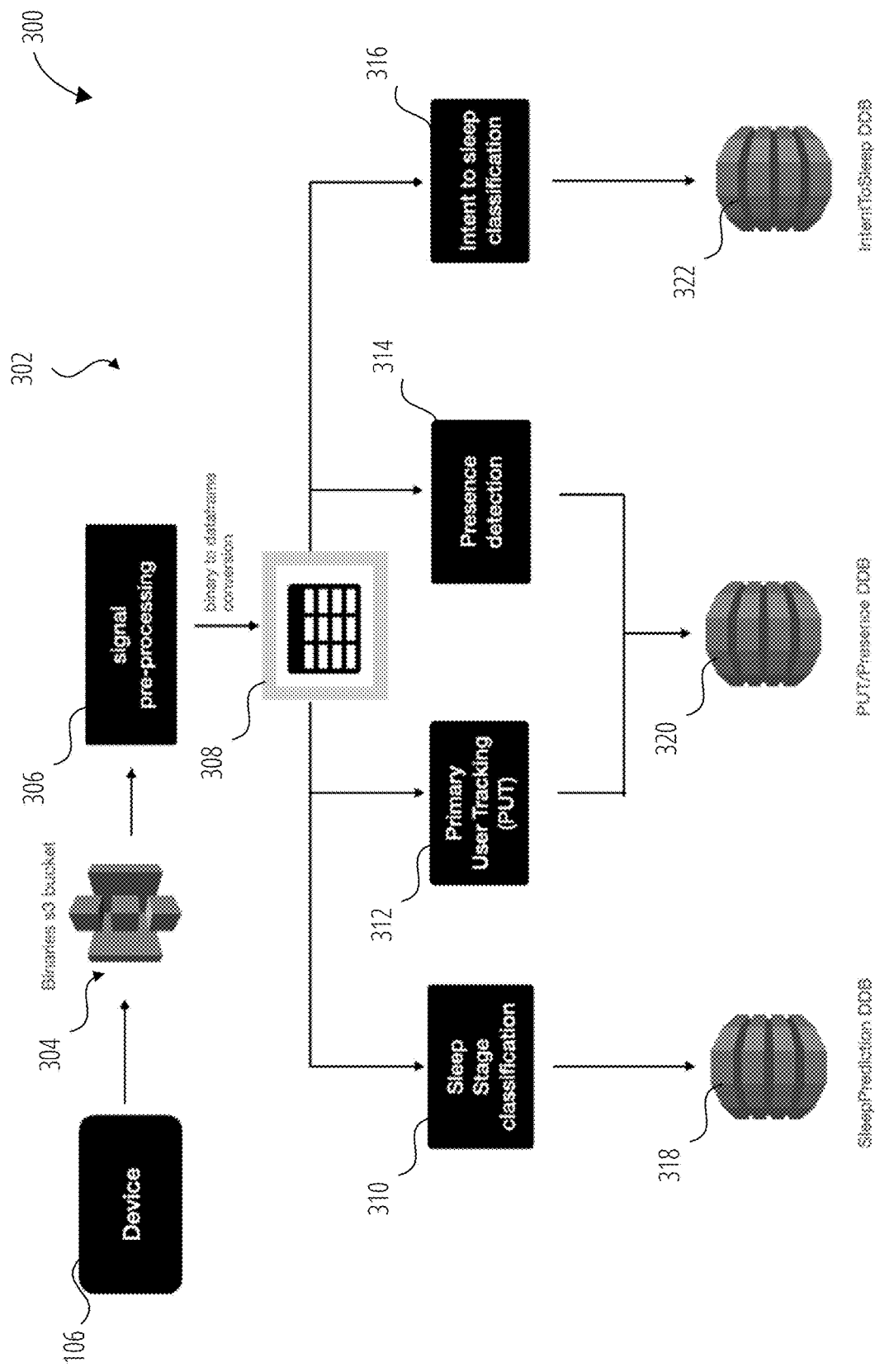
FIG. 3 is a block diagram of a sleep-monitoring system with a sleep-monitoring device and a sleep service with multiple processing pipelines according to at least one embodiment.

FIG. 3 is a block diagram of a sleep-monitoring system 300 with a sleep-monitoring device 106 and a sleep service 302 with multiple processing pipelines according to at least one embodiment. The sleep-monitoring system 300 can provide a framework or system architecture to provide a system that is completely contactless and without microphones or cameras. The sleep-monitoring system 300 can be set up without initial calibration from the user and does not need to initiate or pre-configure a sleep session. The sleep-monitoring system 300 can continuously monitor to detect a presence of a user, start a sleep session in order not to miss any sleep time, and stop the session in order not to upload data when the user is away. The sleep-monitoring system 300 can generate a real-time hypnogram (i.e., sleep stage prediction) of the sleep session to be shown to a user. The sleep-monitoring system 300 can be used as a Smart Alarm to wake up a user at the lightest sleep stage. The sleep-monitoring system 300 can use radar-detected breathing data for sleep tracking. However, this framework is extensible for other kinds of input data for contactless sleep tracking. For example, one could replace radar-detected with ultrasound-detected breathing waveforms or replace breathing waveforms with other periodic signals such as heart rate.

As illustrated in FIG. 3, the sleep-monitoring device 106 begins with uploading binary files to a storage service 304. For example, the sleep-monitoring device 106 can upload the binary files into a cloud object storage (e.g., S3 bucket). The sleep service 302 can access the binary files in the cloud object storage and pre-process the binary data using a signal pre-processing block 306. The 306 can process radar data from the sleep-monitoring device 106, scale and normalize breathing waveforms, and/or standardize the data structure signal emitted from different versions of the sleep-monitoring device 106. In at least one embodiment, a conversion block 308 can convert the binary data to data frames. A data frame can contain radar data corresponding to a given period. For example, a first data frame corresponds to a first period, and a second data frame corresponds to a second period after the first period. The subsequent processing blocks can process each frame in a time-synchronized manner.

In at least one embodiment, the sleep service 302 includes a sleep-stage classification block 310 that predicts a user's sleep stages (e.g., light, deep, or REM) and awakenings from respiration-driven movement signals. The sleep-stage classification block 310 can process each frame (or a set of frames) to determine a sleep stage and save the sleep-stage classification results into a first data store 318 (e.g., DynamoDB labeled "SleepPrediction DDB"). Additional details of the sleep-stage classification block 310 are described below with respect to FIG. 19 and FIG. 20.

In at least one embodiment, the sleep service 302 includes a PUI block 312 that distinguishes the sleep of a primary user (the user closest to the device) (also referred to as IU) from that of other people or pets in the same bed (also referred to UU), even though the respiration signal cannot be associated with individual users. The PUI block 312 can process each frame (or a set of frames) to determine a user classification and save the user classification results into a second data store 320 (e.g., DynamoDB labeled "PUT/Presence DDB"). Additional details of the PUI block 312 are described below with respect to FIG. 6 to FIG. 13.

In at least one embodiment, the sleep service 302 includes a presence detection block 314 that detects a presence of any user in the environment. In some cases, the sleep-monitoring device 106 includes a detection block to activate its sleep detection only when someone is in range of the sensor; otherwise, the sleep-monitoring device 106 remains in a monitoring mode, and no data is transmitted to the sleep service 302. The presence detection block 314 can process each frame (or a set of frames) to determine a presence classification and save the presence classification results into the second data store 320 (e.g., DynamoDB labeled "PUT/Presence DDB"). Additional details of the presence detection block 314 are described below with respect to FIG. 6 to FIG. 13. Additional details of the presence detection block 314 are described below with respect to FIG. 14 to FIG. 15.

In at least one embodiment, the sleep service 302 includes an intent-to-sleep classification block 316 that detects a first event when the user first starts trying to sleep and distinguishes that attempt from other in-bed activities, such as reading or watching TV. The first event can be used to accurately measure the time it takes to fall asleep, which is an important indicator of sleep health. The intent-to-sleep classification block 316 can process each frame (or a set of frames) to determine an intent-to-sleep classification and save the intent-to-sleep classification block 316 results into a third data store 322 (e.g., DynamoDB labeled "IntentTo-Sleep DDB"). Additional details of the PUI block 312 are described below with respect to FIG. 6 to FIG. 13. Additional details of the intent-to-sleep classification block 316 are described below with respect to FIG. 25 to FIG. 27.

Figure 4:
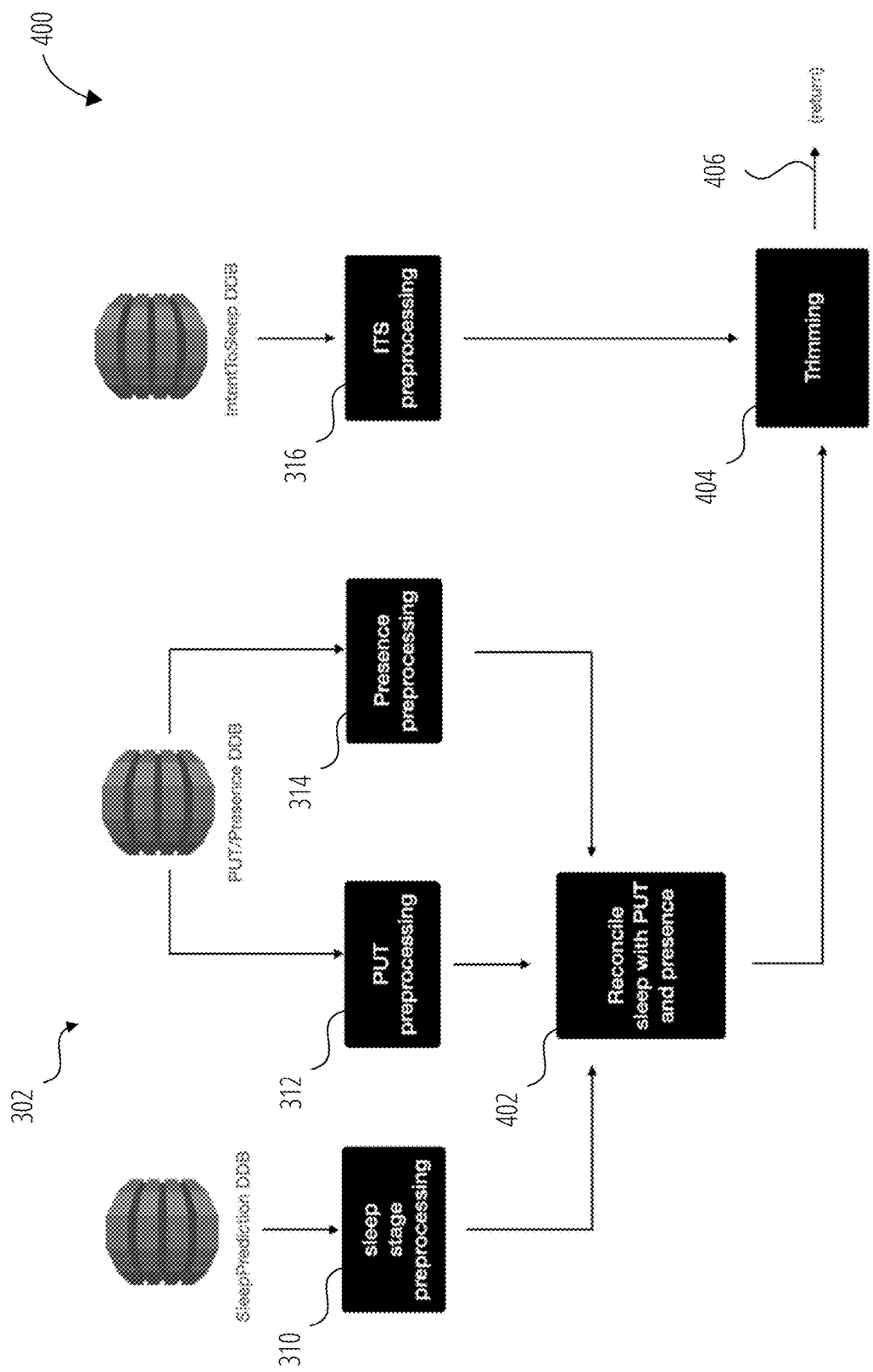
FIG. 4 is a block diagram of a sleep-monitoring system with a reconciliation block and a trimming block according to at least one embodiment.

In at least one embodiment, the data in the three data stores can be used by sleep service 302 to generate a hypnogram and a sleep score of a sleep session associated with a user. As shown in FIG. 4, the outputs of the above four processing blocks (also referred to herein as modules) can be time-synchronized, reconciled, and trimmed appropriately to generate a final hypnogram.

FIG. 4 is a block diagram of a sleep-monitoring system 400 with a reconciliation block 402 and a trimming block 404 according to at least one embodiment. The sleep-monitoring system 400 includes the sleep service 302 of the sleep-monitoring system 300, as described above. Outputs of the sleep-stage classification block 310, PUI block 312, presence detection block 314, and intent-to-sleep classification block 316 can be used by the reconciliation block 402 and the trimming block 404 to obtain modified radar data 406 associated with a sleep session of a user. The modified radar data 406 can be used to generate a final hypnogram and/or a sleep score. In particular, the outputs of the sleep-stage classification block 310, PUI block 312, and presence detection block 314 can be input into the reconciliation block 402 to reconcile sleep-stage classifications using the user classifications and the presence classifications. The outputs of the intent-to-sleep classification block 316 can be input into the trimming block 404 to trim the sleep-stage classifications using the intent-to-sleep classifications to obtain the modified radar data 406. The modified radar data 406 is then used by the sleep service 302 to generate the final hypnogram and/or sleep score. Additional details of the reconciliation block 402 and trimming block 404 are described below with respect to FIG. 21 to FIG. 28.

Figure 5:
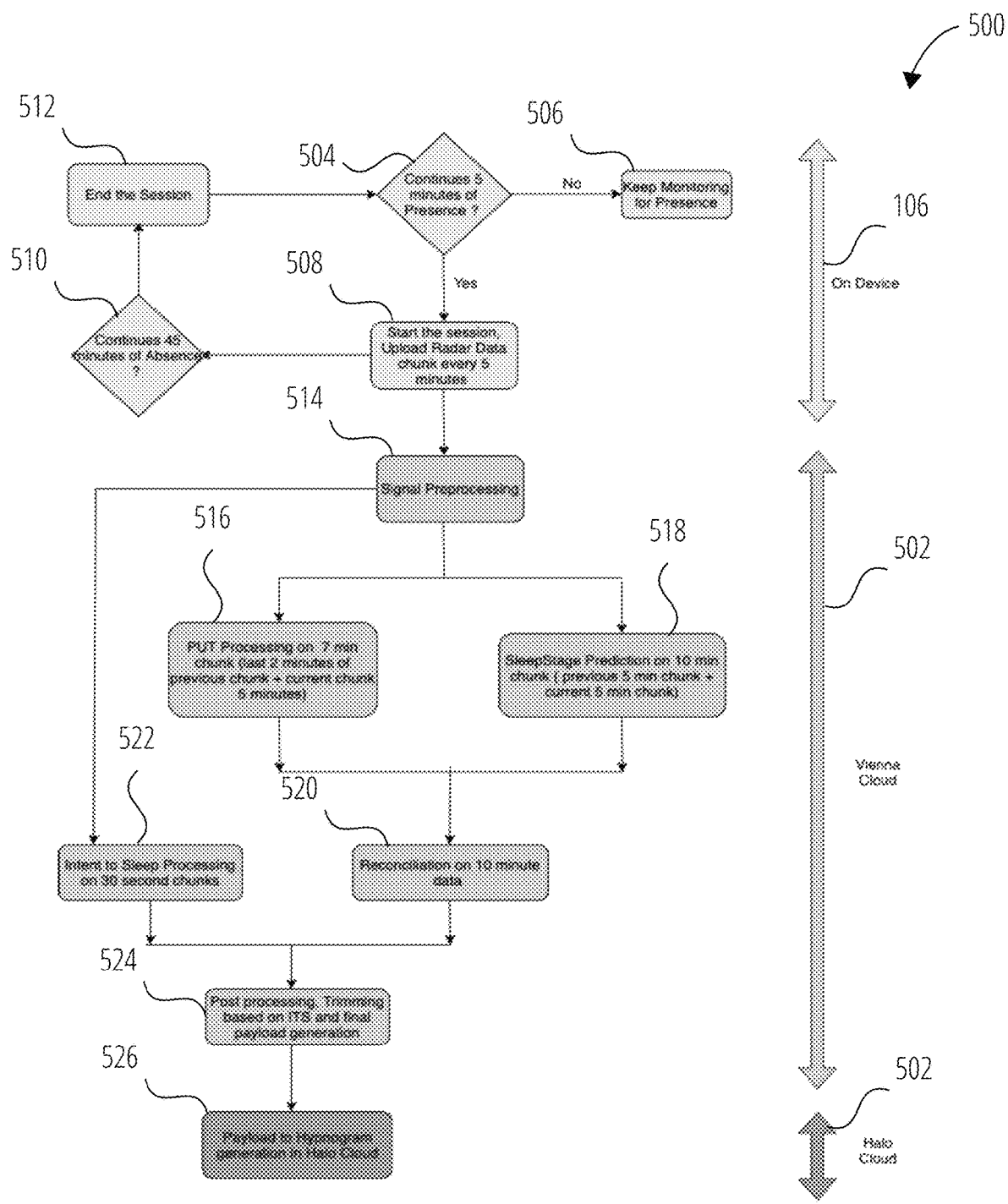
FIG. 5 is a flow diagram of a high-level data flow of sleep processing logic of a cloud computing system according to at least one embodiment.

FIG. 5 is a flow diagram of a high-level data flow of sleep processing logic 500 of a cloud computing system according to at least one embodiment. The sleep processing logic 500 may include hardware (e.g., circuitry, dedicated logic, programmable logic, microcode, processing device, etc.), software (such as instructions run on a processing device, a general-purpose computer system, or a dedicated machine), firmware, microcode, or a combination thereof. The high-level data flow can be performed in part by sleep-processing logic on a sleep-monitoring device 106 and sleep-processing logic on a cloud computing system 502. The cloud computing system 502 can be implemented, for example, by one or more server(s) hosting one or more sleep services (e.g., sleep service 302) in connection with the sleep-monitoring device 106 with the radar unit 104.

The sleep processing logic 500 can begin with determining whether a presence of a user is detected for a first amount of time (block 504). If the presence of a user is not detected for the first amount of time, the sleep processing logic 500 keeps monitoring for presence at block 506. If the presence of the user is detected for the first amount of time at block 504, the sleep processing logic 500 starts a sleep session and uploads radar data at regular intervals 508 (e.g., the processing interval can be 5-minute intervals). The sleep processing logic 500 can also determine whether a user is absent 510 (i.e., no user is present) for a second amount of time (block 504). If the absence of the user is detected for the second amount of time, the sleep processing logic 500 ends the session (block 512) and returns to block 504. The sleep processing logic 500 can perform the operations of blocks 504 to 512 on the sleep-monitoring device 106.

The sleep processing logic 500 on the cloud computing system 502 can start signal pre-processing the radar data once radar data is uploaded or at a specified time (block 514). The sleep processing logic 500 at block 514 can process raw data from the sleep-monitoring device 106, scale and normalize breathing waveforms, standardize the data structure signal, convert the raw data to frames, or the like. The sleep processing logic 500 can perform PUI processing by PUI processing logic (block 516) and sleep stage predictions by sleep-stage classification logic (block 518) in parallel. The PUI processing at block 516 can process the pre-processed data on a 7-minute chunk (e.g., the last 2 minutes of a previous chunk and a current 5-minute chunk). The PUI processing at block 516 can output user classifications. The PUI processing at block 516 can output presence classifications. The sleep stage prediction processing at block 518 can process the pre-processed data on a 10-minute chunk (e.g., 5 minutes from the previous chunk and a current 5-minute chunk). The sleep stage prediction processing at block 518 can output sleep-stage classifications. The sleep processing logic 500 can perform reconciliation processing of the sleep-stage classifications using the user classification and the presence classifications output from block 516. The reconciliation processing at block 520 can be performed on a 10-minute basis. The reconciliation processing at block 520 can output reconciled sleep-stage classifications. In parallel, the sleep processing logic 500 can perform intent-to-sleep processing on the pre-processed radar data (block 522). The intent-to-sleep processing can be performed on the 30-seconds chunks. The intent-to-sleep processing at block 522 can output intent-to-sleep classifications. The sleep processing logic 500 can perform some post-processing and trimming using the intent-to-sleep classifications and the reconciled sleep-stage classifications to generate modified radar data (block 524). The sleep processing logic 500 can generate a hypnogram using the modified radar data (block 526). In some cases, the operations at block 514 to block 524 are performed on a first service. The first service can send the modified radar data to a second service to generate the hypnogram. In other cases, the same service performs these operations.

Primary User Identification (PUI) Processing

Figure 6:
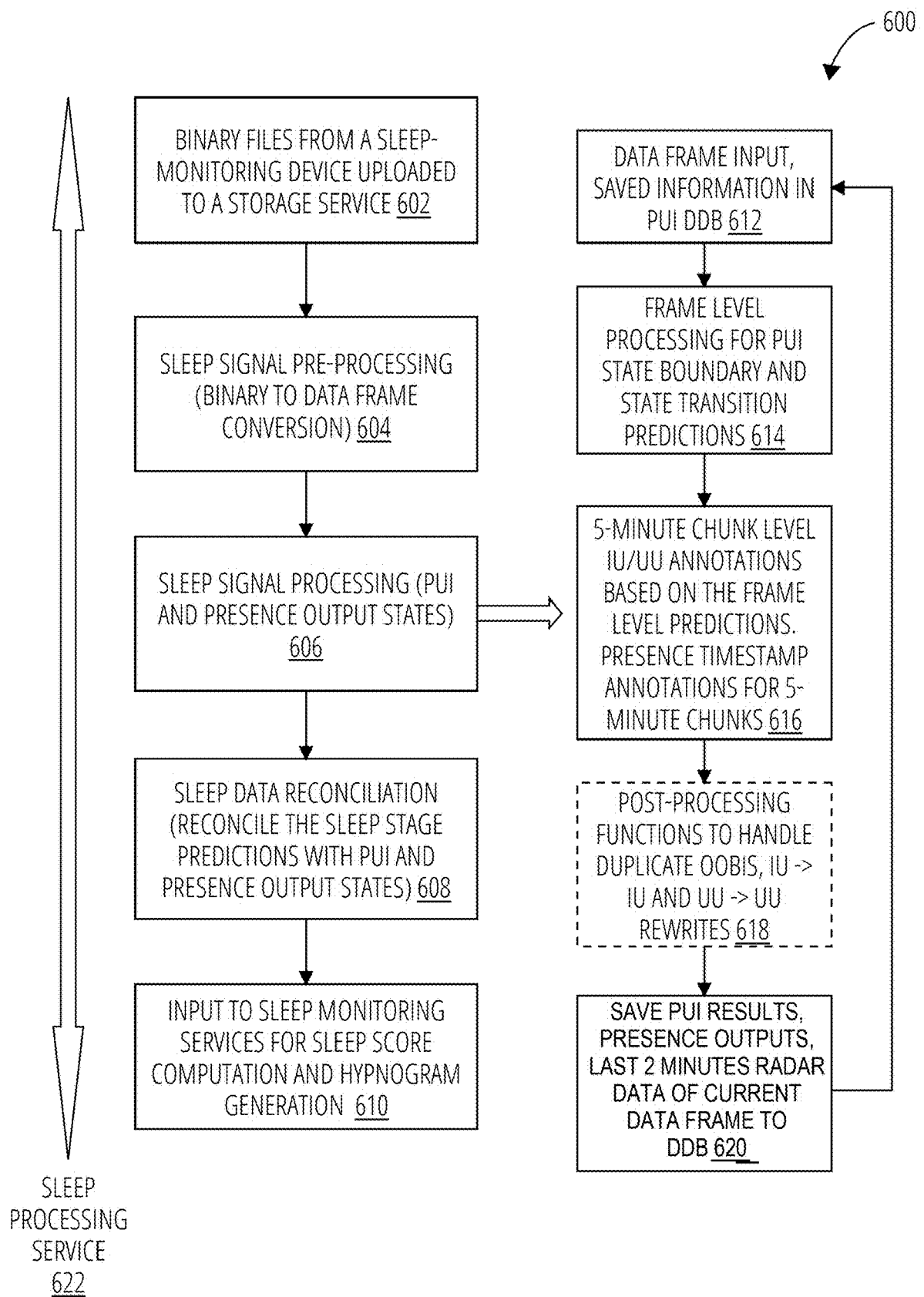
FIG. 6 is a flow diagram of a high-level data flow for primary user identification (PUI) processing logic on a cloud computing system in a streaming mode according to at least one embodiment.

FIG. 6 is a flow diagram of a high-level data flow for a PUI processing logic 600 on a cloud computing system in a streaming mode according to at least one embodiment. The PUI processing logic 600 can be implemented in a sleep processing service 622 hosted on a cloud computing system (not illustrated in FIG. 6). The PUI processing logic 600 contains the PUI algorithm and read and write operations required for streaming mode operation. The PUI processing logic 600 begins with binary files being uploaded to a storage service from a sleep-monitoring device (not illustrated in FIG. 6) (block 602). For example, the sleep-monitoring device can upload the binary files into a cloud object storage (e.g., S3 bucket). The PUI processing logic 600 can access the binary files in the cloud object storage and pre-process the binary data. In at least one embodiment, the PUI processing logic 600 can convert the binary data to data frames (block 604). A data frame can contain radar data corresponding to a given period. For example, a first data frame corresponds to a first period, and a second data frame corresponds to a second period after the first period. The PUI processing logic 600 can process each frame at block 606 to determine a PUI and presence output states for the respective frame. At block 606, the PUI processing logic 600 includes additional frame-level processing operations described in detail below. At block 608, the PUI processing logic 600 performs sleep data reconciliation. At block 608, the PUI processing logic 600 reconciles sleep stage predictions with PUI results and presence output states determined at block 606. The PUI processing logic 600 can input the sleep data into a sleep monitoring service for sleep score computation and hypnogram generation (block 610).

Figure 9:
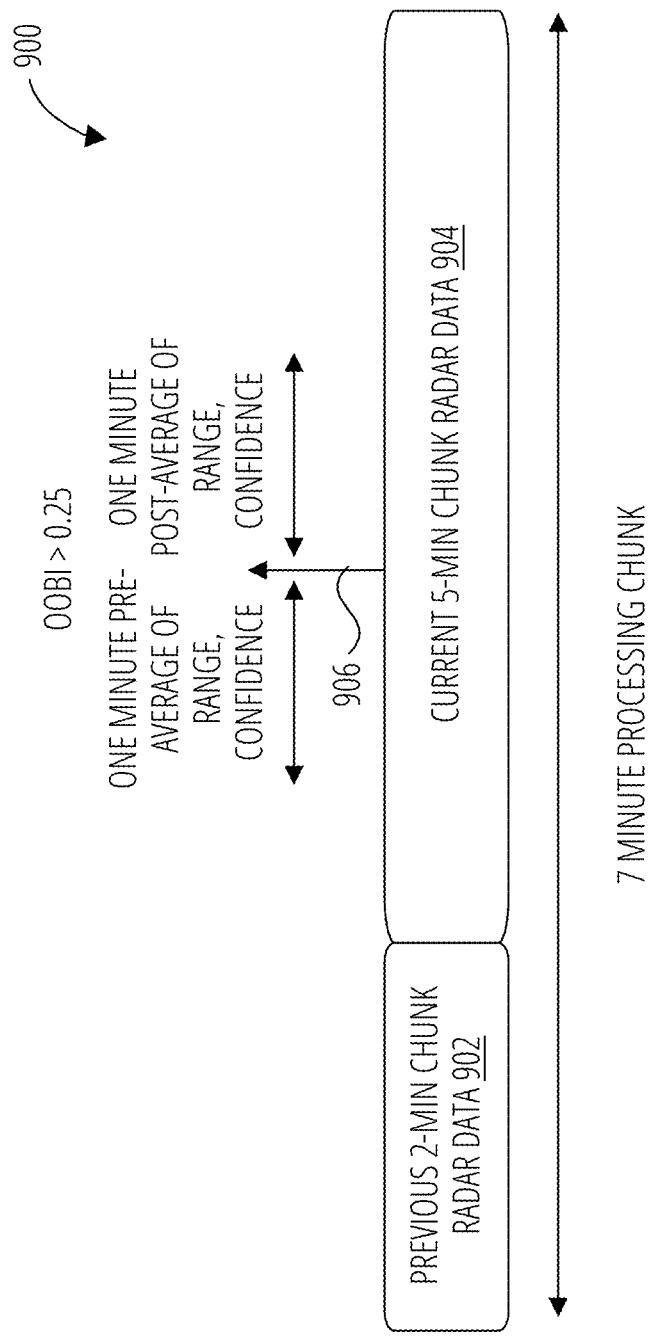
FIG. 9 illustrates a processing chunk with some previous radar data and current radar data according to at least one embodiment.

At block 606, various frame-level operations are performed on each frame, including saving data frame input in a PUI datastore (e.g., DynamoDB) (block 612). The PUI processing logic 600 can perform frame-level processing for PUI state boundary and state transition predictions (block 614). The frame-level processing at block 614 can be done with a processing chunk, including the radar data of the current data frame and some radar data of a previous data frame. For example, a 7-minute processing chunk can include a previous 2-minute chunk of radar data from a previous frame and a current 5-minute chunk of radar data, such as illustrated in FIG. 9. At block 616, the PUI processing logic 600 can generate IU or UU annotations for the 5-minute chunk of radar data (i.e., the current frame) based on the frame-level predictions generated at block 614. At block 616, the PUI processing logic 600 can generate timestamp annotations for the 5-minute chunk of radar data (i.e., the current frame). The PUI processing logic 600 can save the PUI results 620, presence outputs, and the last two-minutes of radar data of the current data frame into the PUI datastore, returning to block 612 for a next data frame. The last-two minutes of radar data are used with the next data frame.

In a further embodiment, the various frame-level operations performed on each frame can include some post-processing functions to handle duplicate OOBIs and any rewrites for IU→IU or IU→UU transitions (block 618). Once the session begins, IU is the default start state. However, the session could have been started by IU or UU. So, in order to handle the scenario of UU in bed before IU, the post-processing functions need to rewrite all the data marked as IU until the actual UI enters the bed. This leads to rewriting for older data to UU when IU followed by an IU scenario (IU→IU transition) is encountered.

In at least one embodiment, the PUI processing logic 600 is implemented on a computing device including one or more processors and memory to store computer-executable instructions that, if executed, cause the one or more processors to receive radar data from a sleep-monitoring device including a radar unit and generate a first data frame using the radar data (at block 604). In at least one embodiment, the first data frame includes i) a first set of range values associated with a first period, each range value representing a physical distance between a body and the radar unit, ii) a first set of RPM values of a breathing waveform associated with the first period, iii) a first set of confidence values associated with the first set of RPM values, iv) first data representing an amount of motion of the body on a bed located in an environment around the sleep-monitoring device, and v) second data representing an amount of motion of the body in a region adjacent to the bed. The confidence values can represent an amount of confidence (e.g., percentage or value between 0 and 1) that the first set of RPM values represents human breathing.

At block 606, the PUI processing logic 600 can determine a first range threshold value using a first average value of distance values for a first amount of time greater than the first period. The first range threshold value can be a longer-term average of the range values over a longer evaluation window. The PUI processing logic 600 can determine, using at least the second data, an indication of whether the body entered or exited the region adjacent to the bed within a second amount of time before the first period. The PUI processing logic 600 can determine a second average value using the first set of range values within a third amount of time within the first period. The second average value can be a shorter-term average of the range values over a shorter evaluation window. The PUI processing logic 600 can determine a third average value using the first set of confidence values within the third amount of time within the first period. The third average value can be a shorter-term average of the confidence values over a shorter evaluation window. The PUI processing logic 600 can identify a first state transition in the first data frame using the first average value, the second average value, the third average value, the first range threshold value, and a first confidence threshold value. The first state transition represents a first change in the identification of the body from a first user to being attributed to a second user. The PUI processing logic 600 can associate the second user with the first set of RPM values of the breathing waveform associated with the first period. The PUI processing logic 600 can associate the first user with RPM values of the breathing waveform associated with a period before the first period. At block 608, the PUI processing logic 600 can process only the first set of RPM values associated with the second user and discard RPM values of the breathing waveform associated with the first user.

In a further embodiment, the PUI processing logic 600 can generate a second data frame using the radar data corresponding to a second period after the first period. The PUI processing logic 600 can determine, using the second data frame, an event where the body entered or exited the region adjacent to the bed during the second period. The PUI processing logic 600 can determine, using a second set of range values of the second data frame, a first amount of change in the range values in a fourth amount of time before and after the event. The PUI processing logic 600 can determine, using a second set of confidence values of the second data frame, a second amount of change in the confidence values in the fourth amount of time before and after the event. The PUI processing logic 600 can identify a second state transition in the second data frame using the first amount of change in range values, the second amount of change in confidence values, a second range threshold value, and a second confidence threshold value. The second confidence threshold value can be a longer-term average of the confidence values over a longer evaluation window. The second state transition represents a second change in the identification of the body from the second user to being attributed to the first user. The PUI processing logic 600 can associate the first user with a second set of RPM values of the second data frame and discard the second set of RPM values associated with the first user. In a further embodiment, the PUI processing logic 600 can perform a hypnogram computation using at least the first set of RPM values and the breathing waveform associated with the second user. A hypnogram can be used as a qualitative method to visualize the time period of each stage of sleep, as well as the number of transitions between sleep stages.

Figure 7:
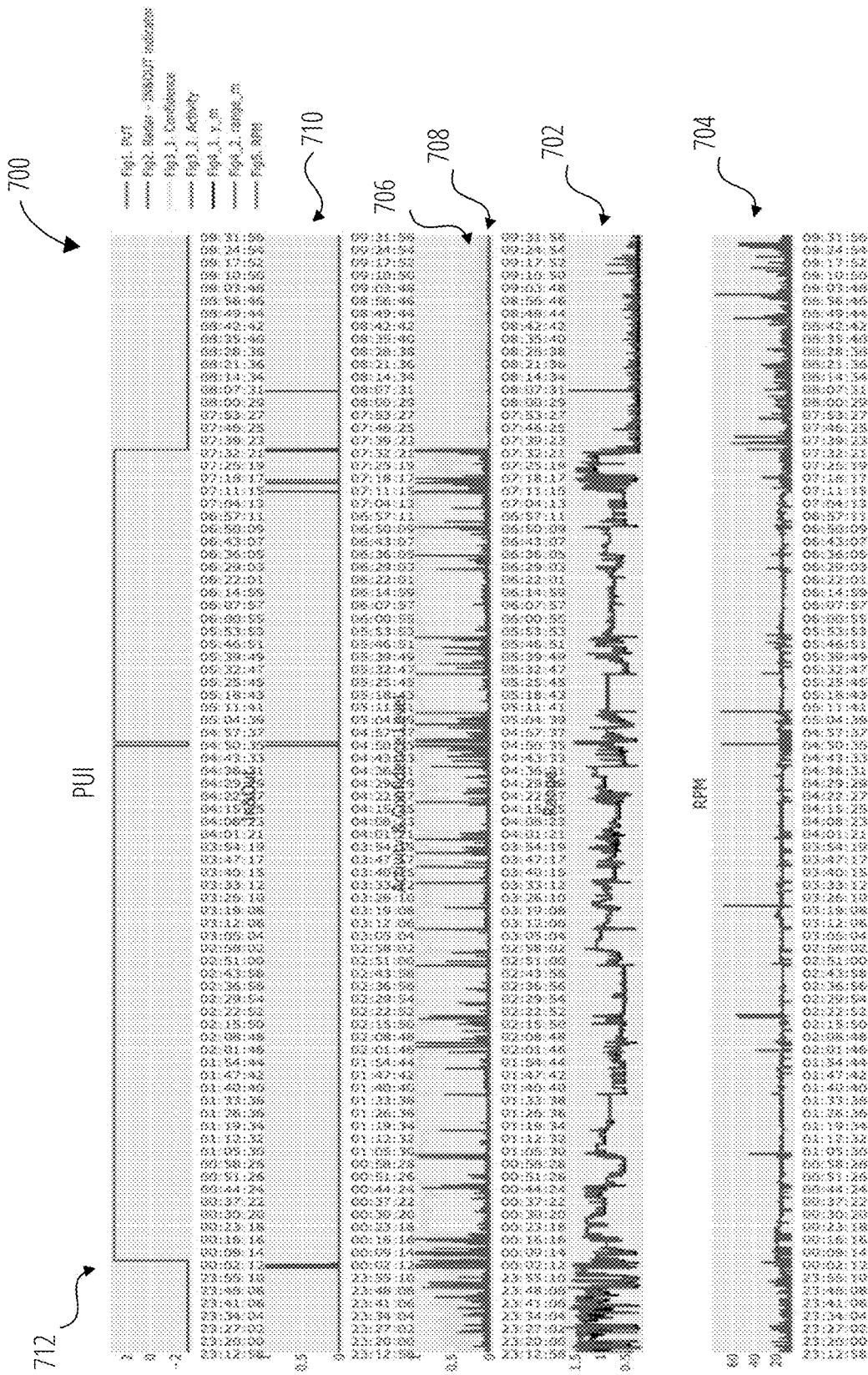
FIG. 7 is a graph of radar data and PUI results for a primary sleep session according to at least one embodiment.

As described above, at block 604, the PUI processing logic 600 converts the binary data to data frames, as illustrated in FIG. 7.

FIG. 7 is a graph 700 of radar data and PUI results for a primary sleep session according to at least one embodiment. The radar data can include i) first information 702 representing range values of a body located in an environment around the sleep-monitoring device; ii) second information 704 representing RPM values associated with the body; iii) third information 706 representing confidence values associated with the RPM values; iv) fourth information 708 representing motion of a user in a first region 206 of the environment; and v) fifth information 710 representing motion of a user in a second region 208 adjacent the first region 206. The fourth information 708, at a third row of the graph 700, shows an amount of motion detected in the first region 206. The amount of motion can also be referred to as the motion level. The signal can range between 0 and 1. For example, as illustrated in FIG. 7, when a user is not present in the first region 206, an amount of motion (i.e., motion level) is zero or minimal. When a user is present in the first region 206, an amount of motion (i.e., the motion level) increases as compared to when a user is not present in the first region 206. It should be noted that other objects in the first region 206 can move, such as caused by a fan, and this amount of motion can be included in the fourth information 708. However, the motion levels and the corresponding confidence levels can be used to determine whether the motion is caused by a user or another object. The motion levels and corresponding confidence levels can be used to distinguish between different types of user activity in the first region 206 (e.g., in-bed activities). For example, an amount of motion detected when a user is sleeping can be less than an amount of motion detected when the user is reading a book, watching television, operating a mobile device, or the like. In at least one embodiment, the fifth information 710 includes spikes in a second row of the graph 700, each spike representing an OOBI (or an IN/OUT event). The OOBI signal can range between 0 and 1 to quantify an activity level observed in the second region 208 (e.g., an out-of-bed region) during a given time. The third information 706, at a third row of the graph 700, shows the confidence of the selected body voxel's breathing waveform. This signal can range from 0 to 1. The motion levels and corresponding confidence levels can be used to distinguish between different types of user activity in the first region 206 (e.g., in-bed activities). For example, an amount of motion detected when a user is sleeping can be less than an amount of motion detected when the user is reading a book, watching television, operating a mobile device, or the like.

As illustrated in FIG. 7, the first information 702 and second information 704 denote the range distance of the selected body voxel and the estimated RPM of the respiration rate. The PUI processing logic 600 uses the radar data (e.g., data metrics) described above to determine PUI 712. The PUI results 712 are the result of the PUI processing logic 600 determining the PUI and presence output states at block 606 of FIG. 6. The presence output states at block 606 can be determined in other ways, as described in more detail below.

As described above, in dual-user scenarios, disambiguating between the breathing of an intended user (IU) sleeping closer to the radar unit from an unintended user (UU) sleeping farther from the radar unit is critical. The sleep score of only the IU should be determined by a cloud-based PUI algorithm. As described above, the PUI processing logic 600 can disambiguate between IU and UU from the radar data by processing the radar data at a frame level using a PUI algorithm. The goal of the PUI algorithm is to distinguish between UU's sleep data from IU's sleep data and correctly capture the IU's sleep data to minimize the missing detection rate of incorrectly discarding the IU's sleep data. The PUI algorithm can detect transitions in the radar data using different types of transition logic. In at least one embodiment, the PUI algorithm can use a hybrid approach to detect transitions in the radar data, such as illustrated and described below with respect to FIG. 8.

Figure 8:
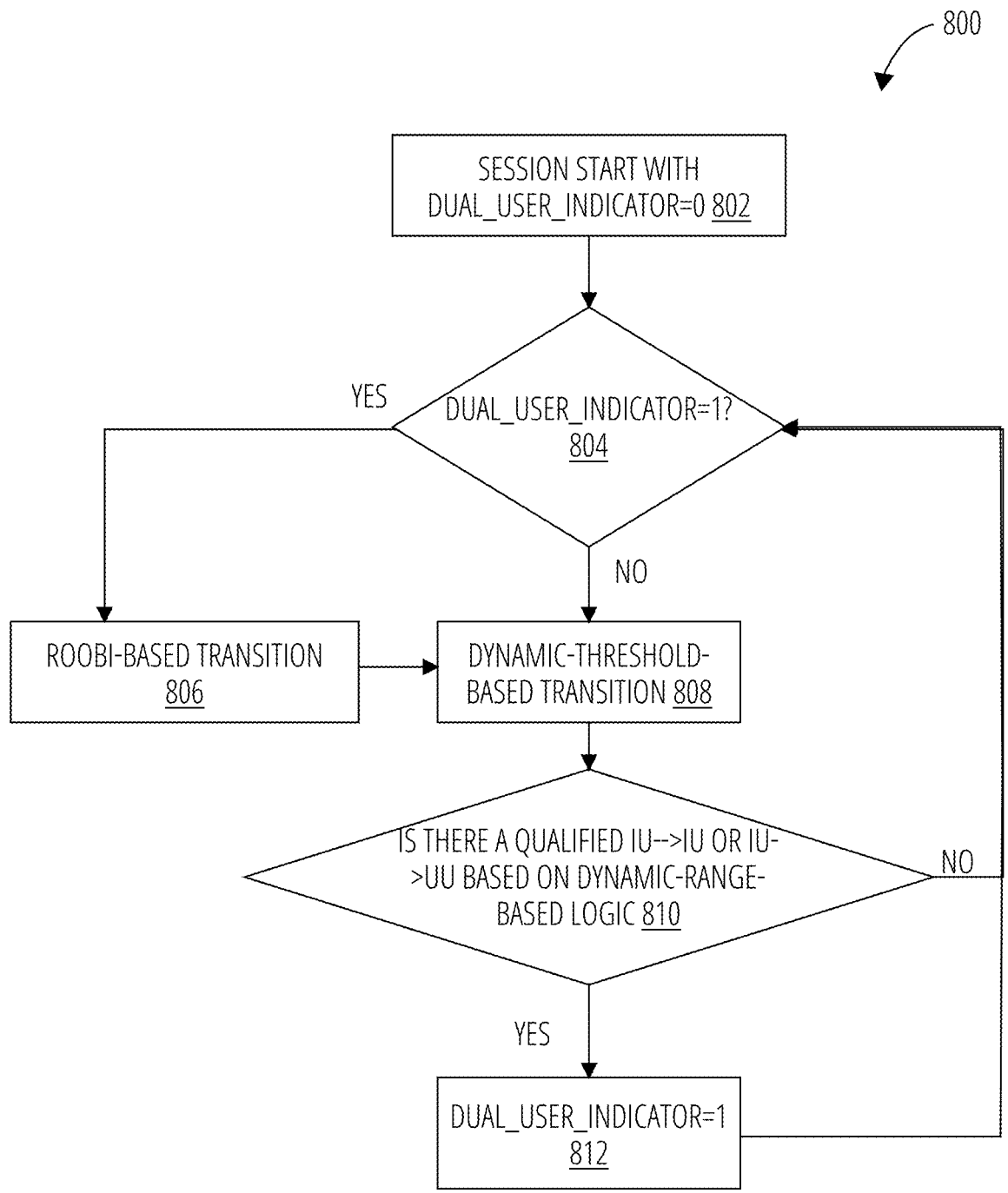
FIG. 8 is a flow diagram of a method for distinguishing between a primary user (PU) and a secondary user (SU) using a PUI algorithm according to at least one embodiment.

FIG. 8 is a flow diagram of a method 800 for distinguishing between a primary user (PU) and a secondary user (SU) using a PUI algorithm according to at least one embodiment. Method 800 may be performed, at least in part, by processing logic that may include hardware (e.g., circuitry, dedicated logic, programmable logic, microcode, processing device, etc.), software (such as instructions run on a processing device, a general-purpose computer system, or a dedicated machine), firmware, microcode, or a combination thereof. Method 800 may be implemented, for example, by one or more server(s) hosting the sleep processing logic 138 in connection with the sleep-monitoring device 106 with the radar unit 104.

In at least one embodiment, the PUI algorithm includes two algorithm modules, including a refined OOBI (ROOBI) based transition module and a dynamic-threshold-based transition module. The ROOBI-based transition module can include ROOBI-based transition logic, and the dynamic-threshold-based transition module can include dynamic-threshold-based transition logic. The ROOBI-based transition logic can qualify a genuine OOBI signal for the state transition (e.g., IU→UU or UU→IU) using a short observation window (e.g., 2 minutes). The dynamic-threshold-based transition logic can qualify the state transition (e.g., IU→UU or UU→IU) using a long-term observation window (e.g., 10-20 minutes) with adaptive threshold setting. The dynamic-threshold-based transition logic is robust to capture the transition of IU→IU or IU→UU transitions at an early phase of a sleeping session for the dual-user scenario. The ROOBI-based transition logic can capture a short disturbance of IU, i.e., IU quickly moves out-and-back, which may be missed by the dynamic-threshold-based transition logic. Additional details of these modules are described below.

Referring to FIG. 8, the method 800 begins with the processing logic starting a sleeping session with a dual-user indicator turned off (i.e., deactivated) (block 802) (e.g., dual_user_indicator=0). The dual-user indicator can be a flag that can be set and reset. The processing logic checks if the dual-user indicator is turned on at block 804 (e.g., dual_user_indicator=1?). In the first instance, the dual-user indicator is turned off, so the processing logic proceeds to block 808 that enables the dynamic-threshold-based transition logic. The dynamic-threshold-based transition logic can be used to detect one or more transitions in the radar data at block 808. At block 810, the processing logic determines whether there is a qualified transition (e.g., IU→UU or UU→IU) based on the dynamic-threshold-based transition logic at block 808). If not, the processing logic returns to block 804. If there is a qualified transition based on the dynamic-threshold-based transition logic at block 810, the processing logic turns on (i.e., activates) the dual-user indicator (block 812) (e.g., dual_user_indicator=1), and returns to block 804. If the processing logic determines that the dual-user indicator is turned on (i.e., activated) at block 804, the processing logic enables the ROOBI-based transition logic at block 806. The ROOBI-based transition logic can be used to detect one or more transitions in the radar data at block 806 before the dynamic-threshold-based transition logic is used to detect one or more transitions in the radar data. The dynamic-threshold-based transition logic can use a longer observation window to correct any erroneous transitions detected by the ROOBI-based transition logic at block 806. Although the ROOBI-based transition logic at block 806 can make a fast decision, the data can be noisy and lead to false transition detections.

It should be noted that the sleeping session can start with a default IU state when a presence of a user is detected in the radar data. When an IU→IU transition occurs, it indicates the default starting state of IU needs to be corrected as UU. For example, the initial state by default can be IU, since this is no prior knowledge of a single-user scenario or a dual-user scenario. If it is indeed UU sleeping first, and IU comes in later, there will be an IU to IU transition. This means the default starting state of IU needs to be rewritten as UU. Therefore, the processing logic of the PUI algorithm only enables the dynamic-threshold-based transition logic when the sleeping session starts (i.e., without using the ROOBI-based transition logic). An IU→IU or IU→UU transition strongly indicates that this is a dual-user scenario and can set the dual-user indicator flag to one, enabling the ROOBI-based transition logic. The advantages of implementing the hybrid modes can include: 1) the processing logic can leverage the robustness of dynamic-threshold-based transition in identifying the dual-user scenario; 2) the ROOBI-based transition logic can capture the short disturbance of IU, i.e., IU quickly moves out-and-back, which could be missed by the dynamic-threshold-based transition; and 3) the erroneous estimation of ROOBI-based transition logic can be corrected by the following dynamic-threshold-based transition logic with the longer observation window.

Figure 10:
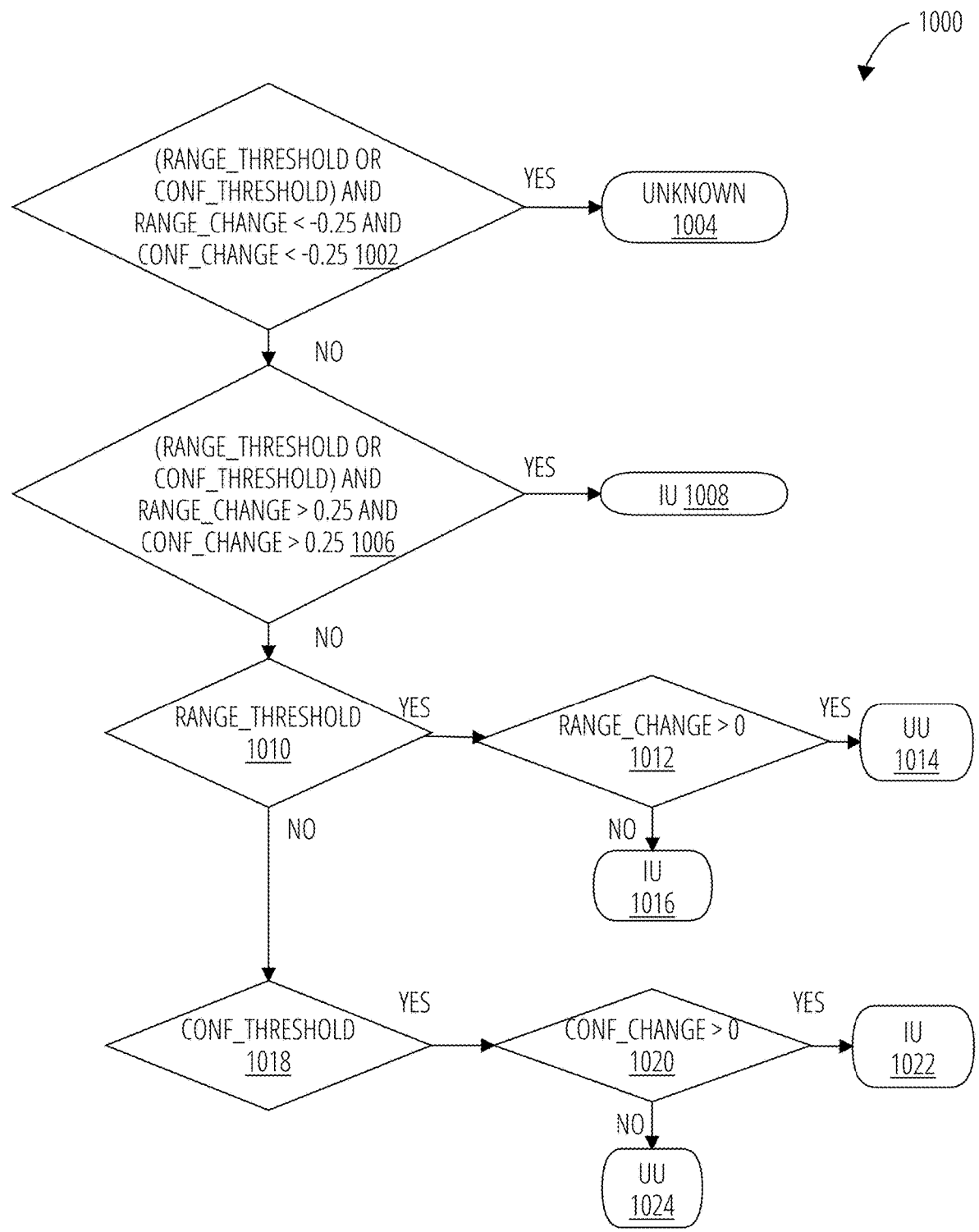
FIG. 10 is a flow diagram of a method for a PUI state prediction based on average range values and average confidence values in refined out-of-bed indicator (ROOBI)-based transition logic according to at least one embodiment.

In at least one embodiment, the dynamic-threshold-based transition logic at block 808 and the ROOBI-based transition logic at block 806 can generate a PUI state prediction using the range values and the confidence values in the radar data, such as illustrated in FIG. 10.

ROOBI-Based Transition Logic

In at least one embodiment, the ROOBI-based transition logic can use a range threshold value (range_thre) and a confidence threshold (conf_thre). The range threshold is the minimum absolute range delta required to qualify an OOBI.

The confidence threshold value is the minimum absolute confidence delta required to qualify an OOBI. The ROOBI-based transition logic can determine a first amount of change in range values (range_change) and a second amount of change in confidence values (conf_change). As described above, the sleep-monitoring device can report an OOBI signal, where a speech represents an OOBI event. OOBI values beyond a certain qualifying threshold can serve as an anchor point for state transitions as they indicate IN/OUT activity in the second region (e.g., Out-of-Bed region). In addition, range and confidence changes beyond a threshold around a reported OOBI are used to qualify the reported OOBI. This will help to filter out false/undesired OOBI triggers and arrives at a genuine state transition, referred to herein as ROOBI. The following diagram in FIG. 9 summarizes this at a high level.

FIG. 9 illustrates a processing chunk 900 with some previous radar data and current radar data according to at least one embodiment. The processing chunk 900 can include 902 and the current 5-min chunk radar data 904. The ROOBI-based transition logic can identify an OOBI 906 having a value higher than a threshold (e.g., 0.25) in the current 5-min chunk radar data 904, for example. The ROOBI-based transition logic can determine a first average range value using the range values within the last minute before the OOBI 906 and a second average range value using the range values within one minute after the OOBI 906. The ROOBI-based transition logic can determine a first average confidence value using the confidence values within the last minute before the OOBI 906 and a second average confidence value using the confidence values within one minute after the OOBI 906. The ROOBI-based transition logic can determine the first amount of change in range values (range_change) by taking the difference between the first average range value and the second average range value (e.g., range_change: Post one-minute range average-Pre one-minute range average). The ROOBI-based transition logic can determine the second amount of change in confidence values (conf_change) by taking the difference between the first average confidence value and the second average confidence value (e.g., conf_change: Post one-minute confidence average-Pre one-minute confidence average).

In other embodiments, other amounts of time can be used instead of one minute before and one minute after the OOBI 906. In the event that the OOBI 906 is detected at the start of the current 5-min chunk radar data 904, the previous 2-min chunk radar data 902 can be used for determining the average range and confidence values. It should be noted that the increase and decrease in range and confidence values around the OOBI 906 can be used to predict a next state (e.g., IU/UU/Unknown).

The following flow diagram in FIG. 10 shows the PU state prediction based on the pre and post average range and confidence values around the OOBI 906, illustrated in FIG. 9.

FIG. 10 is a flow diagram of a method 1000 for a PUI state prediction based on average values and average confidence values in ROOBI-based transition logic according to at least one embodiment. The method 1000 can be performed by the ROOBI-based transition logic. The ROOBI-based transition logic can determine whether the first amount of change in range values (range_change) is less than a minimum range threshold (e.g., −0.25) and the second amount of change in confidence values (conf_change) is less than a minimum confidence threshold (e.g., −0.25) (block 1002). If these conditions are met at block 1002, the ROOBI-based transition logic predicts an unknown state 1004. If these conditions are not met at block 1002, the ROOBI-based transition logic determines whether the first amount of change in range values (range_change) is greater than a first range threshold (e.g., 0.25) and the second amount of change in confidence values (conf_change) is greater than a first confidence threshold (e.g., 0.25) (block 1006). If these conditions are met at block 1006, the ROOBI-based transition logic predicts an intended user (IU) state 1008. If these conditions are not met at block 1006, the ROOBI-based transition logic determines whether the range threshold value (range_thre) is met at block 1010. If the range threshold value is met at block 1010, the ROOBI-based transition logic determines whether the first amount of change in range values (range_change) is greater than zero (block 1012). If the first amount of change in range values (range_change) is greater than zero at block 1012, the ROOBI-based transition logic predicts an unintended user (UU) status 1014. If the first amount of change in range values (range_change) is not greater than zero, the ROOBI-based transition logic predicts an IU state 1016. If the range threshold value is not met at block 1010, the ROOBI-based transition logic determines whether the confidence threshold value is met (block 1018). If the confidence threshold value is met at block 1018, the ROOBI-based transition logic determines whether the second amount of change in confidence values (conf_change) is greater than zero (block 1020). If the second amount of change in confidence values (conf_change) is greater than zero, the ROOBI-based transition logic predicts an IU state 1022. If the second amount of change in confidence values (conf_change) is not greater than zero, the ROOBI-based transition logic predicts a UU state 1024.

Dynamic-Threshold-Based Transition Logic

As described above, the dynamic-threshold-based transition logic with a longer observation window is robust in identifying the dual-user scenario. Its state transition is illustrated in FIG. 11.

Figure 11:
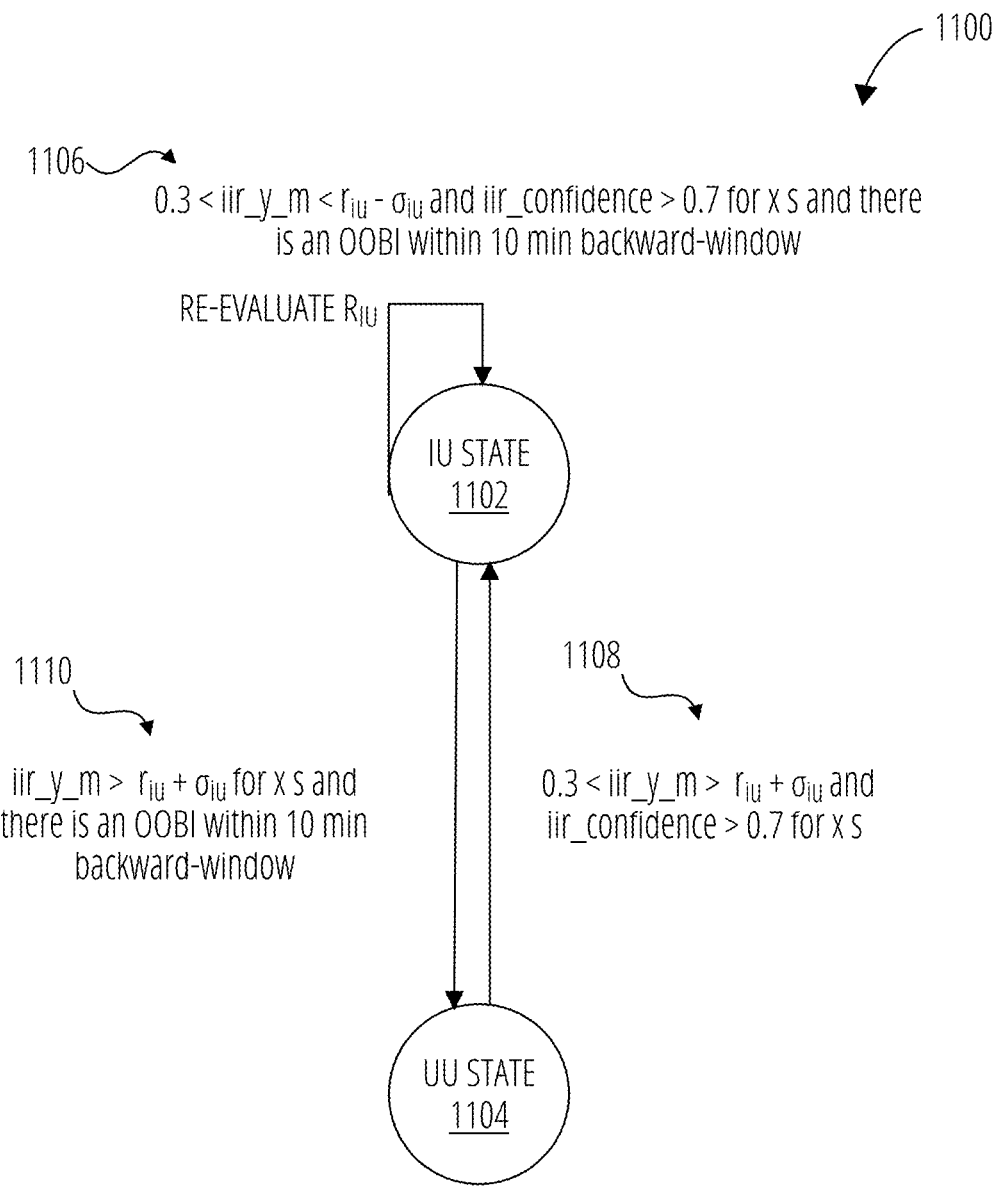
FIG. 11 is a state diagram of dynamic-threshold-based transition logic according to at least one embodiment.

FIG. 11 is a state diagram 1100 of dynamic-threshold-based transition logic according to at least one embodiment. The state diagram 1100 uses some variables for the transitions between states. The variables iir_y_m and iir_confidence indicate the local mean of voxel distance and breathing waveform confidence. The local mean is acquired over a short observation window (e.g., 3 minutes). The variable $r_{iu}$ denotes a long-term average of the IU's range values. For example, the effective average time window can be 20 minutes. It should be noted that the long-term average, $r_{iu}$, can be updated by the high-confidence range samples of the data labeled as being associated with an IU. The variables $\sigma'_{iu}$, $\sigma_{uu}$, and $\sigma_{iu}$ denote the thresholds of relative distance change with respect to for the transitions of IU→IU, IU→UU, and UU→IU. The dynamic-threshold-based transition logic can adaptively change the range threshold for the transitions based on the long-term average of IU's range and a threshold of relative distance change for the respective transition (e.g., $r_{iu}$-$\sigma'_{iu}$).

As illustrated in FIG. 11, the state diagram 1100 includes an IU state 1102 and a UU State 1104. The dynamic-threshold-based transition logic can determine state transitions based on certain conditions. While in the IU state 1102, the dynamic-threshold-based transition logic can remain in the state when a first condition 1106 is met (IU→IU). While in the IU state 1102, the dynamic-threshold-based transition logic can transition to the UU State 1104 when a second condition 1108 is met (IU→UU). While in the UU State

1104, the dynamic-threshold-based transition logic can transition to the IU state 1102 when a third condition 1110 is met (UU→IU).

In at least one embodiment, the first condition 1106 is met when i) the variable iir_y_m (average range value) is between a minimum threshold (e.g., 0.3) and a dynamic threshold based on the long-term average value and a threshold of relative distance change for the respective transition (e.g., $r_{iu}$-$\sigma'_{iu}$), ii) the variable iir_confidence is greater than a minimum threshold (e.g., e.g., 0.7), and iii) an OOBI is reported within a prior window (e.g., 10-minute backward-window). In at least one embodiment, the variable $r_{iu}$ can be reevaluated when the first condition is met.

In at least one embodiment, the second condition 1108 is met when i) the variable iir_y_m (average range value) is between a minimum threshold (e.g., 0.3) and a dynamic threshold based on the long-term average value and a threshold of relative distance change for the respective transition (e.g., $r_{iu}$+$\sigma_{iu}$), and ii) the variable iir_confidence is greater than a minimum threshold (e.g., e.g., 0.7).

In at least one embodiment, the 1110 is met when i) the variable iir_y_m (average range value) is greater than a dynamic threshold based on the long-term average value and a threshold of relative distance change for the respective transition (e.g., $r_{iu}$+$\sigma_{uu}$), and ii) an OOBI is reported within a prior window (e.g., 10-minute backward-window).

It should be noted that, for the IU→IU and IU→UU transitions, the dynamic-threshold-based transition logic can make a transition decision when there is a large range difference between local-mean range iir_y_m and $r_{iu}$, and there is an OOBI signal within 10-min ago to indicate certain out-of-bed activity. For the UU→IU transition, the dynamic-threshold-based transition logic can make a transition decision when the local mean range iir_y_m is within $r_{iu}$+$\sigma_{iu}$. For the transition to IU, the waveform confidence is expected to be relatively high, e.g., iir_confidence>0.7. For the transition to UU, the waveform confidence being relatively high is not a requirement, since the overall confidence of UU's sleeping waveform can be low.

It should be noted that FIG. 11 illustrates one example of state transitions with certain conditions. In other embodiments, other conditions can be defined for the state transitions. For example, the variance of a metric within the observation window, e.g., voxel range, can be included as another condition or an alternate condition. If the metric variance is too high, the voxel selection is not stable, and the transition decision is not made over the noisy data.

PUI Post Processing

Referring to FIG. 6, the PUI processing logic 600 performs post-processing functions at block 618. The post-processing functionality can be implemented in a post-processing module or post-processing logic that is added on top of the PUT predictions to handle different user scenarios where changes need to be made to the predicted output that is stored in PUI data store (e.g., DynamoDB). These functions also serve to introduce the time and memory aspect needed for making corrections to PUI predictions at a session level. Following are the three major functionalities of the PUT post-processing module: handling duplicate OOBIs and IU rewrite.

Handling Duplicate OOBIs

Two minutes of previous chunk data is added while processing the current chunk. So, there is a possibility that the same OOBI (present in these two minutes) is qualified twice. In some cases, the state change decisions made in these two instances are different although they have the same absolute timestamp (OOBI). This happens because the samples used for post- and pre-averaging data will be different. The decision made in the second instance is more accurate as it has better data for post- and pre-averaging. In these cases, the entries in the PUI data store (e.g., Dynamo DB) made by the first instance are deleted and updated as per the decisions made by the second instance.

IU→IU Rewrite

Once the session begins, IU is the default start state. However, the session could have been started by IU or UU. So, in order to handle the scenario of UU in bed before IU, the post-processing module needs to rewrite all the data marked as IU until the actual IU enters the bed. This leads to rewriting for older data to UU when IU followed by IU scenario (IU→IU transition) is encountered.

UU→UU Rewrite

During the session, the current state can be UU, and there is a transition to UU for the next state. In this case, the UU state is the wrong label, and the post-processing module needs to rewrite all the data marked as UU as IU.

Integration with Disturbance Capture

The PUI algorithm illustrated in FIG. 8 may not be able to capture the event of an IU quickly exiting and re-entering the first region, which may cause the missing detection of the short disturbance in the sleep hypnogram. Both ROOBI-based transition logic and dynamic-threshold-based transition logic expect a certain range change to make the transition decision, i.e., >41 cm and >30 cm, respectively. However, it takes at least 30 s (usually even more than 1~2 mins) for the range to converge. Therefore, it can be challenging for the ROOBI-based transition logic to detect a short disturbance (less than 2 mins), since a 1-min pre/post-window for observation is needed. The situation will be more severe for the dynamic-threshold-based transition logic, which needs at least a 3-min average window to track the local range iir_y_m. The RPM, i.e., respiration rate, can react faster to the short disturbance event. The RPM lies in the range of 8~25 and usually in the range of 10~20 during sleeping. When the short disturbance occurs, the RPM estimation can rise to 30~70 or decrease to <7, usually along with the decreasing of waveform confidence, e.g., by 0.3~0.8. Therefore, the PUI algorithm with disturbance capture can leverage the variations of RPM and waveform confidence to capture the short disturbance when the PUI algorithm is not able to detect it. There are three metrics that can be used for the short disturbance detection: OOBI, RPM_delta, and conf_delta. The RPM_delta metric, for a given frame, is the range of RPM values within a 1-min time window, e.g., max(RPM)-min(RPM). The conf_delta metric, for a given frame, is the range of confidence values within a 1-min time window, e.g., max(conf)-min(conf). Instead of using the standard deviation to reflect the metric variation within a 1-min time window, the RPM_delta and conf_delta metrics are defined to emphasize a large change, even if it just occurred a few instances within the time window. The disturbance score per sample is defined as the function of RPM_delta and conf_delta metrics, such as set forth in the following equation:

$$d = \max\left(\frac{\text{conf\_delta}}{\text{norm\_conf}}, \frac{\text{RPM\_delta}}{\text{norm\_RPM}}\right)$$

where norm_conf and norm_RPM represent the normalization factor for confidence and RPM, respectively (e.g., norm_conf=0.3 and norm_RPM=15). The functionality to capture disturbances can be implemented in a capture disturbance module. The algorithm to detect the short disturbances is illustrated and described below with respect to FIG. 12.

Capture Disturbance Module

The capture disturbance module can perform the method that implements an algorithm to detect the short disturbance. The processing logic starts to qualify a disturbance event when there is a strong OOBI signal (e.g., >0.7). The qualification period (grace period) can take 10 mins to update the disturbance score, as expressed in the following equation:

$$\text{disturbance\_score} = \sum_{i=1}^{N} d_i$$

where N is the total number of frames in the grace period. After the grace period, if the disturbance score is greater than a disturbance threshold (e.g., disturbance_score>disturbance_thre) and the state is IU during this period, rewrite the time period (e.g., [grace_time_start, rewrite_time_end]) as the UU. The grace_time_start is defined as the starting time of the grace period, when the OOBI signal triggers the disturbance qualification (e.g., rewrite_time_end=min(grace_time_start+5 minutes, latest_time_disturbance, wherein latest_time_disturbance is the latest timestamp of d>1 during the grace period.

It should be noted that the above logic is used when the disturbance score is high enough (to avoid false-positive OOBI), and other ROOBI-based transition logic and dynamic-threshold-based transition logic are not used during this grace period. Eventually, the rewrite time is limited by 5 minutes for the following reasons. The logic can be conservative for rewriting IU data to UU as it will be easy for the customer to perceive a rewrite error (missing detection) greater than 5 minutes (>5 min). For the dual-user scenario, the disturbance of more than 5 minutes will most likely be captured by the ROOBI-based transition logic and dynamic-threshold-based transition logic. For a single-user case, even if the disturbance is longer than 5 minutes and the PUI algorithm marks the 5-min disturbance, it will not impact the reconciliation result, i.e., ML shall be able to identify if the absence is genuinely longer than 5 minutes.

Figure 12:
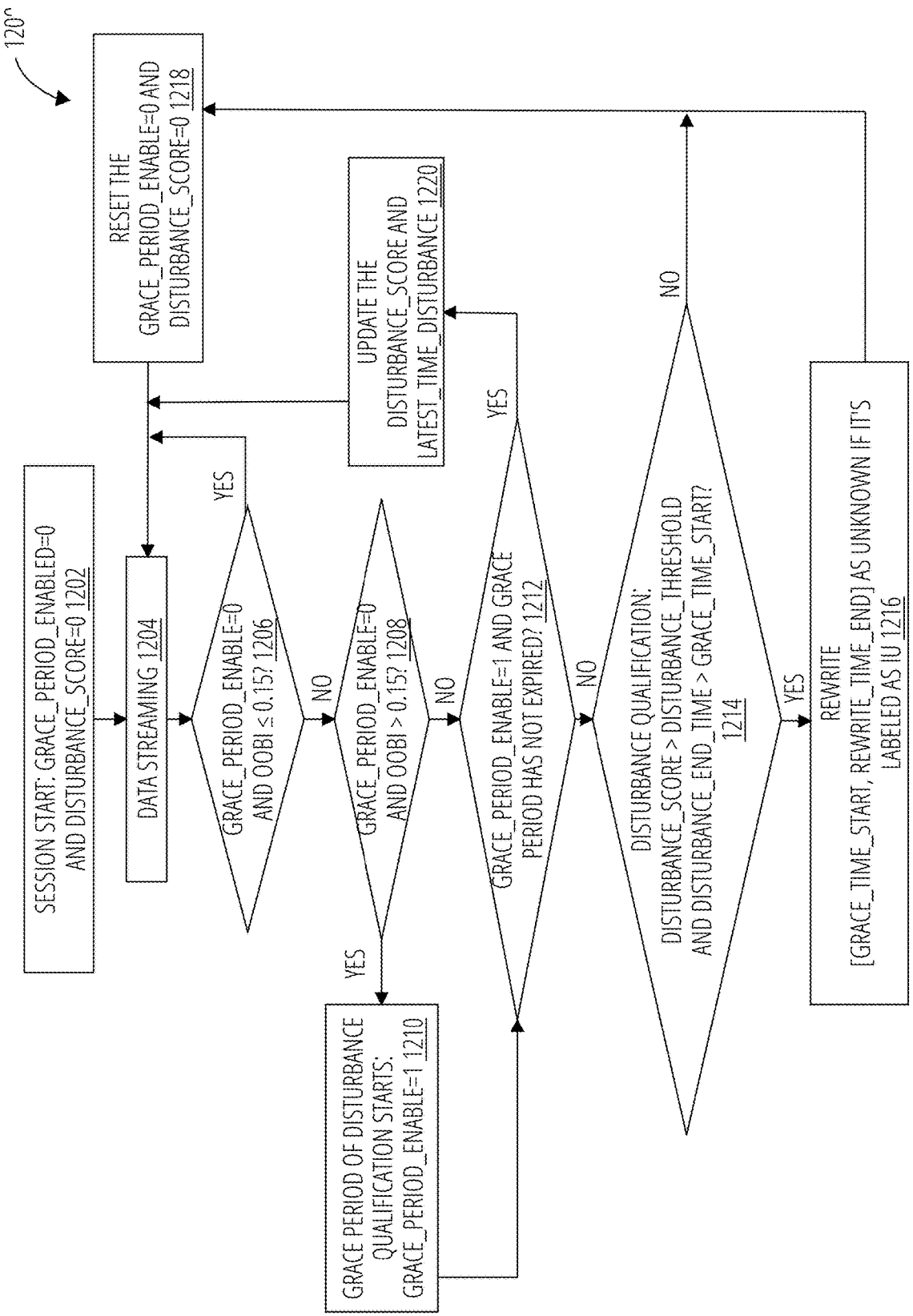
FIG. 12 is a flow diagram of a method for distinguishing between a PU and an SU with disturbance detection according to at least one embodiment.

FIG. 12 is a flow diagram of a method 1200 for distinguishing between a PU and an SU with disturbance detection according to at least one embodiment. Method 1200 may be performed, at least in part, by processing logic that may include hardware (e.g., circuitry, dedicated logic, programmable logic, microcode, processing device, etc.), software (such as instructions run on a processing device, a general-purpose computer system, or a dedicated machine), firmware, microcode, or a combination thereof. Method 1200 may be implemented, for example, by one or more server(s) hosting the sleep processing logic 138 in connection with the sleep-monitoring device 106 with the radar unit 104. The capture disturbance module can perform the method that implements an algorithm to detect the short disturbance.

The method 1200 begins with the processing logic enabling a qualification period (grace period) and initializing a disturbance score at a session start (block 1202). The processing logic can start the data streaming (block 1204). The processing logic can determine whether the grace period is disabled (grace_period_enable=0) and whether an OOBI signal is less than or equal to a threshold (e.g., 0.15) (block 1206). If the OOBI signal is no longer less than the threshold at block 1206, the processing logic determines whether the grace period is disabled (grace_period_enable=0) and whether an OOBI signal is greater than the threshold (e.g., 0.15) (block 1208). If the conditions at block 1208 are not met, the processing logic proceeds to block 1212. At block 1212, the processing logic determines that the grace period is enabled, and the grace period has not expired (block 1212). If the conditions at block 1208 are met, the processing logic starts the grace period of disturbance qualification (block 1210) (grace_period_enable=1), before proceeding to block 1212. At block 1212, the processing logic determines that the grace period is enabled, and the grace period has not expired (block 1212). If the conditions at block 1212 are met, the processing logic updates the disturbance score and the latest time disturbance (block 1220) (latest_time_disturbance), and returns to block 1204. If the conditions at block 1212 are met, the processing logic determines whether the disturbance is qualified (block 1214). In at least one embodiment, the disturbance is qualified if it meets the following conditions: the disturbance score is greater than the disturbance threshold (e.g., disturbance_score>disturbance_threshold), and the disturbance end time is greater than the grace time start (e.g., disturbance_end_time>grace_time_start). If the disturbance is not qualified at block 1214, the processing logic proceeds to block 1218. At block 1218, the processing logic resets the grace period and the disturbance score (e.g., grace_period_enable=0 and disturbance_score=0). If the disturbance is qualified at block 1214, the processing logic rewrites the radar data with the unknown state if its current label is the IU state (block 1216). After rewriting the radar data at block 1216, the processing logic returns to block 1218 at which the processing logic resets the grace period and the disturbance score (e.g., grace_period_enable=0 and disturbance_score=0).

As described herein, the PUI algorithm illustrated in FIG. 8 may not be able to capture the event of an IU quickly exiting and re-entering the first region, which may cause the missing detection of the short disturbance in the sleep hypnogram. The PUI algorithm can integrate the capture disturbance logic (module) to capture short disturbances in the sleep hypnogram, as illustrated in FIG. 13.

Figure 13:
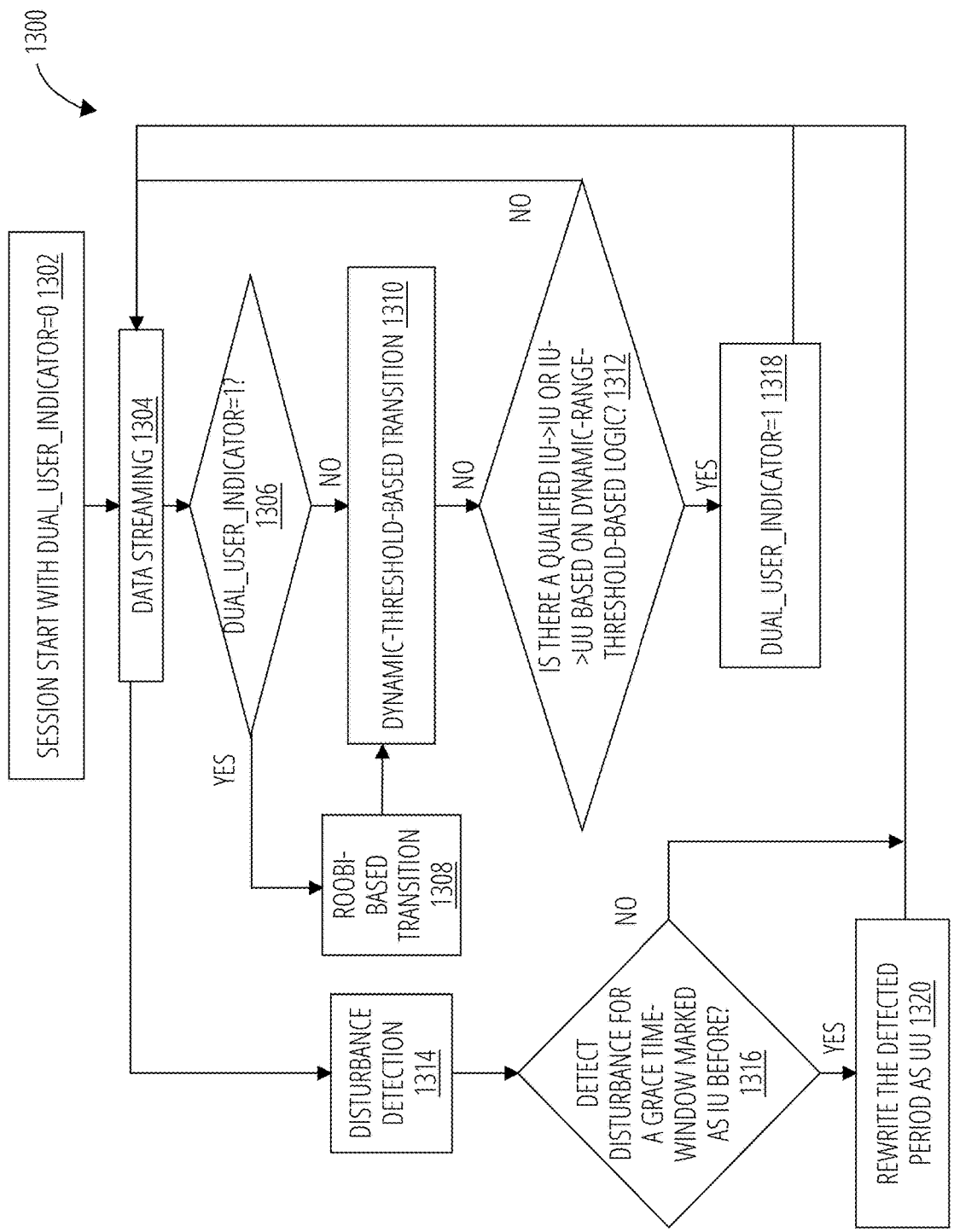
FIG. 13 is a flow diagram of a method for distinguishing between a PU and an SU with disturbance capture according to at least one embodiment.

FIG. 13 is a flow diagram of a method for distinguishing between a PU and an SU with disturbance capture according to at least one embodiment. Method 1300 may be performed, at least in part, by processing logic that may include hardware (e.g., circuitry, dedicated logic, programmable logic, microcode, processing device, etc.), software (such as instructions run on a processing device, a general-purpose computer system, or a dedicated machine), firmware, microcode, or a combination thereof. Method 1300 may be implemented, for example, by one or more server(s) hosting the sleep processing logic 138 in connection with the sleep-monitoring device 106 with the radar unit 104.

Referring to FIG. 13, the method 1300 begins with the processing logic starting a sleeping session with a dual-user indicator turned off (i.e., deactivated) (block 1302) (e.g., dual_user_indicator=0). The dual-user indicator can be a flag that can be set and reset. The processing logic starts the data streaming (block 1304) and checks if the dual-user indicator is turned on (block 1306) (e.g., dual_user_indicator=1?). In the first instance, the dual-user indicator is turned off, so the processing logic proceeds to block 1310 that enables the dynamic-threshold-based transition logic. The dynamic-threshold-based transition logic can be used to detect one or more transitions in the radar data at block 1310. At block 1312, the processing logic determines whether there is a qualified transition (e.g., IU→UU or UU→IU) based on the dynamic-threshold-based transition logic at block 1310). If not, the processing logic returns to block 1304. If there is a qualified transition based on the dynamic-threshold-based transition logic at block 1312, the processing logic turns on (i.e., activates) the dual-user indicator (block 1318) (e.g., dual_user_indicator=1), and returns to block 1304. If the processing logic determines that the dual-user indicator is turned on (i.e., activated) at block 1306, the processing logic enables the ROOBI-based transition logic at block 1308. The ROOBI-based transition logic can be used to detect one or more transitions in the radar data at block 1308 before the dynamic-threshold-based transition logic is used to detect one or more transitions in the radar data. The dynamic-threshold-based transition logic can use a longer observation window to correct any erroneous transitions detected by the ROOBI-based transition logic at block 1310. Although the ROOBI-based transition logic at block 1308 can make a fast decision, the data can be noisy and lead to false transition detections.

In order to capture disturbances, the processing logic can initiate disturbance detection in parallel to the dynamic-threshold-based transition logic and ROOBI-based transition logic (block 1314). The processing logic can determine whether a disturbance is detected for a grace time where the window is marked as IU previously (block 1316). If the disturbance is detected, the processing logic can rewrite the radar data for the detected period as UU or Unknown states (block 1320), and return to block 1304. If the disturbance is not detected at block 1316, the processing logic returns to block 1304 without rewriting.

In dual sleeper scenarios, the PUI processing logic (e.g., PUI block 312 of FIG. 3 or FIG. 4, block 516 of FIG. 5) can disambiguate between the breathing of the closest user versus the partner is critical. The intended user (UI) is the user sleeping closer to the radar unit, while the unintended user (UU) is the user sleeping on the further side. The sleep-monitoring system should only report the sleep score of the IU. The PUI processing logic can annotate the data with IU or UU. These annotations can serve as inputs to the reconciliation block 402. The biggest challenge for the PUI processing logic is to disambiguate between IU and UU based on the strongest breathing voxel information without actually having centroid information of the persons present in the room. In addition, this needs to operate under the constraints of streaming mode and latency requirements. The PUI processing logic makes the sleep-monitoring system a contactless tracking product where calibration is not required, and the sleep of the intended user sleeping closer to the device (e.g., up to 1.5 m) can be monitored.

In at least one embodiment, the PUI processing logic can be performed by the PUI block 312. As described above, the PUI block 312 can distinguish the sleep of a primary user (the user closest to the device) (also referred to as IU) from that of other people or pets in the same bed (also referred to as UU), even though the respiration signal cannot be associated with individual users. The PUI block 312 can process each frame (or a set of frames) to determine a user classification and save the user classification results (user identification data) into a second data store 320 (e.g., DynamoDB labeled "PUT/Presence DDB"). The PUI results can be stored with the presence detection results (e.g., presence states) from the presence detection processing (e.g., presence detection block 314 of FIG. 3 or FIG. 4), as described in more detail below.

Presence Detection Processing
Presence Detection by Sleep-Monitoring Device

As described above with respect to FIG. 5, the sleep-monitoring device 106 can perform some presence detection to determine when to start streaming radar data to the cloud computing system 502 and when to stop streaming radar data to the cloud. In at least one embodiment, the sleep-monitoring device 106 can implement a presence detection algorithm that can automatically start or stop streaming data of a sleep session without express user input. As described above, in the context of sleep sessions, there is a challenge in determining when to start and stop streaming the radar data. The presence detection algorithm can be used for this purpose. The presence detection algorithm can be implemented in a separate pipeline in an end-to-end implementation. In at least one embodiment, the presence detection algorithm can use a period, such as a bedtime window (e.g., 10 pm-12 am). The user can input or select a time range for the bedtime window. The presence detection algorithm can prevent the sending of data outside this period. That is, the presence detection algorithm can ensure that only streaming occurs within this window.

The presence detection algorithm can receive radar input data generated by the radar unit 104 of the sleep-monitoring device 106. The radar input data can include the breathing waveform of a body voxel, the range (e.g., x, y, z coordinates) of the body voxel, a confidence level associated with the body voxel, an activity level of the body voxel, out-of-bed indicator (OOBI) information, and a breathing score. As described above, the breathing score data represents how closely the breathing data, reported by the radar unit 104, represents a human breathing waveform. The breathing score data can factor in RPM variances and confidence levels as inputs. In some instances, the breathing score is referred to herein as LSM or LSM value. A 3D cartesian space around the radar unit 104 is divided into voxels (e.g., 10 cm×10 cm×10 cm). In simple terms, a body voxel or simply voxel is the 3D version of a pixel. The range of the body voxel is the distance (e.g., x, y, z distance) between the radar unit and the voxel. The presence detection algorithm can also receive input configuration parameters. The input configuration parameters can include a scaling window size (e.g., 50), a window size (e.g., 1700), a first threshold representing a peak-to-peak (P2P) value voting threshold (e.g., 200), a minimum confidence threshold (e.g., 0.2), a minimum range threshold (e.g., 0.22), a minimum confidence threshold (e.g., 0.5), a minimum range threshold (e.g., 0.5), a lower limit of the P2P waveform (e.g., 0.7) and an upper limit of the P2P waveform (e.g., 45), a lower limit of the infinite impulse response (IIR) filtered range (0.21) and an upper limit of the IIR filtered range (e.g., 1.5), and IIR filter conf alpha (e.g., 0.9915).

Using radar input data and input configuration parameters, the presence detection algorithm can determine whether there is a first event or a second event. In response to the first event (e.g., an intent to sleep event), the presence detection algorithm sends the radar data stream to the cloud service 136 (e.g., cloud computing system 502). In some cases, the presence detection algorithm can send an indication of the first event to the cloud service 136. This indication can be a marker of a start of a sleep session. In response to the second event (e.g., an end of the intent to sleep event), the presence detection algorithm prohibits sending the radar data stream to the cloud service 136. In some cases, the presence detection algorithm can send an indication of the second event to the cloud service 136. This indication can be a marker of an end of the sleep session.

In at least one embodiment, the radar unit can generate radar input data 104. The radar unit 104 can generate breathing data after locking onto a voxel with the highest score. In addition, there are different metrics available from the digital signal processor (DSP) of the radar unit 104, such as the range of a voxel (x, y, and z), confidence level, activity, Out-of-bed Indicator, respirations per minute (RPMs) of the breathing waveform, RPM variance, LSM (breathing score). It should be noted that the radar unit 104 can output the breathing data (and its corresponding characteristics) to be used as the primary metric to detect a presence of the user, an absence of the user, an intent to sleep, and/or an end to the intent to sleep. The breathing data can be used as a direct indicator of the presence of a human. In this primary metric, the goal is to separate direct current (DC) (baseline) versus the presence of some breathing signal. Multiple post-processed metrics can be used, such as waveform peak-to-peak (P2P) values, absolute values of the breathing waveform, power of the breathing waveform, RPMs of the breathing waveform, RPM variance, confidence levels, and the like. In at least one embodiment, the P2P values of the breathing data can be the simplest to implement and can separate DC from the presence of a breathing signal.

Even separating the DC from the presence of a breathing signal is a strong indicator, it may not be enough to qualify the presence. For example, a periodic signal within 4-40 RPM may not be filtered out by the radar unit's DSP and can be misinterpreted as presence. The additional metric, called confidence level or confidence values, can be used to separate noise from actual breathing waveform. Even after filtering based on confidence level, there may be some cases where the confidence level is high for a noisy waveform. The radar unit can lock onto a noisy voxel very close to the radar unit in the absence of any high-scoring target voxel. In this case, the radar unit could start tracking voxels from a range of 0.2 m to 1.7 m. The range information can help qualify the presence. For example, if a voxel of 0.21 m or lower is continuously tracked, this can be safely ignored as a noisy voxel. The radar unit can also provide breathing score data. As described above, the breathing score data represents how closely the breathing data, reported by the radar unit 104, represents a human breathing waveform. The breathing score data can factor in RPM variances and confidence levels as inputs. In some instances, the breathing score is referred to herein as LSM or LSM value.

As described herein, the sleep-monitoring device 106 can implement a presence detection algorithm to enable the automatic starting and stopping of a sleep session. The contactless sleep-monitoring device can continuously monitor an environment, so the presence detection algorithm can be used to stream only sleep session data to the cloud service (e.g., one or more cloud pipelines to process the sleep session data. In some embodiments, the sleep-monitoring device can be implemented in three parts: pre-processing, presence detection, and auto-start/stop detection. For pre-processing, the raw breathing data can be first scaled by removing the mean over a moving window of N samples (e.g., 50 samples). The peak-to-peak values are then calculated of the scaled data, such as illustrated as waveforms in FIG. 15. For presence detection, the presence is detected if the scaled waveform peak-to-peak value is within a specified range between tuned thresholds (e.g., 0.7, 45) for more than X number of samples (e.g., 200 samples) in a window of Y samples (e.g., 1700 samples). Absence is detected in the vice versa case. For the auto-start/stop detection, the automatic start event is detected when presence is detected continuously for a first time window, such as 5 minutes. In some cases, a single frame (@10 fps) of absence will cause the auto-start event to not happen. The automatic stop event is detected when the absence is detected continuously for a second time window, such as 45 minutes. Different time windows can be used.

Presence Detection by Cloud Computing System

In another, the sleep-monitoring system (sleep processing logic 138) can implement a presence detection algorithm as one of the inputs to the reconciliation block 402, as described herein. A computing device can process different metrics generated by a digital signal processor (DSP) of the radar unit at a sampling rate (e.g., 10 frames per second), which corresponds to each sample at 100 milliseconds (ms). In some embodiments, the sleep-monitoring system can be implemented in three parts: preprocessing, presence detection, and auto-start/stop detection. For preprocessing, the raw breathing data can be first scaled by removing the mean over a moving window of N samples (e.g., 50 samples). The peak-to-peak values are then calculated of the scaled data, such as illustrated as waveforms in FIG. 15. For presence detection, the presence is detected if the scaled waveform peak-to-peak value is within a specified range between tuned thresholds (e.g., 0.7, 45) for more than X number of samples (e.g., 200 samples) in a window of Y samples (e.g., 1700 samples). Absence is detected in the vice versa case. For the auto-start/stop detection, the automatic start event is detected when presence is detected continuously for a first time window, such as 5 minutes. In some cases, a single frame (@10 fps) of absence will cause the auto-start event to not happen. The automatic stop event is detected when the absence is detected continuously for a second time window, such as 45 minutes. Different time windows can be used. An example process of the sleep-monitoring system is described below with respect to FIG. 14.

Figure 14:
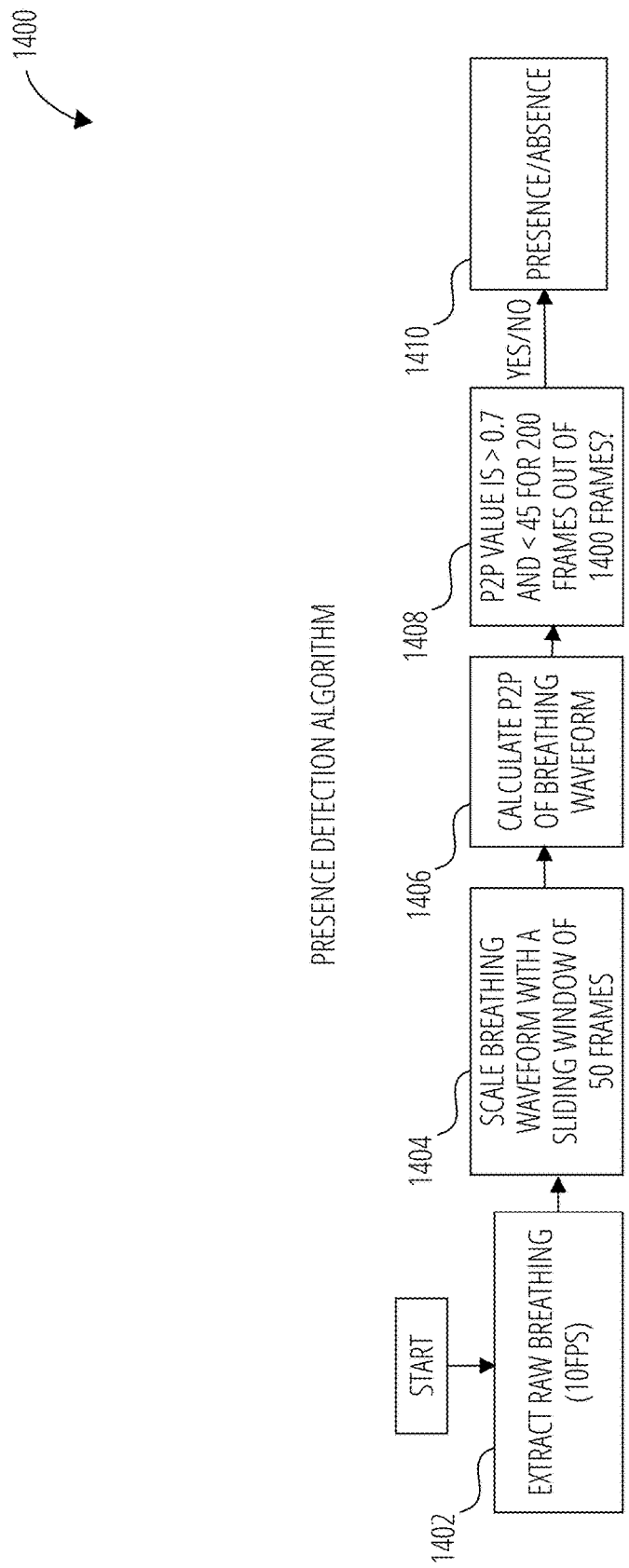
FIG. 14 is a flow diagram of a presence detection algorithm according to at least one embodiment.

FIG. 14 is a flow diagram of a presence detection algorithm 1400 according to at least one embodiment. The presence detection algorithm 1400 may be performed, at least in part, by processing logic that may include hardware (e.g., circuitry, dedicated logic, programmable logic, microcode, processing device, etc.), software (such as instructions run on a processing device, a general-purpose computer system, or a dedicated machine), firmware, microcode, or a combination thereof. The presence detection algorithm 1400 may be implemented, for example, by the sleep processing logic 138 in connection with the sleep-monitoring device 106 with the radar unit 104.

Figure 15:
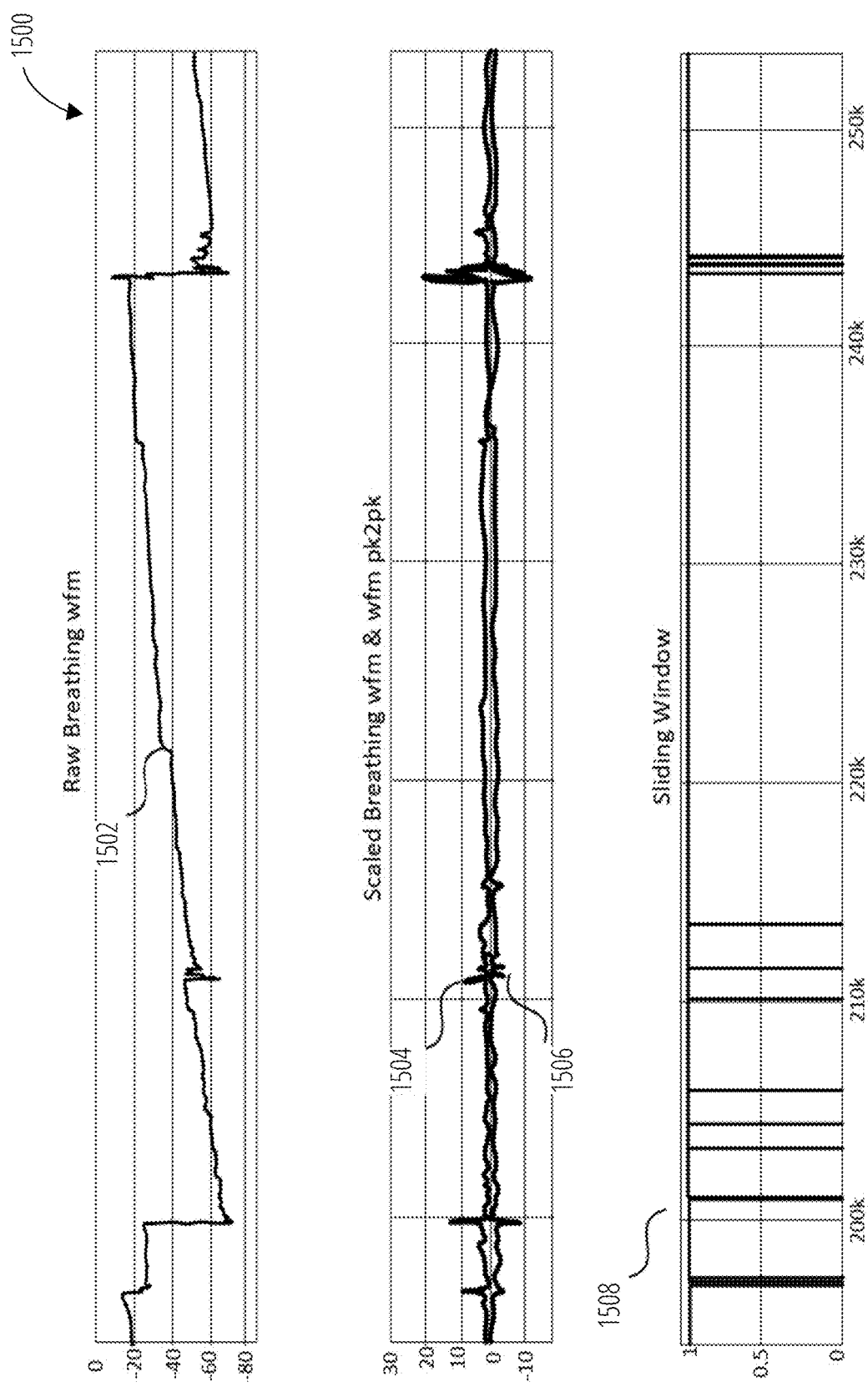
FIG. 15 is a graph illustrating scaling of a breathing waveform according to at least one embodiment.

The presence detection algorithm begins with the processing logic extracting raw breathing samples of the breathing data from the radar data (block 1402). The radar data can include a set of data frames, each data frame of the set of the data frames comprises raw breathing data. The breathing data can be sampled at a sampling rate (e.g., 10 frames per second). The processing logic, before determining P2P values, can scale the breathing data with a sliding window of a set number of frames (e.g., 50 frames) (block 1404). In some embodiments, the breathing data needs to be scaled because it has a moving DC offset, as shown in FIG. 15. The processing logic can calculate the P2P values of the breathing data (block 1406). The processing logic can determine if a first count of data frames in the set of data frames (e.g., 200) has a P2P value that satisfies a first criterion (block 1408). In at least one embodiment, the first criterion is that the first count exceeds a first threshold (e.g., 200 of 3000 frames) of a number of frames having a P2P value in a specified range, defined by a minimum threshold and a maximum threshold (e.g., P2P value is >0.7 and <45).

At block 1410, the processing logic can determine a presence or an absence of the user in response to the determination at block 1408. The presence or absence can be used to determine an intent to sleep. For example, if the user is continuously present for 5 minutes, an event representing an intent to sleep can be triggered. Similarly, if the user is continuously absent for 45 minutes, an event representing an end to the intent to sleep can be triggered. In at least one embodiment, when 200 of the 3000 frames indicate presence is detected at block 1408, the processing logic outputs a presence signal or an absence signal at block 1410.

FIG. 15 is a graph 1500 illustrating the scaling of breathing waveform according to at least one embodiment. The graph 1500 shows a raw breathing waveform 1502 over a period of time. The raw breathing waveform 1502 can include a moving DC offset. The processing logic can scale the raw breathing waveform 1502 with a sliding window 1508 of a set number of frames (e.g., 50 frames) to obtain a scaled breathing waveform 1504. The processing logic can also determine the P2P values of the scaled breathing waveform 1504 to obtain P2P breathing waveform 1506 (e.g., peak-to-peak values). The scaled breathing waveform 1504 and P2P breathing waveform 1506 remove the DC offset from the breathing waveform. As described above, the P2P values can be used with confidence level information (e.g., IIR confidence values) and range information (e.g., IIR range values), and breathing score information (e.g., IIR filter values) to detect an auto-start event or an auto-stop event, as described herein.

Figure 16:
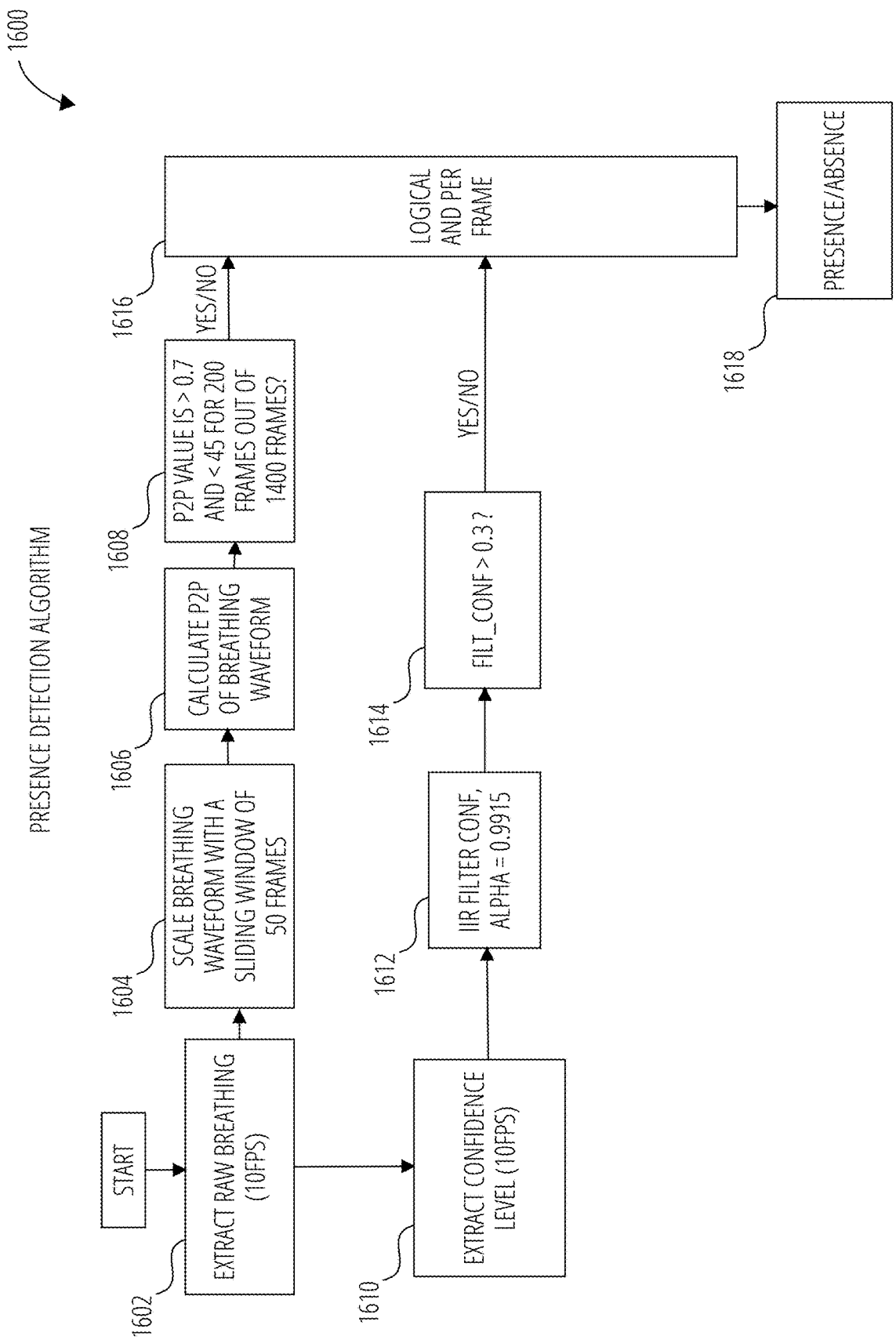
FIG. 16 is a flow diagram of a presence detection algorithm according to at least one embodiment.

FIG. 16 is a flow diagram of a presence detection algorithm 1600 according to at least one embodiment. The presence detection algorithm 1800 may be performed, at least in part, by processing logic that may include hardware (e.g., circuitry, dedicated logic, programmable logic, microcode, processing device, etc.), software (such as instructions run on a processing device, a general-purpose computer system, or a dedicated machine), firmware, microcode, or a combination thereof. The presence detection algorithm 1600 may be implemented, for example, by the sleep processing logic 138 in connection with the sleep-monitoring device 106 with the radar unit 104.

The presence detection algorithm 1600 begins with the processing logic extracting raw breathing samples of the breathing data from the radar data (block 1602). The radar data can include a set of data frames, each data frame of the set of the data frames comprises i) raw breathing data, and ii) a confidence value. The breathing data can be sampled at a sampling rate (e.g., 10 frames per second). Before determining P2P values, the processing logic can scale the breathing data with a sliding window of a set number of frames (e.g., 50 frames) (block 1604). In some embodiments, the breathing data needs to be scaled because it has a moving DC offset, as shown in FIG. 15. The processing logic can calculate the P2P values of the breathing data (block 1606). The processing logic can determine if a first count of data frames in the set of data frames has a P2P value that satisfies a first criterion (block 1608). In at least one embodiment, the first criterion is that the first count exceeds a first threshold (e.g., 200 of 3000 frames) of a number of frames having a P2P value in a specified range, defined by a minimum threshold and a maximum threshold (e.g., P2P value is >0.7 and <45).

At block 1610, the processing logic extracts the confidence values from the radar data. The processing logic can determine an IIR confidence value (block 1612) (e.g., alpha=0.9915). The confidence values can be sampled at a sampling rate (e.g., 10 frames per second). The processing logic determines whether the data frame has an IIR confidence value that satisfies a second criterion (block 1614). In at least one embodiment, the second criterion is that the IIR confidence value is greater than a second threshold (e.g., conf_wv_ll=0.3). As described herein, the IIR confidence value can be within a specified range, defined at least by a minimum threshold (e.g., conf_wv_ll=0.3).

At block 1616, the processing logic can determine a first event representing an intent to sleep by the user (e.g., the user entering the first region (presence/absence)) in response to the first criterion (e.g., the first count exceeding the first threshold) at block 1608 being satisfied and the second criterion (e.g., the IIR confidence value being greater than the second threshold) at block 1614 being satisfied. The processing logic can make this determination on a frame basis. When the first event is detected, the processing logic outputs a presence signal or an indication of the event or an absence signal (block 1618). The presence or absence can be used to determine an intent to sleep. For example, if the user is continuously present for 5 minutes, an event representing an intent to sleep can be triggered. Similarly, if the user is continuously absent for 45 minutes, an event representing an end to the intent to sleep can be triggered. As described above, the additional confidence metric can improve the presence decision at block 1616.

Figure 17:
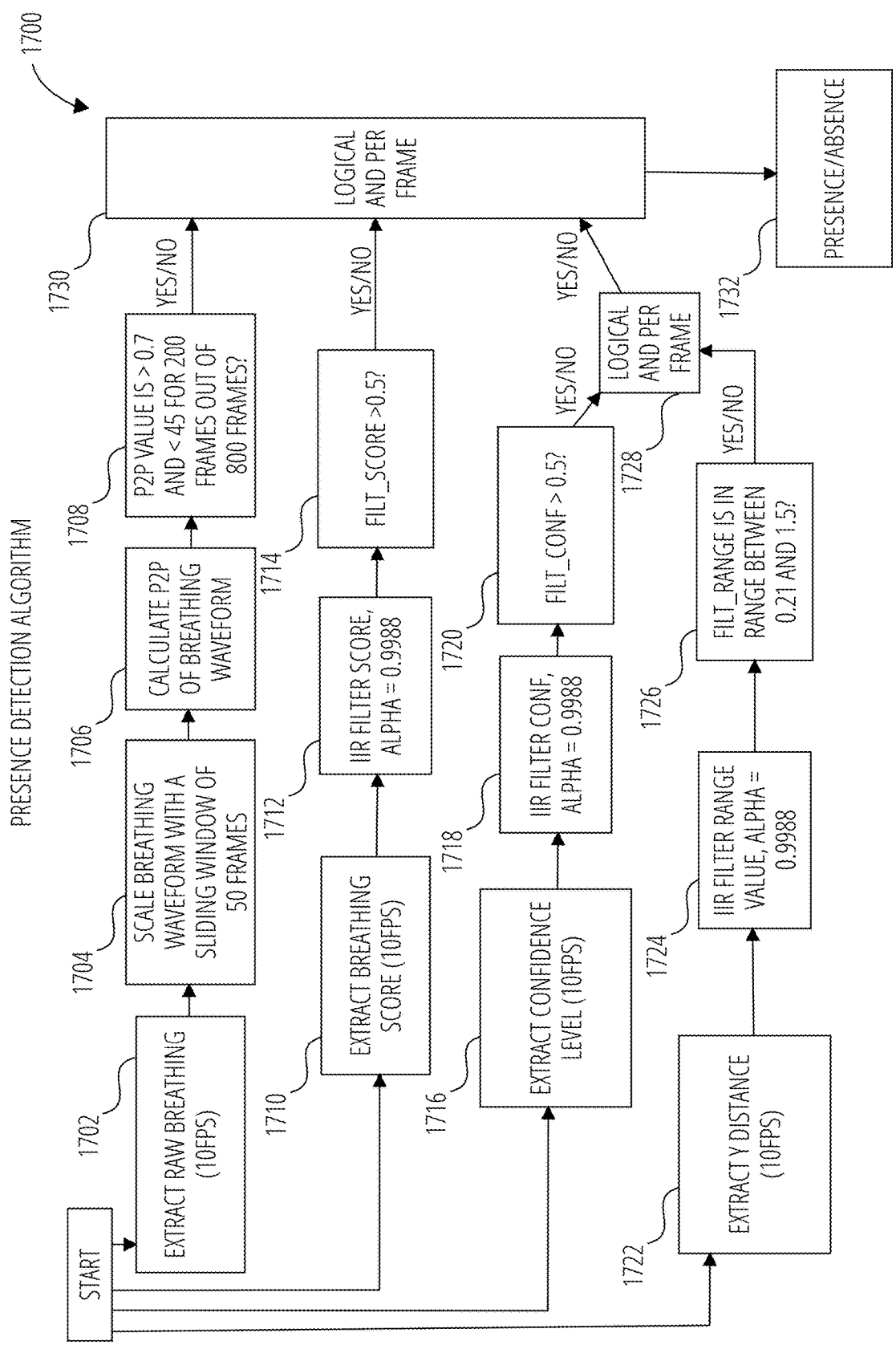
FIG. 17 is a flow diagram of a presence detection algorithm according to at least one embodiment.
Figure 18:
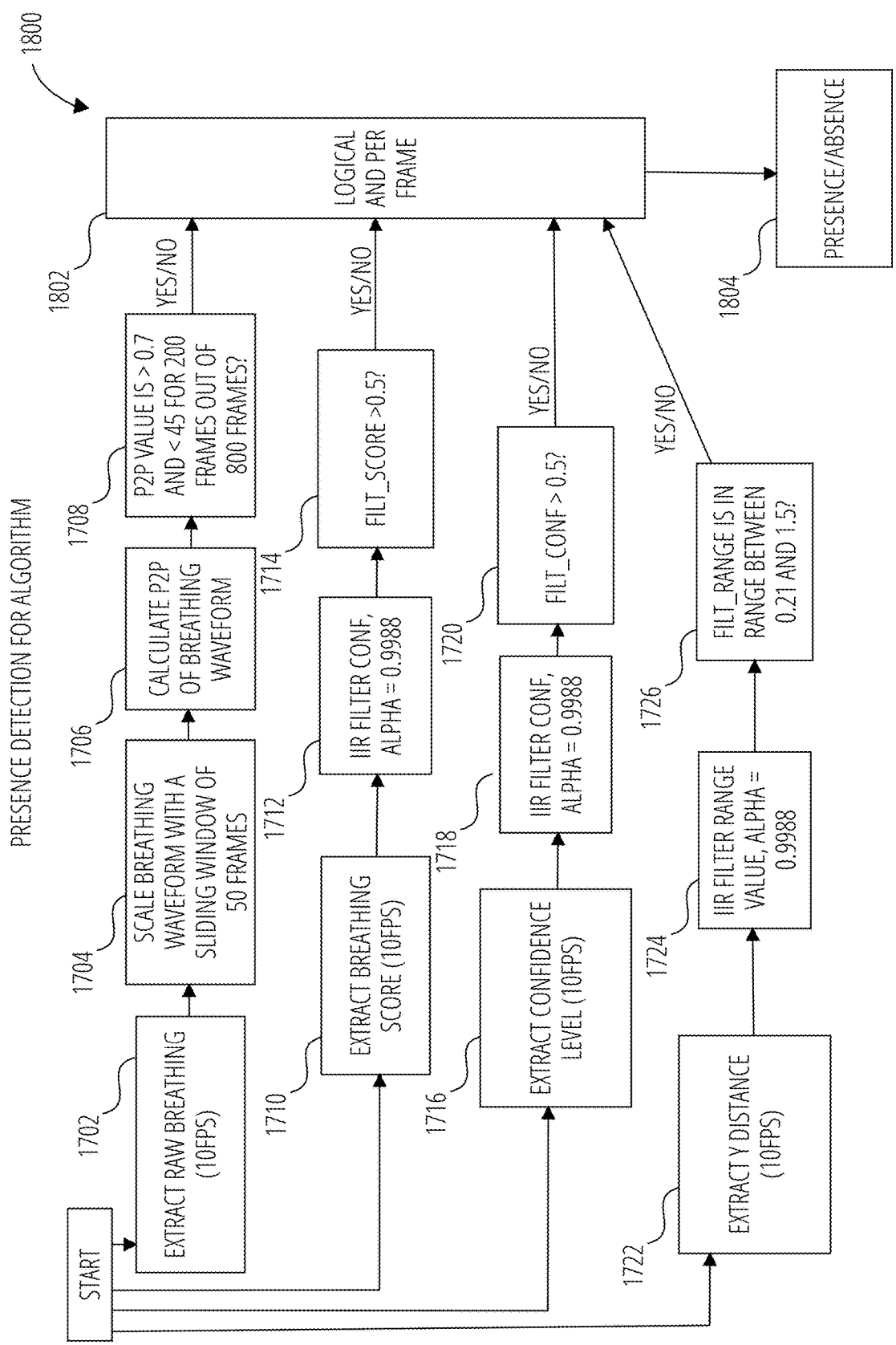
FIG. 18 is a flow diagram of a presence detection algorithm according to at least one embodiment.

In addition to the confidence metric, range and breathing score (LSM) can be used to further improve the presence detection decision, such as illustrated in FIG. 17 and FIG. 18.

FIG. 17 is a flow diagram of a presence detection algorithm 1700 according to at least one embodiment. The presence detection algorithm 1700 may be performed, at least in part, by processing logic that may include hardware (e.g., circuitry, dedicated logic, programmable logic, microcode, processing device, etc.), software (such as instructions run on a processing device, a general-purpose computer system, or a dedicated machine), firmware, microcode, or a combination thereof. The presence detection algorithm 1700 may be implemented, for example, by the sleep processing logic 138 in connection with the sleep-monitoring device 106 with the radar unit 104.

The presence detection algorithm 1700 begins with the processing logic extracting raw breathing samples of the breathing data from the radar data (block 1702). The radar data can include a set of data frames, each data frame of the set of the data frames comprises i) raw breathing data, ii) a range value, iii) a confidence value, and iv) a breathing score (LSM value). The breathing data can be sampled at a sampling rate (e.g., 10 frames per second). The processing logic can scale the breathing data with a sliding window of a set number of frames (e.g., 50 frames) (block 1704). In some embodiments, the breathing data needs to be scaled because it has a moving DC offset, as shown in FIG. 15. The processing logic can calculate the P2P values of the breathing data (block 1706). The processing logic can determine if a first count of data frames in the set of data frames has a P2P value that satisfies a first criterion (block 1708). In at least one embodiment, the first criterion is that the first count exceeds a first threshold (e.g., 200 of 1700 frames) of a number of frames having a P2P value in a specified range, defined by a minimum threshold and a maximum threshold (e.g., P2P value is >0.7 and <45).

At block 1710, the processing logic extracts the breathing score from the radar data. The processing logic can determine an IIR filter score (block 1712) (e.g., alpha=0.9915). The breathing data can be sampled at a sampling rate (e.g., 10 frames per second). The processing logic determines whether the data frame has an IIR filter score that satisfies a second criterion (block 1714). In at least one embodiment, the second criterion is that the IIR filter score is greater than a second threshold (e.g., lsm_wv_ll=0.5). As described herein, the IIR filter score can be within a specified range, defined at least by a minimum threshold (e.g., lsm_wv_ll=0.5).

At block 1716, the processing logic extracts the confidence values from the radar data. The processing logic can determine an IIR confidence value (block 1718) (e.g., alpha=0.9915). The confidence values can be sampled at a sampling rate (e.g., 10 frames per second). The processing logic determines whether the data frame has an IIR confidence value that satisfies a third criterion (block 1720). In at least one embodiment, the third criterion is that the IIR confidence value is greater than a third threshold (e.g., conf_wv_ll=0.5). As described herein, the IIR confidence value can be within a specified range, defined at least by a minimum threshold (e.g., conf_wv_ll=0.5).

At block 1722, the processing logic extracts the range values (y distance) values from the radar data. The range values can be sampled at a sampling rate (e.g., 10 frames per second). The processing logic can determine an IIR range value (block 1724) (e.g., alpha=0.9915). The processing logic determines whether the data frame has an IIR range value that satisfies a fourth criterion (block 1726). In at least one embodiment, the fourth criterion is that the IIR range value is greater than a fourth threshold (e.g., range_wv_ll=0.21). As described herein, the IIR confidence value can be within a specified range, defined at least by a minimum threshold or lower level (e.g., range_wv_ll=0.21) and a maximum threshold or upper level (e.g., range_wv_hl=1.5).

In this embodiment, the processing logic determines a fifth criterion responsive to the data frame having an IIR confidence value that satisfies the third criterion and the IIR range value that satisfies the fourth criterion (block 1728).

At block 1730, the processing logic can determine a first event representing an intent to sleep by the user (e.g., the user entering the first region (presence/absence)) in response to the first criterion (e.g., the first count exceeding the first threshold) at block 1708 being satisfied, the second criterion (e.g., the IIR filter value being greater than the second threshold) at block 1714 being satisfied, and the fifth criterion at block 1728 being satisfied. The processing logic can make this determination on a frame basis. When the first event is detected, the processing logic outputs a presence signal or an indication of the event or an absence signal (block 1732). The presence or absence can be used to determine an intent to sleep. For example, if the user is continuously present for 5 minutes, an event representing an intent to sleep can be triggered. Similarly, if the user is continuously absent for 45 minutes, an event representing an end to the intent to sleep can be triggered. As described above, the additional confidence metric can improve the presence decision at block 1732, as illustrated in FIG. 33 and FIG. 34.

FIG. 18 is a flow diagram of a presence detection algorithm 1800 according to at least one embodiment. The presence detection algorithm 1800 may be performed, at least in part, by processing logic that may include hardware (e.g., circuitry, dedicated logic, programmable logic, microcode, processing device, etc.), software (such as instructions run on a processing device, a general-purpose computer system, or a dedicated machine), firmware, microcode, or a combination thereof. The presence detection algorithm 1800 may be implemented, for example, by the sleep processing logic 138 in connection with the sleep-monitoring device 106 with the radar unit 104.

The presence detection algorithm 1800 is similar to the presence detection algorithm 1700, as noted by similar reference numbers, except presence detection algorithm 1800 does not use a fifth criterion as presence detection algorithm 1700. In particular, at block 1802, the processing logic can determine a first event representing an intent to sleep by the user (e.g., the user entering the first region (presence/absence)) in response to the first criterion (e.g., the first count exceeding the first threshold) at block 1708 being satisfied, the second criterion (e.g., the IIR filter value being greater than the second threshold) at block 1714 being satisfied, the third criterion (e.g., IIR confidence value is greater than a third threshold) at block 1720 being satisfied, and the fourth criterion (e.g., IIR range value is greater than a third threshold) at block 1726 being satisfied. The processing logic can make this determination on a frame basis. When the first event is detected, the processing logic outputs a presence signal or an indication of the event or an absence signal (block 1804). The presence or absence can be used to determine an intent to sleep. For example, if the user is continuously present for 5 minutes, an event representing an intent to sleep can be triggered. Similarly, if the user is continuously absent for 45 minutes, an event representing an end to the intent to sleep can be triggered.

In at least one embodiment, the presence detection processing can be performed by the presence detection block 314. As described above, the presence detection block 314 can detect a presence of any user in the environment. The presence detection block 314 can process each frame (or a set of frames) to determine a presence classification and save the presence classification results into the second data store 320 (e.g., DynamoDB labeled "PUT/Presence DDB"). The presence detection results can be stored with the PUI results. As described above, the presence detection results and PUI results can be used to reconcile sleep-stage classifications determined by the sleep-stage classification processing logic (e.g., sleep-stage classification block 310 of FIG. 3 or FIG. 4, block 518 of FIG. 5), as described in more detail below.

Sleep-Stage Classification Processing

As described above, the sleep-stage classification processing (e.g., block 518 of FIG. 5) can be performed by sleep-stage classification logic (e.g., sleep-stage classification block 310 of FIG. 3 or FIG. 4). The sleep-stage classification logic can predict a user's sleep stages (e.g., light, deep, or REM) and awakenings from respiration-driven movement signals. The sleep-stage classification logic can process each frame (or a set of frames) to determine a sleep stage and save the sleep-stage classification results into a first data store 318 (e.g., DynamoDB labeled "SleepPrediction DDB"). The sleep-stage classifications can be used as inputs to the reconciliation block 402, as described in more detail below. In at least one embodiment, the sleep-stage classification logic takes in pre-processed breathing signal in 10-minute chunks and predicts a sleep stage for every 30-seconds, called an epoch in the sleep domain, using a machine learning (ML) model (also referred to as sleep-stage classifier). For every 10 minutes of signal, the sleep-stage classification logic can produce 20 sleep-stage classifications (e.g., sleep-stage predictions), as illustrated in FIG. 19.

Figure 19:
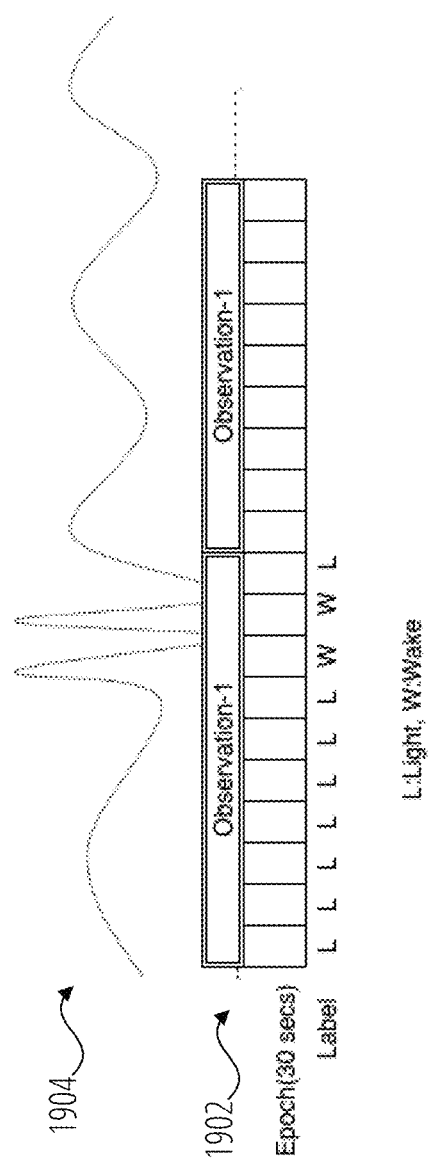
FIG. 19 illustrates a set of sleep-stage classifications of a pre-processed breathing signal according to at least one embodiment.

FIG. 19 illustrates a set of sleep-stage classifications 1902 of a pre-processed breathing signal 1904 according to at least one embodiment. The sleep-stage classification logic can use the ML model to predict the set of sleep-stage classifications 1902 based on features of the pre-processed breathing signal 1904. As described above, one sleep-stage classification is made for every epoch, resulting in 20 sleep-stage classifications over 10 minutes, or 10 sleep-stage classifications for an observation window corresponding to 5 minutes of data. As illustrated in FIG. 19, the set of sleep-stage classifications 1902 includes various light-sleep classifications (labeled with L) and a couple of awake classifications (labeled with W for "Wake").

In at least one embodiment, the radar data includes first data representing breathing associated with the user in a first time period. The sleep-stage classification processing logic can determine, using the ML model and the first data, a first sleep-stage classification of a first portion of the radar data corresponding to a first time period (e.g., epoch). The first sleep-stage classification can be one of an awake class, a light-sleep class, a deep-sleep class, or a rapid eye movement (REM) class. The radar data can include second data representing breathing associated with the user in a second time period after the first time period. The sleep-stage classification processing logic can determine, using the ML model and the second data, a second sleep-stage classification of a second portion of the radar data corresponding to a second time period after the first time period.

Figure 20:
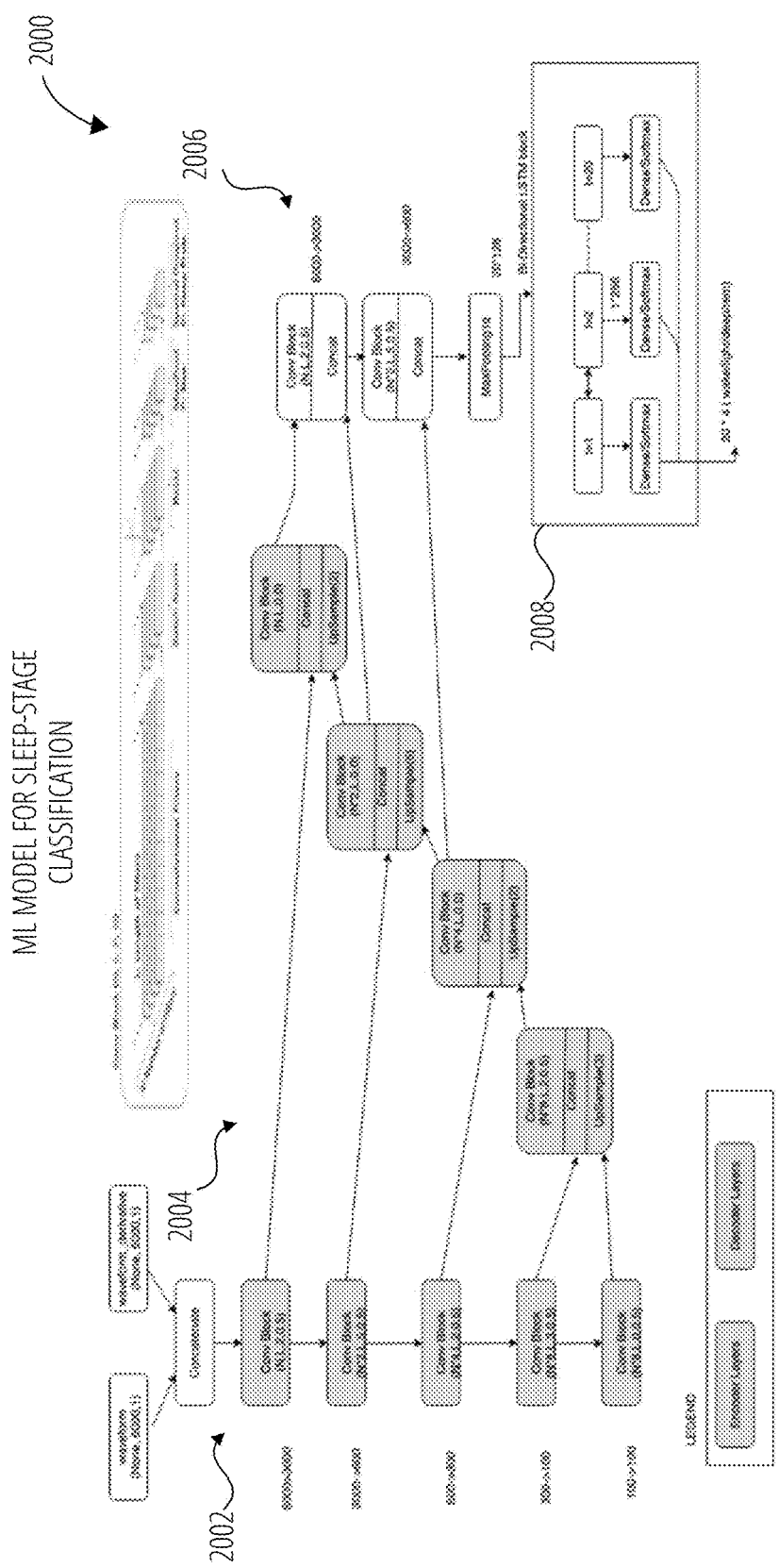
FIG. 20 illustrates an ML model for sleep-stage classification according to at least one embodiment.

In at least one embodiment, the ML model is a deep neural network with multiple layers, such as illustrated in FIG. 20.

FIG. 20 illustrates an ML model 2000 for sleep-stage classification according to at least one embodiment. In at least one embodiment, the sleep-stage classification logic can use the ML model 2000 to generate the sleep-stage data. In at least one embodiment, the ML model 2000 includes encoding layers with one or more convolution blocks 2002 to receive the first portion of the radar data and generate second data. The ML model 2000 includes decoding layers with one or more convolution blocks 2004 to receive the second data from the encoding layers to generate third data. The ML model 2000 includes pooling layers with one or more convolution blocks 2006 to receive the third data from the decoding layer and to generate fourth data. The ML model 2000 includes a bi-directional long short-term memory (LSTM) block 2008 to receive the fourth data and to output a sleep-stage classification.

In at least one embodiment, the ML model 2000 is implemented on top of a U-Net architecture (used in medical imaging systems), having a series of convolution layers stacked in an encoder-decode structure, as shown in FIG. 20. Each convolution block in the stack has a series of convolution, batch normalization, activation, and max-pool operations. Every convolution block in the decoder side uses encoder representation as a skip connection to reduce the loss of information. Unlike U-Net, the ML model 2000 has extended decoder layers with convolution blocks to create dense features to feed downstream sequence layers for adapting it to sleep-stage classification. The ML model 2000 introduces sequence layers to help the model understand the correlation between epochs in a 10-minute context. The ML model 2000, unlike U-Net, modifies inputs to take in a one-dimensional (1D) breathing signal instead of a 2D input. It should be noted that the sleep stages distribution for a sleep session (e.g., a night) is skewed towards a light-sleep class (e.g., 50%). In order to reduce bias during training, weights are added to the model loss function based on stage label distribution found in a training set. Once the ML model 2000 is trained, the ML model can be deployed as an inference method sleep-stage classifier. The inference method sleep-stage classifier can be called for a time when the user is present in bed or by some other trigger. The invocation of the classifier can happen every 10 minutes with the breathing waveform as an input signal, and predictions from the classifier are saved into the first data store 318

(SleepStagePredictions DDB). Persisted sleep stage classifications are then reconciled with intent to sleep and primary user tracking outputs and shown to a user in an application dashboard (app dashboard).

In at least one embodiment, the ML model 2000 needs only 10 minutes of a breathing signal to provide a sleep-stage classification. Clinically, sleep stage accuracy is evaluated with a Polysomnography (PSG)-ground truth device used for sleep tracking. The ML model 2000 can meet accuracy similar to an inter-scorer agreement between Polysomnography (PSG) based sleep stage annotators. In terms of customer experience, since there is no re-compute for a sleep session, the sleep stage prediction for the majority of the session remains consistent when a user sees the hypnogram from the app dashboard every time. Although the ML model 2000 uses 10 minutes of breathing signal data, in other embodiments, the ML model 2000 can be run every 5 minutes using historical 5-minute data appended. The ML model 2000 can enable real-time capabilities like smart alarms, routines, and the like. The ML model 2000 can also be flexible to adapt to different sensing technologies, like ultrasound. The ultrasound data needed for classification can be less than radar data.

In at least one embodiment, the ML model 2000 is trained as a two-step process in which there is pre-training with an open source Polysomnography (PSG) dataset from National Sleep Research Resource (NSRR) to obtain a pre-trained model. The pre-trained model is then adapted with a radar dataset accumulated from a sleep clinic and/or in-home data collection. In at least one embodiment, in order to make sure the model does not unlearn weights from PSG pre-training, only the encoder portion of the model was trained, while the decoder and downstream sequence layers were frozen.

Intent to Sleep Classification

The sleep-monitoring system starts collecting data and predicting sleep states based on presence. However, the hypnogram that is ultimately shown to the user should start when they are ready to try to fall asleep—it should not contain the time that the user is in bed but actively watching TV, talking to their partner, reading a book, etc. Likewise, the hypnogram should end when the user no longer wants to sleep anymore. For example, if, in the morning, the user sits up and browses their phone, that time should be excluded as well. These sorts of activities are not well captured by the sleep-state classifier alone since the sleep-state classifier cannot make a distinction between awake and engaged in other activities and awake and intending to sleep. The intent-to-sleep window is not well-captured by data from polysomnography (PSG) experiments either. In PSG experiments, there exists a related concept called "lights out," which is the time at which the sleep expert instructs the participant to begin attempting to fall asleep, but it does not translate well to real-world scenarios because the PSG experimental setting is so contrived. In at least one embodiment, a separate classifier, called an intent-to-sleep classifier, can be used to classify an activity where the user is ready to fall asleep, as distinguished from other activities like watching TV, sitting in bed, reading a book, or the like.

In at least one embodiment, the intent-to-sleep classification (block 522 of FIG. 5) can be performed by intent-to-sleep classification processing logic (e.g., intent-to-sleep classification block 316 of FIG. 3 or FIG. 4). In at least one embodiment, the intent-to-sleep classification processing logic uses an ML model, such as an intent-to-sleep classifier that detects a first event when the user first starts trying to sleep and distinguishes that attempt from other in-bed activities, such reading or watching TV. The first event can be used to accurately measure the time it takes to fall asleep, which is an important indicator of sleep health. The intent-to-sleep classifier (e.g., intent-to-sleep classification block 316) can process each frame (or a set of frames) to determine an intent-to-sleep classification and save the intent-to-sleep classification results into a third data store 322 (e.g., DynamoDB labeled "IntentToSleep DDB").

In at least one embodiment, the intent-to-sleep classification processing logic receives the radar data, including: i) first information representing one or more frequency components of data representing breathing associated with the user; ii) second information representing statistics of motion levels (e.g., average, mean, standard deviation, variance, or other statistical metrics) associated with the user; and iii) third information representing range values, each range value representing a physical distance between the user and the sleep-monitoring device. The intent-to-sleep classification processing logic determines, using an ML model (e.g., intent-to-sleep classifier, a first probability score of sleep activity of the user corresponding to a first time period based on the first information, the second information, and the third information corresponding to the first time period. The intent-to-sleep classification processing logic determines, using the ML, a second probability score of sleep activity of the user corresponding to a second time period, based on the first information, the second information, and the third information corresponding to the second time period. The second time period is after the first time period.

In at least one embodiment, the intent-to-sleep classifier is trained to estimate a probability score of a user's activity that represents an intent to sleep (e.g., a positive label) in any 30-second window given certain features. The training data can be historical sleep data that has been annotated with the binary labels to indicate, at every 30-second interval, whether the user is fully awake (0) or already within the intent-to-sleep window (1). The output, probability scores of the positive label, is referred to as intent-to-sleep (ITS) probabilities. The features can include the first components of the spectrogram of the breathing waveform, statistics about the activity level in bed, and the range from the sleep-monitoring device. In at least one embodiment, the statistical method used for the ML model for the intent-to-sleep classifications is random forests. That is, in at least one embodiment, the ML model is a random forest classification model. In at least one embodiment, once this model is deployed, the ITS probability is computed for every 30-sec epoch given a binary file containing approximately five minutes of data. This data, including the ITS probabilities, is stored in the third data store 322 (e.g., "IntentToSleepDDB") and persists until reconciliation processing, which can use these probabilities to find out a start cutoff (start sleep session) and an end cutoff (end sleep session) for hypnogram generation. In at least one embodiment, a change-point detection heuristic can be used to find the start and cutoffs.

Reconciliation & Trimming

Reconciliation is the process of applying a sequence of post-processing steps to the outputs that are computed by each processing logic/processing component above. This is necessary because each component processes the raw device data independently and in parallel, which is efficient from both computation and organizational points of view but may cause the outputs to disagree. For example, the sleep-stage prediction component may predict that the user that it is tracking is going through light sleep, but the PUI component may indicate that this prediction actually belongs to the unintended user; in reconciliation, the processing logic can trim and relabel portions of the sleep predictions to produce a sensible hypnogram.

In at least one embodiment, the reconciliation processing (block 520 of FIG. 5) can be performed by reconciliation processing logic (e.g., reconciliation block 402 of FIG. 4 and/or trimming block 404 of FIG. 4). In at least one embodiment, the reconciliation processing logic can perform the following three steps sequentially: pre-processing that deals with gaps and overlaps in raw predictions (Step 1), reconciliation between sleep-stage classifications, user classifications, and presence classifications (Step 2), and trimming and additional adjustments (Step 3). In other embodiments, the steps can be re-organized or replaced to accommodate current or future requirements.

Step 1: Pre-Processing Deals with Gaps and Overlaps in Raw Predictions

Overlaps: for all data sources, whenever there is overlapping information about a particular time, we favor the information whose end point is later. "Small" gaps are imputed using the information from the next chunk by extending its start time back to the end time of the last chunk. "Small" gaps can be defined as segments in sleep data that are less than 30 seconds (<30 s) for sleep-stage classifications and segments that are less than five seconds (<5 s) for user classifications. "Large" gaps for sleep-stage classifications can be defined as segments in sleep data that are greater than 30 seconds (>30 s). Large gaps can be filled as unknown. "Large" gaps in user classifications can be defined as segments that are greater than five seconds (>5 s). The large gaps in user classifications can cause an exception to be raised. In at least one embodiment, any gaps in presence data can be filled with True/Present regardless of their size.

Figure 21:
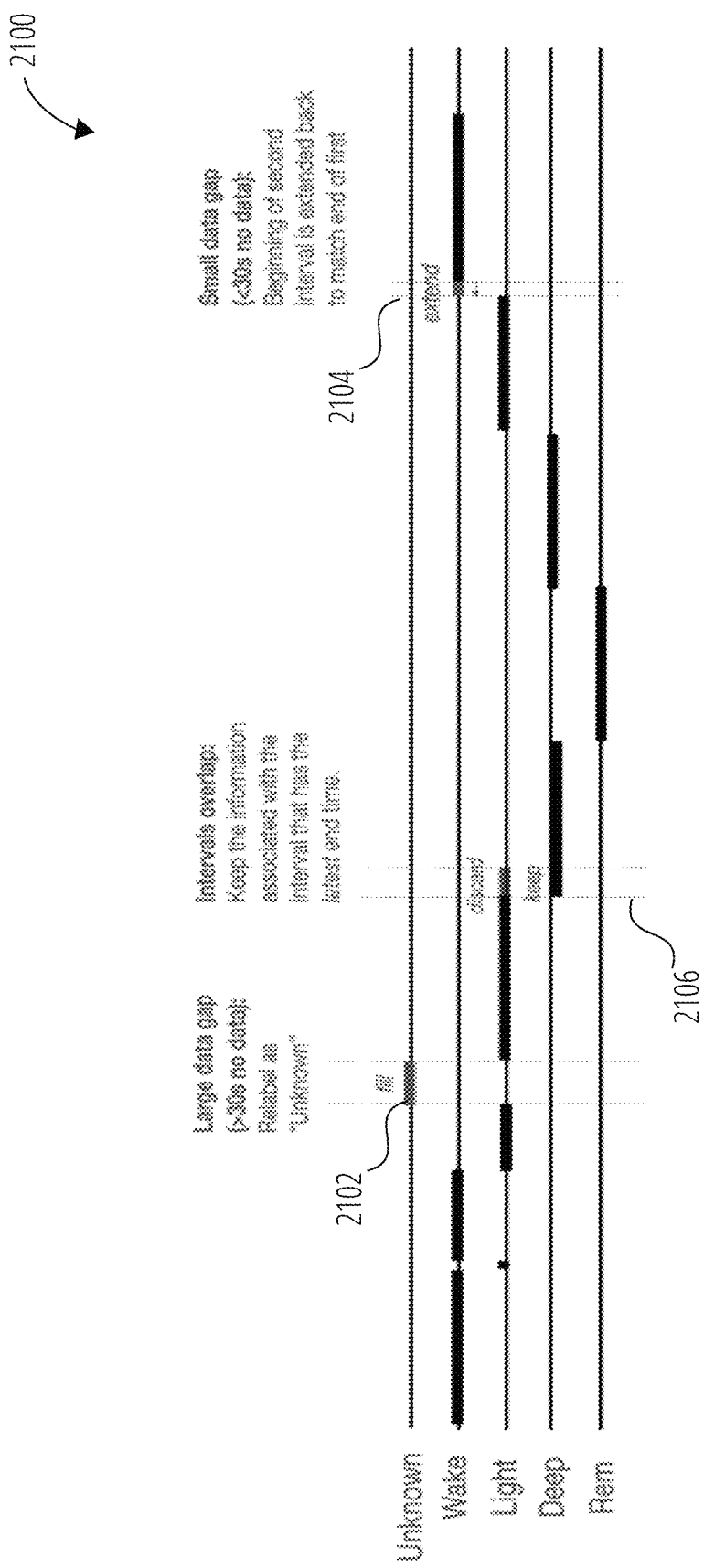
FIG. 21 shows examples of a large gap, a small gap, and an interval overlap in sleep-stage data according to at least one embodiment.

FIG. 21 shows examples of a large gap, a small gap, and an interval overlap in sleep-stage data 2100 according to at least one embodiment. The sleep-stage data 2100 includes a large data gap 2102. The large data gap 2102 is a segment in the sleep-stage data 2100 that does not have a classification for 30 seconds or more. As described above, the large data gap 2102 can be relabeled by the reconciliation processing logic with an unknown state to fill the large data gap 2102. The sleep-stage data 2100 includes a small data gap 2104. The small data gap 2104 is a segment in the sleep-stage data 2100 that does not have a classification for 30 seconds or less. As described above, the small data gap 2104 can be extended from one of the adjacent classifications by the reconciliation processing logic. In at least one embodiment, the beginning of a second segment (second interval) is extended to align with the end of a first segment (first interval). In the illustrated example, the awake classification is extended to fill the gap with the light-sleep classification. The sleep-stage data 2100 includes intervals overlap 2106. The intervals overlap 2106 occurs when there are two classifications during a period of time. In at least one embodiment, the intervals overlap 2106 can be remedied by discarding a portion of one of the two overlapping segments. In at least one embodiment, the segment (interval) with the latest end time can be maintained, and the other segment (interval without the latest end time) can be discarded. In the illustrated example, the light-sleep classification for the intervals overlap 2106 is discarded, and the later segment of the deep-sleep classification is kept. The reconciliation processing logic can perform the identifying, discarding, relabeling, changing classifications, or the like.

Figure 22:
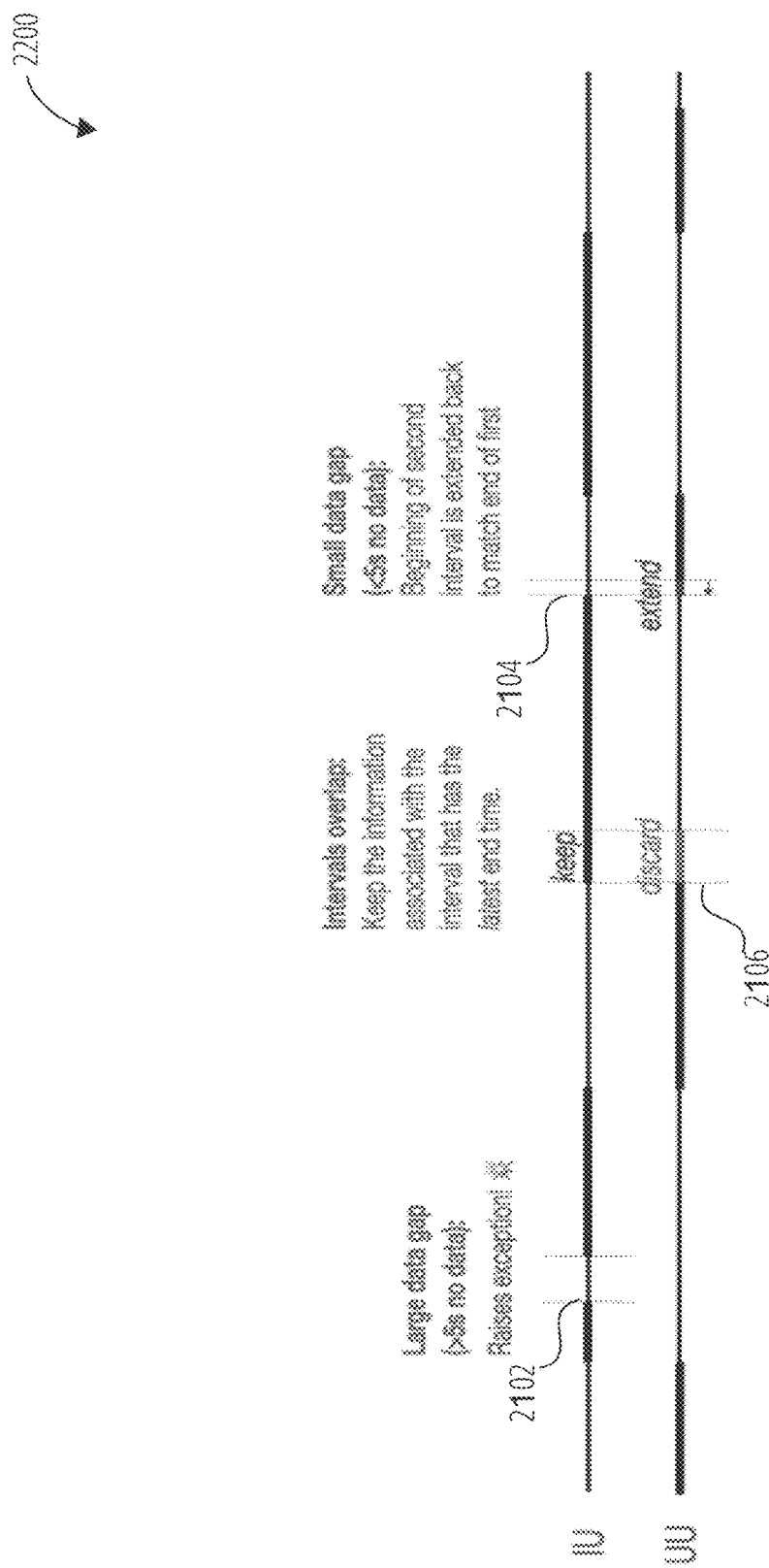
FIG. 22 shows examples of a large gap, a small gap, and an interval overlap in user identification data according to at least one embodiment.

FIG. 22 shows examples of a large gap, a small gap, and an interval overlap in user identification data 2200 according to at least one embodiment. The user identification data 2200 includes a large data gap 2102. The large data gap 2102 is a segment in the user identification data 2200 that does not have a classification for 5 seconds or more. As described above, the large data gap 2102 can raise an exception. The user identification data 2200 includes a small data gap 2104. The small data gap 2104 is a segment in the user identification data 2200 that does not have a classification for 5 seconds or less. As described above, the small data gap 2104 can be extended from one of the adjacent classifications by the reconciliation processing logic. In at least one embodiment, the beginning of a second segment (second interval) is extended to align with the end of a first segment (first interval). In the illustrated example, the UU classification is extended to fill the gap with the IU classification. The user identification data 2200 includes intervals overlap 2106. The intervals overlap 2106 occurs when there are two classifications during a period of time. In at least one embodiment, the intervals overlap 2106 can be remedied by discarding a portion of one of the two overlapping segments by the reconciliation processing logic. In at least one embodiment, the segment (interval) with the latest end time can be maintained, and the other segment (interval without the latest end time) can be discarded by the reconciliation processing logic. In the illustrated example, the UU classification for the intervals overlap 2106 is discarded, and the later segment of the IU classification is kept. The reconciliation processing logic can perform the identifying, discarding, relabeling, changing classifications, or the like Step 2: Reconciliation Between Sleep, PUT, and Presence Data In at least one embodiment, the reconciliation processing logic can adjust sleep-stage boundaries in the sleep-stage data. For a left boundary (first boundary), the reconciliation processing logic can determine a first time where the user classification is an IU (PUI=UI) in the user identification data and a second time where the presence classification is true (Presence=True) in the presence data. The reconciliation processing logic can discard any portion of the hypnogram before the latest of these two times. For a right boundary (second boundary), the reconciliation processing logic can determine a last time where the user classification is an IU (PUT=IU), and a last time where the presence classification is true (Presence=True). The reconciliation processing logic can discard any portion of the hypnogram after the earliest of these two points. In at least one embodiment, the reconciliation processing logic can relabel any sleep-stage classifications to an awake class (AWAKE) if the user classification is a UU (PUI=UU) or the presence classification is false (Presence=False).

Figure 23:
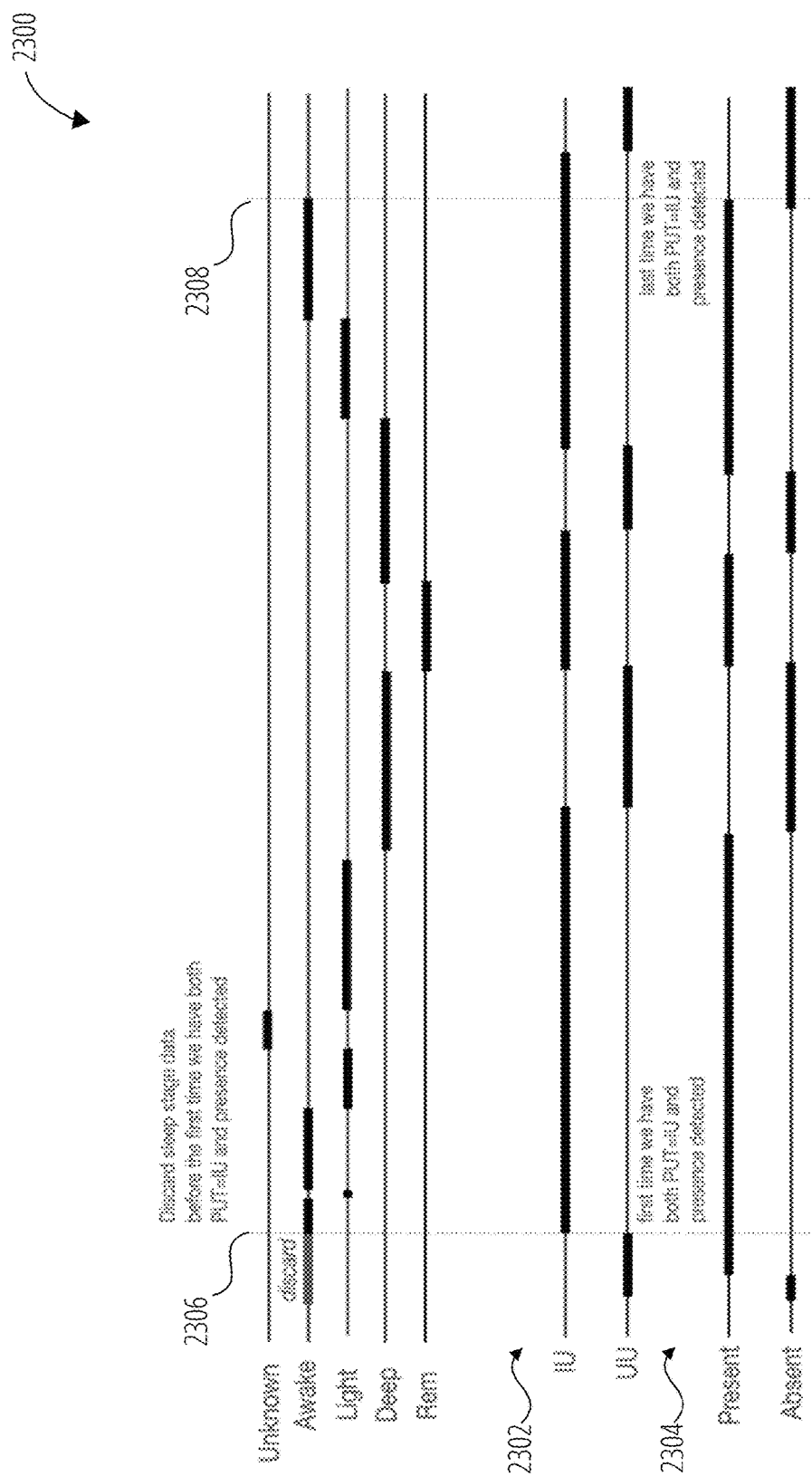
FIG. 23 shows boundaries being determined in sleep-stage data using user identification data and presence data according to at least one embodiment.

FIG. 23 shows boundaries being determined in sleep-stage data 2300 using user identification data 2302 and presence data 2304 according to at least one embodiment. The reconciliation processing logic determines a first boundary 2306 of the sleep-stage data 2300 by determining a first time at which the presence data 2304 identifies a presence of any user (Presence=True) and the user identification data identifies the IU (PUI=IU). The reconciliation processing logic can discard a first portion of the sleep-stage data 2300 having a timestamp before the first time. The reconciliation processing logic determines a second boundary 2308 of the sleep-stage data 2300 by determining a second time at which the presence data 2304 last identifies the presence of any user (Presence=True) and the user identification data 2302 identifies the IU. The reconciliation processing logic can discard a second portion of the sleep-stage data 2300 having a timestamp after the second time. The reconciliation processing logic can discard one or more portions of the radar data to obtain modified radar data. The modified radar data can be used to generate the hypnogram. The reconciliation processing logic can change or relabel the sleep-stage data, as illustrated and described below with respect to FIG. 24.

Figure 24:
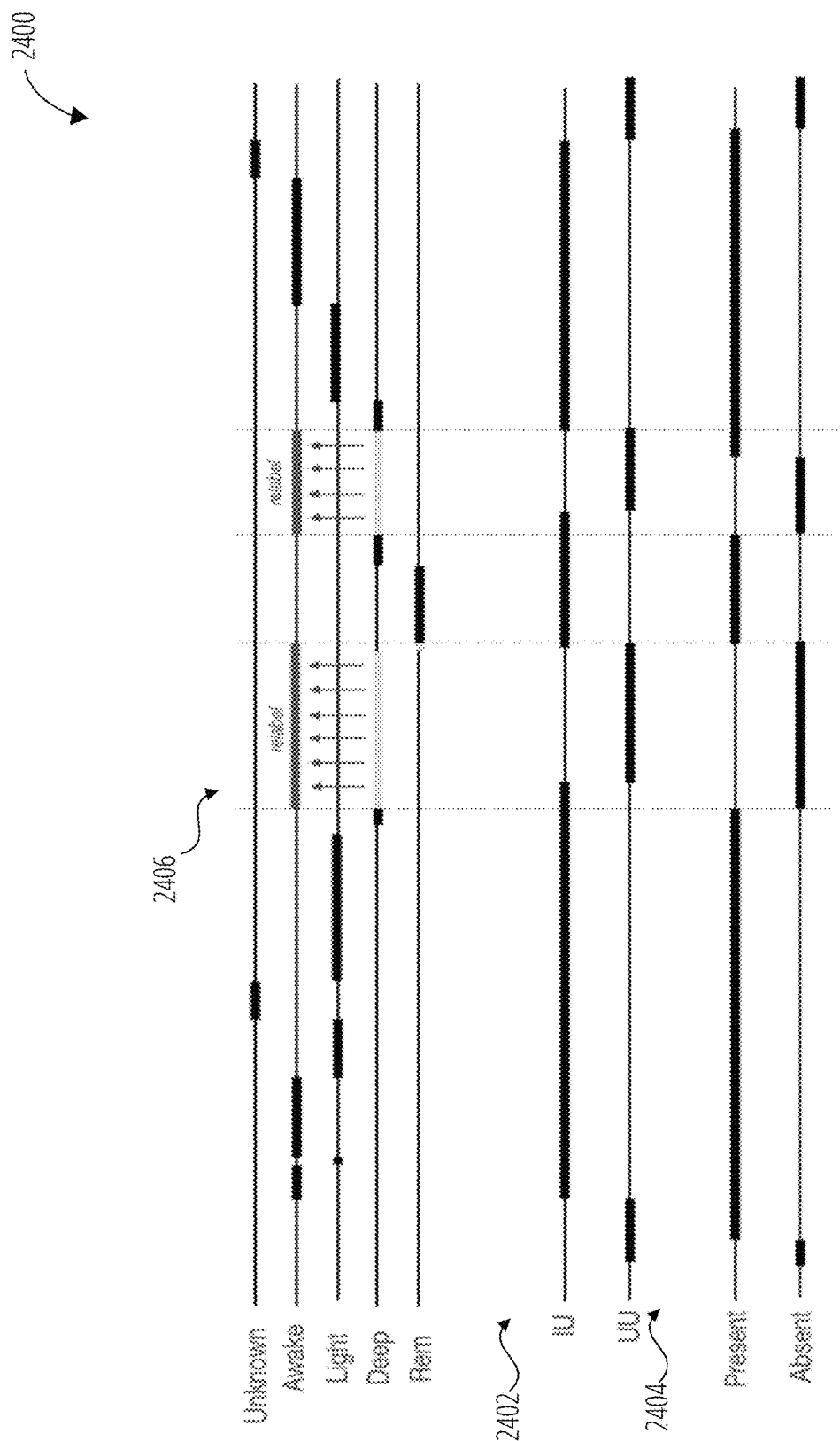
FIG. 24 shows changing classifications of sleep-stage data using user identification data and presence data according to at least one embodiment.

FIG. 24 shows changing classifications of sleep-stage data 2400 using user identification data 2402 and presence data 2404 according to at least one embodiment. In at least one embodiment, the reconciliation processing logic can identify a time period 2406 in which the presence data 2404 identifies an absence of any user or the user identification data 2402 identifies a second user (UU). The reconciliation processing logic can change a third portion of the sleep-stage data 2400, corresponding to the time period 2406, from any of a plurality of asleep classifications to an awake classification. The asleep classification is one or more of a light-sleep class, a deep-sleep class, or a REM class. The reconciliation processing logic can relabel one or more portions of the radar data to obtain modified radar data. The modified radar data can be used to generate the hypnogram. Before generating the hypnogram, some additional trimming and adjustments can be made, as described below.

Step 3: Trimming and Additional Adjustments

In at least one embodiment, the reconciliation processing logic can perform the trimming and additional adjustments (block 524 of FIG. 5). In other embodiments, the trimming and additional adjustments can be performed by trimming processing logic (e.g., trimming block 404 of FIG. 4) that is separate from the reconciliation processing logic (e.g., reconciliation block 402 of FIG. 4). For the beginning of the hypnogram, the trimming processing logic can compute some key quantifies, including a sleep start time, a presence start time, and an intended user (IU) start time. The sleep start time represents a beginning of a first segment of sleep in which the user is detected to be in any sequence of asleep stages (Light, Rem, or Deep) for more than a period of time (e.g., 7 minutes). The presence start time represents a beginning of a second segment of sleep where the presence of any user is detected (Presence=True) in which the sleep start time is found. That is, the first segment and the second segment overlap. The IU start time represents a beginning of a third segment where the IU is identified (PUT=UI) in which the sleep start time is found. That is, the first segment and the third segment overlap. In a further embodiment, the trimming processing logic can compute an intent-to-sleep start time by applying a change-point detection algorithm to intent-to-sleep probabilities (intent-to-sleep data) restricted to an interval defined as being between the sleep start time and the later of the presence start time and the UI start time (e.g., interval [max(presence start, IU start), sleep start]). An example of a first boundary of a sleep session is illustrated and described below with respect to FIG. 25.

Figure 25:
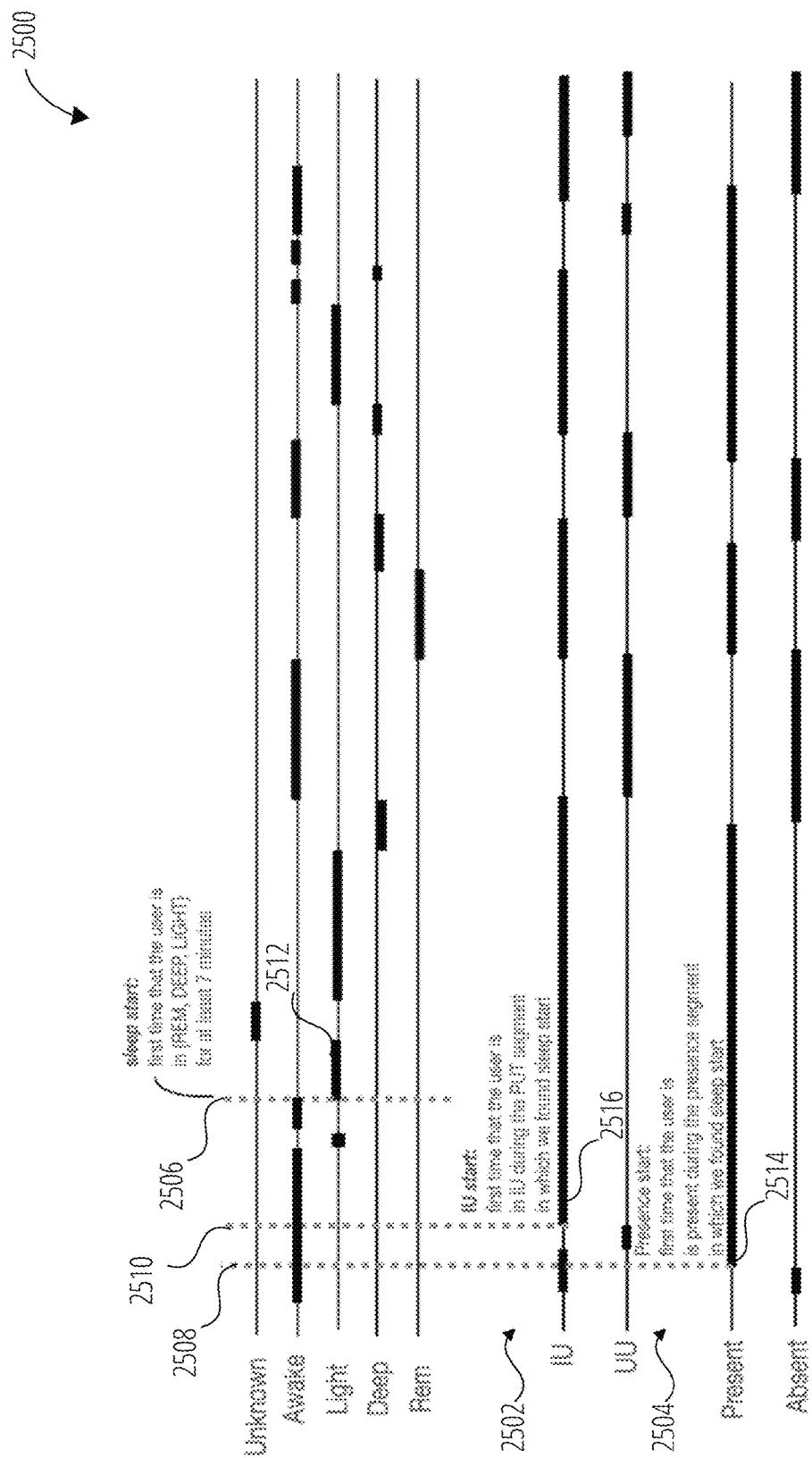
FIG. 25 shows a first boundary in sleep-stage data of a sleep session for discarding radar data using user identification data and presence data according to at least one embodiment.

FIG. 25 shows a first boundary in sleep-stage data 2500 of a sleep session for trimming using user identification data 2502 and presence data 2504 according to at least one embodiment. The trimming processing logic can determine a first time 2506 corresponding to a beginning of a first segment 2512 in the sleep-stage data where the user is detected in an asleep classification for at least a first time period (e.g., 7 minutes). The asleep classification is one or more of a light-sleep class, a deep-sleep class, or a REM class. The trimming processing logic can determine a second time 2508 corresponding to a beginning of a second segment 2514 in the presence data 2504 where a presence of any user is detected. The second segment 2514 overlaps with the first segment 2512. The trimming processing logic can determine a third time 2510 corresponding to a beginning of a third segment 2516 in the user identification data 2502 where the user is identified when the presence of both the user and a second user is detected. The third segment 2516 overlaps with the first segment 2512. As described below with respect to FIG. 26, the trimming processing logic can use the intent-to-sleep data to determine an intent-to-sleep start time.

Figure 26:
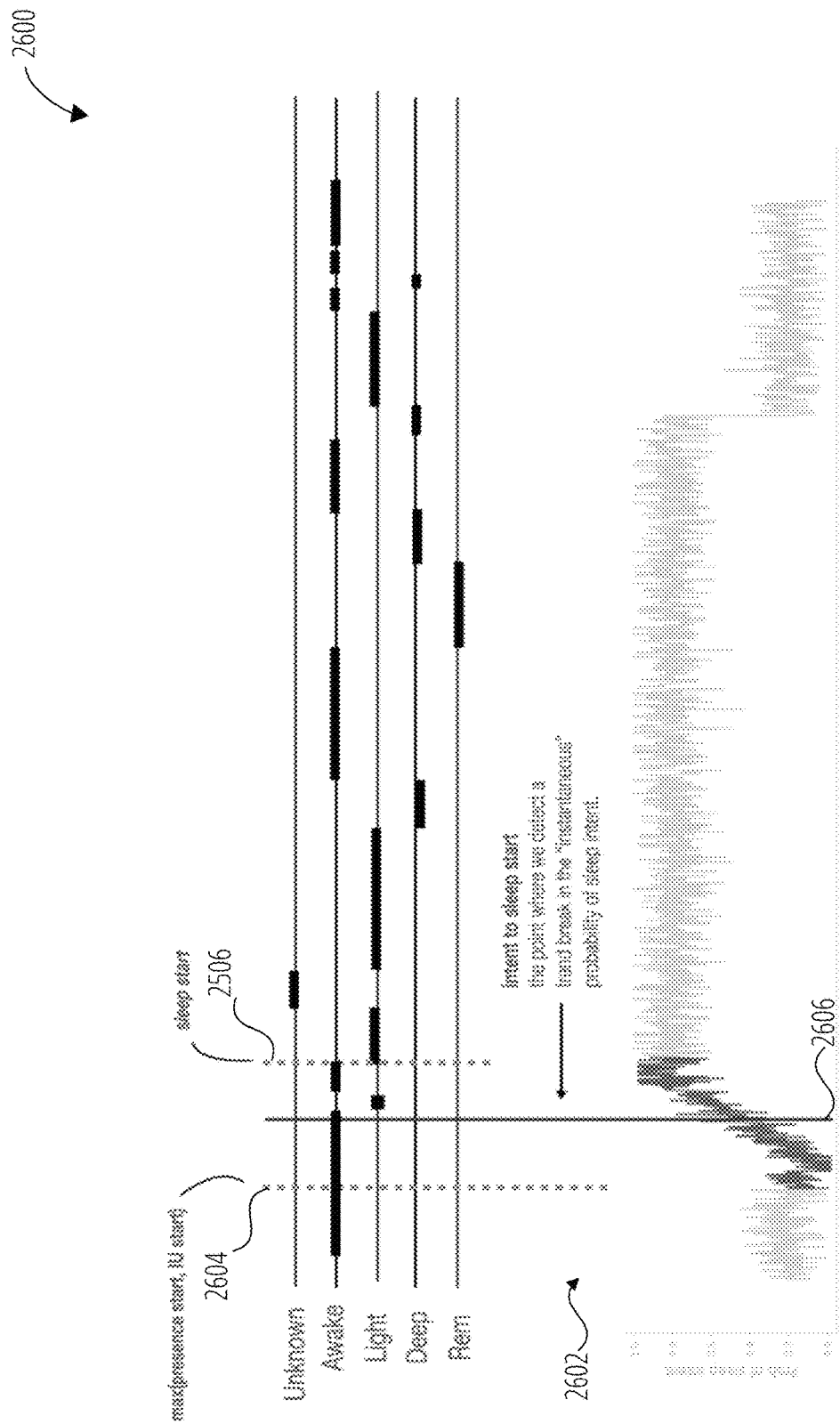
FIG. 26 shows a first boundary in sleep-stage data of a sleep session for determining an intent-to-sleep start time using intent-to-sleep data according to at least one embodiment.

FIG. 26 shows a first boundary in sleep-stage data 2600 of a sleep session for determining an intent-to-sleep start time using intent-to-sleep data 2602 according to at least one embodiment. The first boundary is the beginning of the sleep session. The intent-to-sleep start time represents the point where there is a trend break in the instantaneous probability of sleep intent. As described herein, the intent-to-sleep classification processing logic can determine, using the radar data, intent-to-sleep data associated with the user. The intent-to-sleep data represents the probabilities of sleep activity of the user. The trimming processing logic can determine, using the intent-to-sleep data 2602 in a second time period before the first time 2506 and a second time 2604, which is the later of the second time 2508 and the third time 2510, a fourth time 2606 corresponding to the first event. The first event represents an activity where the user intends to sleep, as distinguished from other activities in bed as described herein. Once the fourth time 2606 is determined, the trimming processing logic can discard a portion of the sleep-stage data 2600 (i.e., radar data) having a timestamp before the fourth time 2606. That is, the modified radar data does not include the discarded portion.

For the end of the hypnogram, the trimming processing logic can compute some key quantifies, including a sleep end time, a presence end time, and an intended user (IU) end time. The sleep end time represents an end of a last segment of sleep-stage data in which the user is detected to be in any sequence of asleep stages (Light, Rem or Deep) for more than a period of time (e.g., 7 minutes). The presence end time represents an end of a last segment of presence data where the presence of any user is detected (Presence=True) in which the sleep end time is found. That is, the last segment of the presence data and the last segment of the sleep-stage data overlap. The IU end time represents an end of a last segment in user identification data where the IU is identified (PUT=UI) in which the sleep start time is found. That is, the last segment of the user identification data and the last segment of the sleep-stage data overlap. An example of a second boundary of a sleep session is illustrated and described below with respect to FIG. 26.

Figure 27:
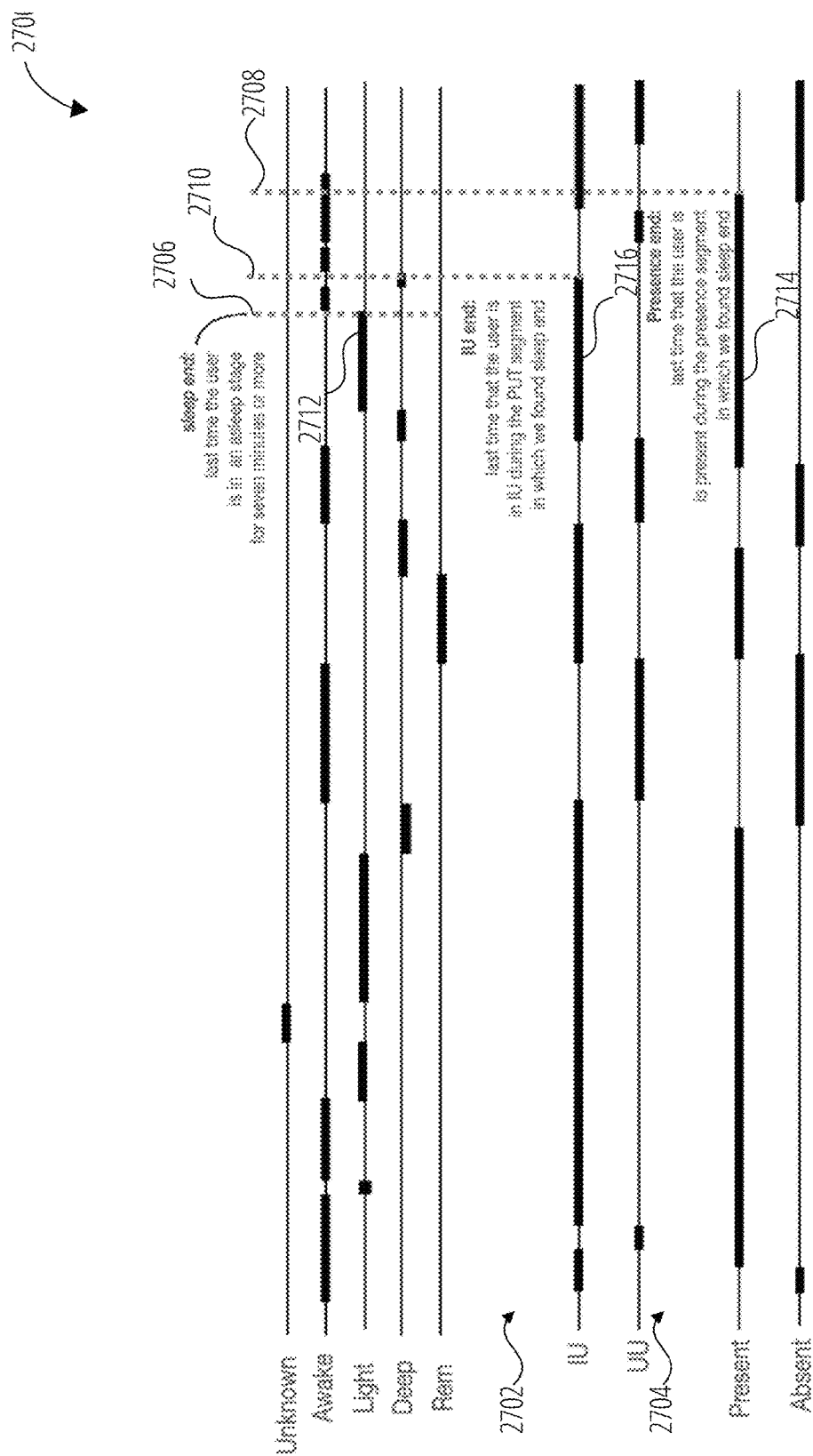
FIG. 27 shows a first boundary in sleep-stage data of a sleep session for discarding radar data using user identification data and presence data according to at least one embodiment.

FIG. 27 shows a first boundary in sleep-stage data 2700 of a sleep session for trimming using user identification data 2702 and presence data 2704 according to at least one embodiment. The trimming processing logic can a first time 2706 corresponding to an end of a last segment 2712 in the sleep-stage data 2700 where the user is detected in an awake classification for at least a first time period (e.g., 7 minutes). The awake classification is one or more of a light-sleep class, a deep-sleep class, or a REM class. The trimming processing logic can determine a second time 2708 corresponding to an end of a second segment 2714 in the presence data 2704 where no presence of any user is detected. The second segment 2714 overlaps with the last segment 2712. The trimming processing logic can determine a third time 2710 corresponding to an end of a third segment 2716 in the user identification data 2702 where the user is identified when the presence of both the user and a second user is detected. The third segment 2716 overlaps with the last segment 2712. The trimming processing logic can discard a first portion of the radar data having a timestamp after the earlier of the second time 2708 or third time 2710 (min (presence end time, IU end time). That is, the modified radar data does not include the discarded first portion.

In at least one embodiment, the trimming processing logic can trim a beginning of the hypnogram to the left of the intent-to-sleep start time. The trimming processing logic can relabel any segment between the sleep start time and the maximum of the presence start time and the IU start time (max(presence start, IU start)) as AWAKE. For the end of the hypnogram, the trimming processing logic can trim the hypnogram to the right of the minimum of the presence end time and the IU end time (min(presence end, IU end)). An example of trimming and relabeling is illustrated and described below with respect to FIG. 28.

Figure 28:
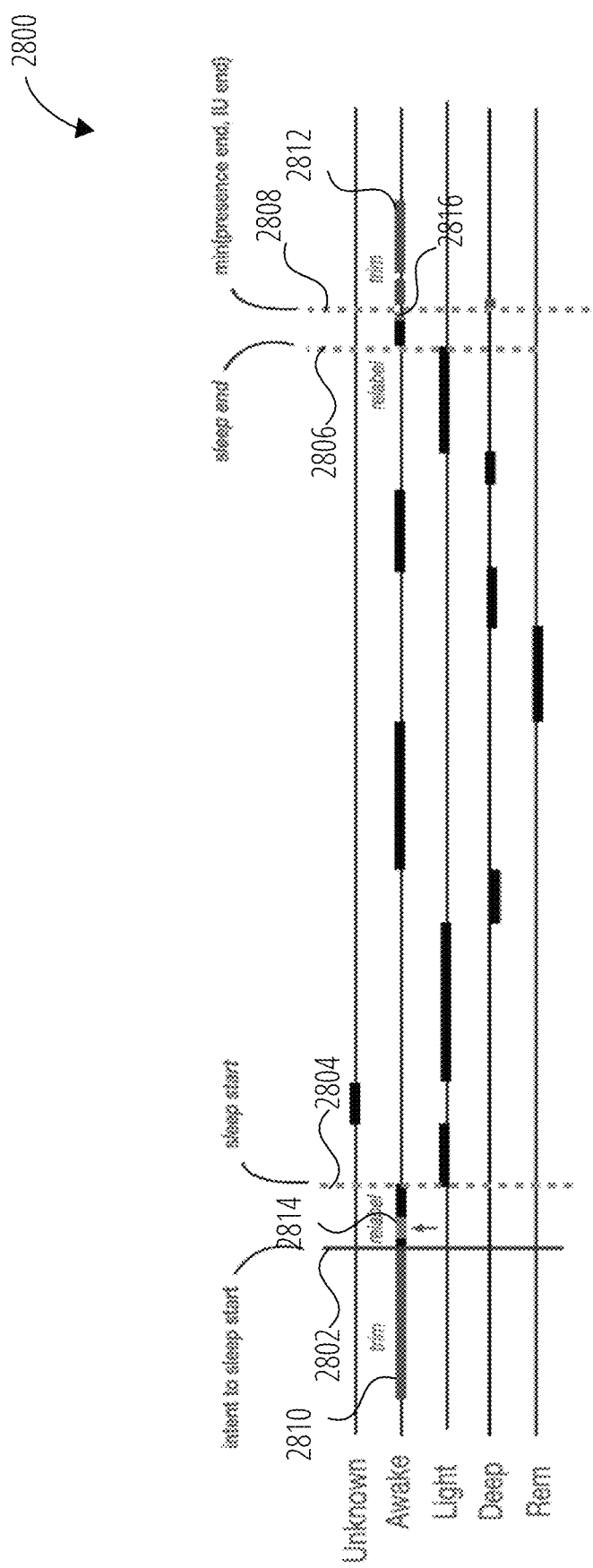
FIG. 28 shows discarding segments and relabeling segments of sleep-stage data according to at least one embodiment.

FIG. 28 shows trimming segments and relabeling segments of sleep-stage data 2800 according to at least one embodiment. The trimming processing logic, for the beginning of the hypnogram, can trim a first portion 2810 of the sleep-stage data 2800 to the left of an intent-to-sleep start time 2802. The first portion 2810 to the left represents data that is earlier in time. For the end of the hypnogram, the trimming processing logic can trim a second portion 2812 of the sleep-stage data 2800 to the right of a second time 2808. The second time 2808 represents the minimum of the presence end time (2708 of FIG. 27) and the IU end time (2710 of FIG. 27). The second portion 2812 to the right represents data that is later in time.

In a further embodiment, the trimming processing logic can change a classification (e.g., relabel) of any segment between the sleep start time 2804 and the second time 2808 (e.g., maximum of the presence start time and the IU start time (max(presence start, IU start)) as an awake class. As illustrated, a first segment 2814 is changed to the awake class between the intent-to-sleep start time 2802 and sleep start time 2804. As illustrated, a second segment 2816 is changed to the awake class between the sleep end time 2806 and the second time 2808.

Figure 29:
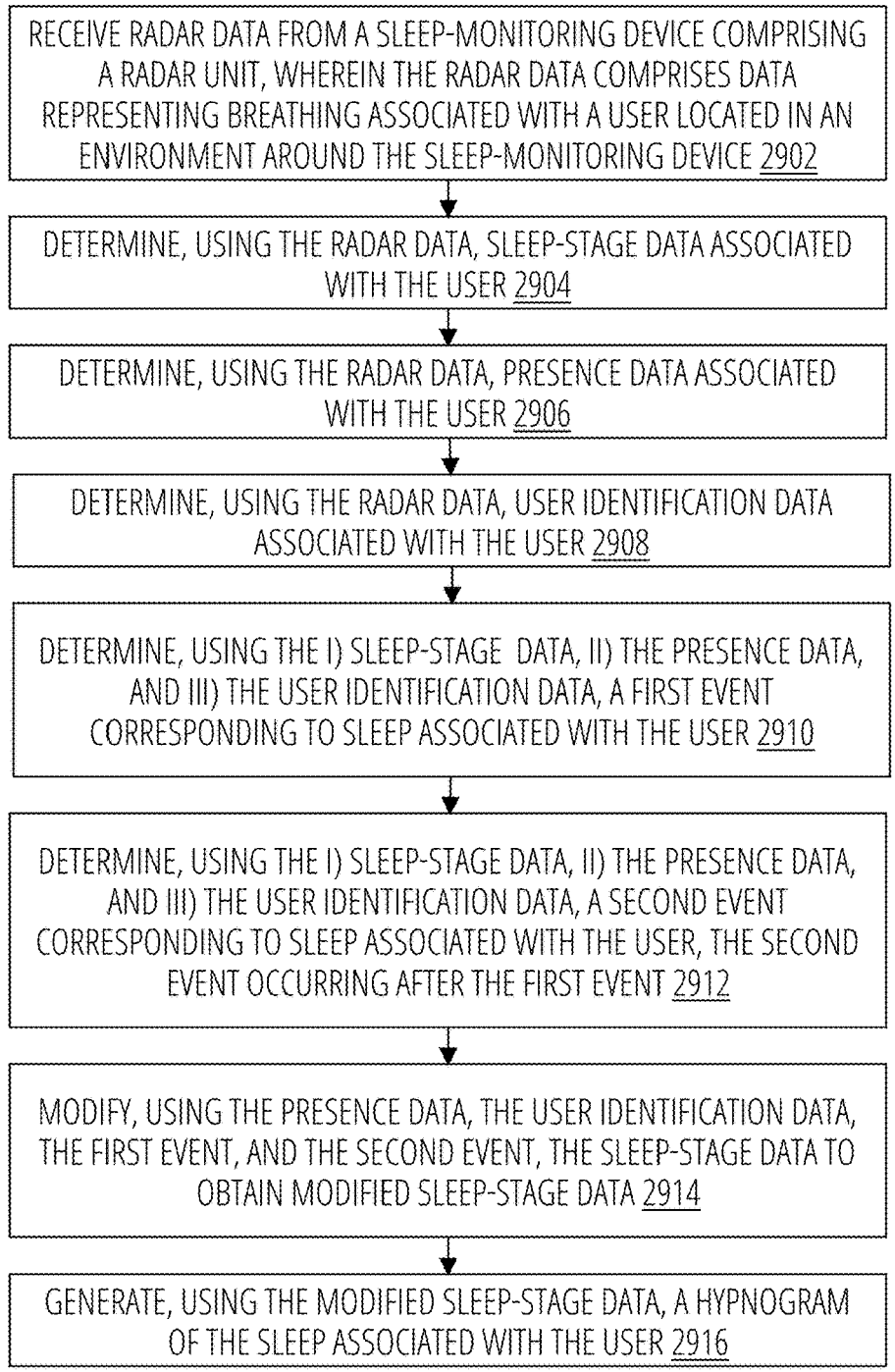
FIG. 29 is a flow diagram of a method for generating a hypnogram of sleep associated with a user according to at least one embodiment.

FIG. 29 is a flow diagram of a method 2900 for generating a hypnogram of sleep associated with a user according to at least one embodiment. Method 2900 may be performed, at least in part, by processing logic that may include hardware (e.g., circuitry, dedicated logic, programmable logic, microcode, processing device, etc.), software (such as instructions run on a processing device, a general-purpose computer system, or a dedicated machine), firmware, microcode, or a combination thereof. The method 2900 can be implemented by the server(s) 120 of FIG. 1. The method 2900 can be implemented by the sleep-monitoring device 106 of FIG. 1. The sleep processing logic 138 of FIG. 1. can perform the method 2900. The sleep service 302 of FIG. 3 and FIG. 4 can perform the method 2900. Method 2900 may be implemented, for example, by a computing device with the sleep processing logic 138 in connection with the sleep-monitoring device 106.

The method 2900 begins with the processing logic receiving radar data from a sleep-monitoring (block 2902). The radar data can include data representing breathing associated with a user located in an environment around the sleep-monitoring device. At block 2904, the processing logic determines, using the radar data, sleep-stage data associated with the user. At block 2906, the processing logic determines, using the radar data, presence data associated with the user. At block 2908, the processing logic determines, using the radar data, user identification data associated with the user. At block 2910, the processing logic determines, using the i) sleep-stage data, ii) the presence data, and iii) the user identification data, a first event corresponding to sleep associated with the user. At block 2912, the processing logic determines, using the i) sleep-stage data, ii) the presence data, and iii) the user identification data, a second event corresponding to sleep associated with the user, the second event occurring after the first event. At block 2914, the processing logic modifies, using the presence data, the user identification data, the first event, and the second event, the sleep-stage data to obtain modified sleep-stage data. At block 2916, the processing logic generates, using the modified sleep-stage data, a hypnogram of the sleep associated with the user.

In a further embodiment, the processing logic determines a first time at which presence of the user is detected. For example, the first time can be the point at which the presence data identifies a presence of any user, and the user identification data identifies the user. The processing logic can discard a first portion of the sleep-stage data having a timestamp before the first time. The processing logic can determine a second time at which presence of the user is detected. For example, the second time can be the point at which the presence data last identifies the presence of any user, and the user identification data identifies the user. The processing logic can discard a second portion of the sleep-stage data having a timestamp after the second time. In this embodiment, the modified sleep-stage data does not include the first portion and the second portion.

In a further embodiment, the processing logic identifies a time period in which no user is detected, or a second user is detected, the time period corresponding to a third portion of the sleep-stage data. For example, the processing logic can identify the time period in which the presence data identifies an absence of any user, or the user identification data identifies a second user. The processing logic can change any of a plurality of asleep classifications in the third portion to an awake classification. The asleep classification is one or more of a light-sleep class, a deep-sleep class, or a REM class. In this embodiment, the modified sleep-stage data includes the third portion and does not include the first portion and the second portion.

In at least one embodiment, the processing logic determines, using the sleep-stage data, a first time corresponding to a third event that represents detection of the user being asleep. The first time can correspond to a beginning of a first segment in the sleep-stage data where the user is detected in an asleep classification for at least a first time period. The asleep classification is one or more of a light-sleep class, a deep-sleep class, or a REM class. The processing logic can determine, using the presence data, a second time corresponding to a fourth event that represents detection of a presence of any user. The second time can correspond to a beginning of a second segment in the presence data where a presence of any user is detected. The second segment overlaps with the first segment. The processing logic can determine, using the user identification data, a third time corresponding to a fifth event that represents detection of the presence of the user. For example, the third time can correspond to a beginning of a third segment in the user identification data where the user is identified when the presence of both the user and a second user is detected. The third segment overlaps with the first segment. The processing logic can determine, using the radar data, intent-to-sleep data associated with the user. The intent-to-sleep data represents the probabilities of the user falling asleep (e.g., sleep activity of the user). The processing logic can determine, using the intent-to-sleep data in a second time period, a fourth time corresponding to the first event. The second time period can be before the first time and after the later of the second time and the third time. The processing logic can discard a portion of the sleep-stage data having a timestamp before the fourth time. In this embodiment, the modified sleep-stage data does not include the portion.

In at least one embodiment, the processing logic can determine, using the sleep-stage data, a first time corresponding to a third event that represents detection of the user being last asleep for at least a first time period. The first time can correspond to an end of a last segment in the sleep-stage data where the user is detected in an asleep classification for at least a first time period. The asleep classification is one or more of a light-sleep class, a deep-sleep class, or a REM class. The processing logic can determine, using the presence data, a second time corresponding to a fourth event that represents detection of a last presence of any user. The second time can correspond to an end of a second segment in the presence data where no presence of any user is detected. The second segment overlaps with the last segment. The processing logic can determine, using the user identification data, a third time corresponding to a fifth event that represents detection of the last presence of the user (i.e., when the presence of the user is last detected). The third time can correspond to an end of a third segment in the user identification data where the user is identified when the presence of both the user and a second user is detected. The third segment overlaps with the last segment. The processing logic can determine using the radar data, intent-to-sleep data associated with the user. The intent-to-sleep data represents probabilities of the user waking up. The processing logic can determine, using the intent-to-sleep data in a second time period, a fourth time corresponding to the second event. The processing logic can discard a first portion of the sleep-stage data having a timestamp after the fourth time. In this embodiment, the modified sleep-stage data does not include the first portion.

In at least one embodiment, the processing logic can change any of a plurality of asleep classifications in a portion of the sleep-stage data, corresponding to a time period between the first time and the earlier of the second time and the third time, to an awake classification. The asleep classification is one or more of a light-sleep class, a deep-sleep class, or a REM class. In this embodiment, the modified radar data includes the second portion.

In at least one embodiment, the radar data includes first data representing breathing associated with the user during a first time period and second data representing breathing associated with the user during a second time period, wherein each of the first time period and the second time period is less than a total amount of time of a sleep session of the user. The processing logic can determine, using an ML model and the first data, a first set of sleep-stage classifications of a first portion of the radar data. Each of the first sleep-stage classifications is at least one of an awake class, a light-sleep class, a deep-sleep class, or a REM class. The processing logic can determine, using the ML model, a second set of sleep-stage classifications of a second portion of the radar data.

In at least one embodiment, the radar data includes: i) first information representing one or more frequency components of data representing breathing associated with the user; ii) second information representing statistics of motion levels associated with the user; and iii) third information representing range values, each range value representing a physical distance between the user and the sleep-monitoring device. The processing logic can determine, using a ML model and the first information, the second information, and the third information corresponding to a first time period, a first probability score of activity representing the user falling asleep. The processing logic can determine, using the ML model and the first information, the second information, and the third information corresponding to a second time period, a second probability score of activity representing the user falling asleep. The processing logic can determine using at least the first probability score and the second probability score, a first time corresponding to the first event. The processing logic can discard a portion of the sleep-stage data having a timestamp before the first time, wherein the modified sleep-stage data does not comprise the portion.

In another embodiment, the radar data includes: i) first information representing range values associated with a first user or a second user located in a first region of the environment around the sleep-monitoring device, wherein each range value represents a physical distance between the sleep-monitoring device and the first user or the second user; ii) second information representing respirations per minute (RPM) values associated with the first user or second user; iii) third information representing confidence values associated with the RPM values; and v) fourth information representing motion levels of the first user or the second user in a second region of the environment adjacent the first region. The processing logic can determine, using the radar data, presence of the first user and the second user both located in the first region. The processing logic can identify, based on the first information, the third information, and the fourth information, a first portion of the second information that is associated with the first user. The processing logic can identify, based on the first information, the third information, and the fourth information, a second portion of the second information that is associated with the second user. The user identification data includes the first portion and the second portion.

Figure 30:
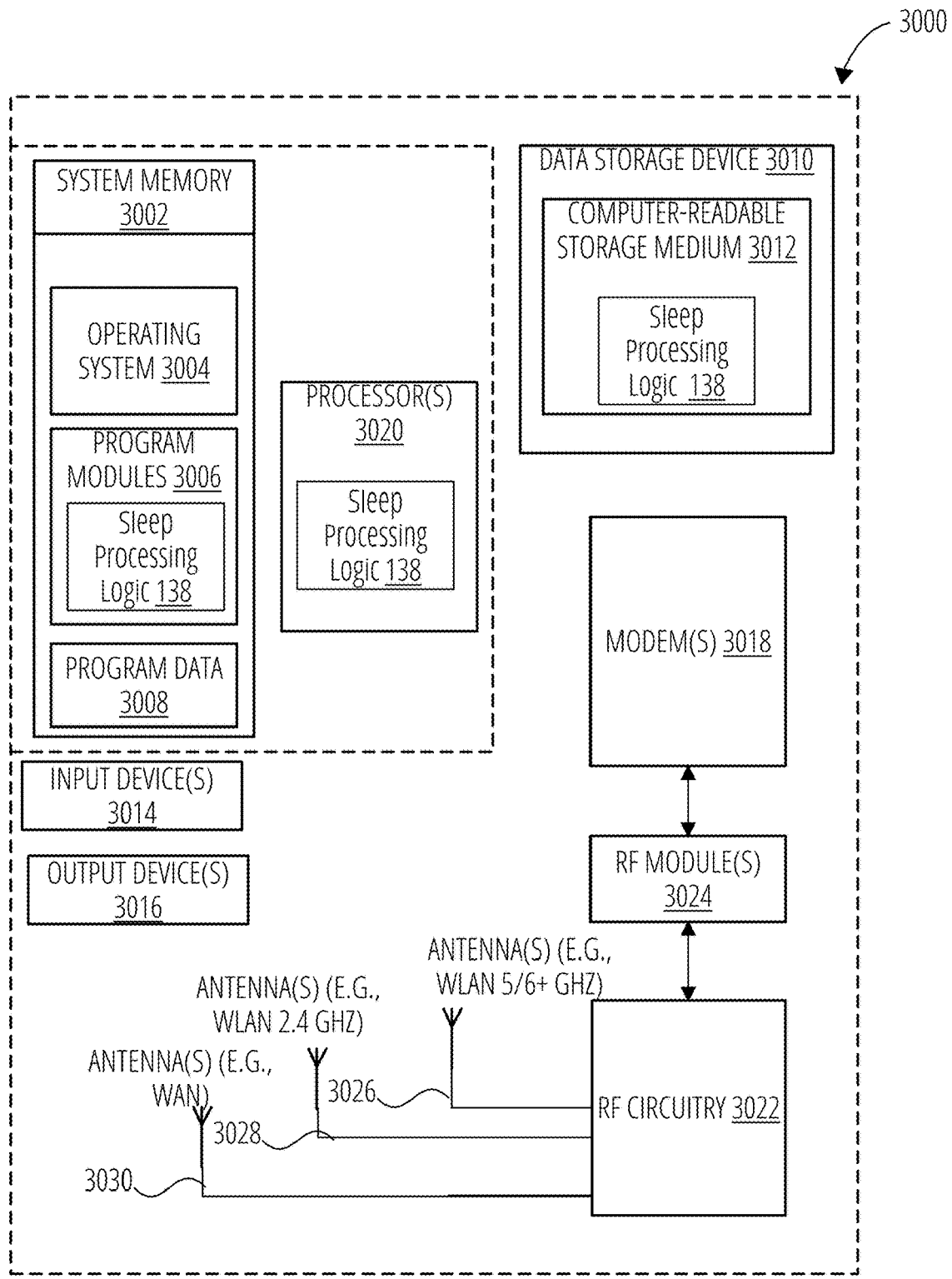
FIG. 30 is a block diagram of an electronic device with sleep processing logic, according to at least one embodiment of the present disclosure.

FIG. 30 is a block diagram of an electronic device 3000 with sleep processing logic 138, according to at least one embodiment of the present disclosure. The electronic device 3000 may correspond to the user devices described herein. The electronic device 3000 includes one or more processor(s) 3020, such as one or more central processing units (CPUs), microcontrollers, field-programmable gate arrays, or other types of processors. The electronic device 3000 also includes system memory 3002, which may correspond to any combination of volatile and/or non-volatile storage mechanisms. The system memory 3002 stores information that provides operating system component 3004, various program modules 3006, program data 3008, and/or other components. The program modules 3006 may include instructions of the sleep processing logic 138. The sleep processing logic 138 can perform any of the operations described herein. In one embodiment, the system memory 3002 stores instructions of methods to control the operation of the electronic device 3000. The electronic device 3000 performs functions by using the processor(s) 3020 to execute instructions provided by the system memory 3002.

The electronic device 3000 also includes a data storage device 3010 that may be composed of one or more types of removable storage and/or one or more types of non-removable storage. The data storage device 3010 includes a computer-readable storage medium 3012 on which is stored one or more sets of instructions embodying any of the methodologies or functions described herein. Instructions for the program modules 3006 may reside, completely or at least partially, within the computer-readable storage medium 3012, system memory 3002, and/or within the processor(s) 3020 during execution thereof by the electronic device 3000, the system memory 3002, and the processor(s) 3020 also constituting computer-readable media. The electronic device 3000 may also include one or more input device(s) 3014 (keyboard, mouse device, specialized selection keys, etc.) and one or more output device(s) 3016 (displays, printers, audio output mechanisms, etc.).

The electronic device 3000 further includes a modem(s) 3018 to allow the electronic device 3000 to communicate via wireless connections (e.g., provided by the wireless communication system) with other computing devices, such as remote computers, an item-providing system, and so forth. The modem(s) 3018 can be connected to one or more radio frequency (RF) modules 3024. The RF modules 3024 may be a WLAN module, a WAN module, a personal area network (PAN) module, a GPS module, or the like. The antenna structures (antenna(s) 3026, 3028, and 3030) are coupled to the RF circuitry 3022, which is coupled to the modem(s) 3018. The RF circuitry 3022 may include radio front-end circuitry, antenna switching circuitry, impedance matching circuitry, or the like. In one embodiment, the RF circuitry 3022 includes the radio frequency front-end (RFFE) circuitry with high selectivity performance as described in the various embodiments of FIG. 1 to FIG. 24. The antennas antenna 3026 may be GPS antennas, NFC antennas, other WAN antennas, WLAN or PAN antennas, or the like. The modem(s) 3018 allows the electronic device 3000 to handle both voice and non-voice communications (such as communications for text messages, multimedia messages, media downloads, web browsing, etc.) with a wireless communication system. The modem(s) 3018 may provide network connectivity using any type of mobile network technology, including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem(s) 3018 may generate signals and send these signals to antenna(s) 3026 of a first type (e.g., WLAN 5/6+ GHz), antenna(s) 3028 of a second type (e.g., WLAN 2.4 GHZ), and/or antenna(s) 3030 of a third type (e.g., WAN), via RF circuitry 3022, and Rf module(s) 3024 as described herein. Antennas 3026, 3028, and 3030 may be configured to transmit in different frequency bands and/or using different wireless communication protocols. The antennas 3026, 3028, and 3030 may be directional, omnidirectional, or non-directional antennas. In addition to sending data, antennas 3026, 3028, and 3030 may also receive data, which is sent to appropriate RF modules connected to the antennas. One of the antennas 3026, 3028, and 3030 may be any combination of the antenna structures described herein.

In one embodiment, the electronic device 3000 establishes a first connection using a first wireless communication protocol and a second connection using a different wireless communication protocol. The first wireless connection and second wireless connection may be active concurrently, for example, if an electronic device is receiving a media item from another electronic device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band. The second wireless connection is associated with a second resonant mode of the antenna structure that operates at a second frequency band. In another embodiment, the first wireless connection is associated with a first antenna structure, and the second wireless connection is associated with a second antenna.

Though a modem 3018 is shown to control transmission and reception via antenna (3026, 3028, and 3030), the electronic device 3000 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A computing device comprising:
   one or more processors; and
   memory to store computer-executable instructions that, if executed, cause the one or more processors to:
      receive radar data from a sleep-monitoring device, wherein the radar data comprises data representing breathing associated with a user located in an environment around the sleep-monitoring device;
      determine, using the radar data, sleep-stage data associated with the user;
      determine, using the radar data, presence data associated with the user;
      determine, using the radar data, user identification data associated with the user;
      determine, using the i) sleep-stage data, ii) the presence data, and iii) the user identification data, a first event corresponding to sleep associated with the user;
      determine, using the i) sleep-stage data, ii) the presence data, and iii) the user identification data, a second event corresponding to the sleep associated with the user, the second event having a timestamp after the first event;
      reconcile sleep-stage classifications of the sleep-stage data with the presence data, the user identification data, the first event, and the second event to obtain modified sleep-stage data; and
      generate, using the modified sleep-stage data, a hypnogram of the sleep associated with the user.

2. The computing device of claim 1, wherein the memory to store computer-executable instructions that, if executed, further cause the one or more processors to obtain the modified sleep-stage data by:
   determining a first time at which presence of the user is detected;
   discarding a first portion of the sleep-stage data having a timestamp before the first time;
   determining a second time at which presence of the user is detected, wherein the second time represents a last time at which presence of the user is detected and wherein the user is done sleeping;
   discarding a second portion of the sleep-stage data having a timestamp after the second time;
   identifying, using the presence data and the user identification data, a time period in which no user is detected, or a second user is detected, the time period corresponding to a third portion of the sleep-stage data; and
   changing any of a plurality of asleep classifications in the third portion to an awake classification, and wherein the modified sleep-stage data comprises the third portion and does not comprise the first portion and the second portion.

3. The computing device of claim 1, wherein the memory to store computer-executable instructions that, if executed, further cause the one or more processors to obtain the modified sleep-stage data by:
   determining, using the sleep-stage data, a first time corresponding to a third event that represents the user sleeping for at least a first time period;
   determining, using the presence data, a second time corresponding to a fourth event that represents when a presence of any user is detected;
   determining, using the user identification data, a third time corresponding to a fifth event that represents detection of the presence of the user;
   determining, using the radar data, intent-to-sleep data associated with the user, wherein the intent-to-sleep data represents probabilities of the user falling asleep;
   determining, using a portion of the intent-to-sleep data in a second time period, a fourth time corresponding to the first event; and
   discarding a portion of the sleep-stage data having a time stamp before the fourth time, wherein the modified sleep-stage data does not comprise the portion.

4. The computing device of claim 1, wherein the memory to store computer-executable instructions that, if executed, further cause the one or more processors to obtain the modified sleep-stage data by:
   determining, using the sleep-stage data, a first time corresponding to a third event that represents detection of the user being last asleep for at least a first time period;
   determining, using the presence data, a second time corresponding to a fourth event the represents detection of a last presence of any user after the first time;
   determining, using the user identification data, a third time corresponding to a fifth event that represents detection of the last presence of the user after the first time;
   determining, using the radar data, intent-to-sleep data associated with the user, wherein the intent-to-sleep data represent probabilities of the user waking up;
   determining, using a portion of the intent-to-sleep data in a second time period, a fourth time corresponding to the second event; and
   discarding a first portion of the sleep-stage data having a timestamp after the fourth time, wherein the modified sleep-stage data does not comprise the first portion.

5. The computing device of claim 1, wherein the memory to store computer-executable instructions that, if executed, further cause the one or more processors to obtain the modified sleep-stage data by:
   identifying, using the presence data and the user identification data, a time period in which no user is detected, or a second user is detected, the time period corresponding to a portion of the sleep-stage data; and changing any of a plurality of asleep classifications in the portion to an awake classification.

6. The computing device of claim 1, wherein the radar data comprises first data representing breathing associated with the user during a first time period and second data representing breathing associated with the user during a second time period, wherein each of the first time period and the second time period is less than a total amount of time of a sleep session of the user, wherein the memory to store computer-executable instructions that, if executed, further cause the one or more processors to:
   determine, using a machine learning (ML) model and the first data, a first set of sleep-stage classifications corresponding to a first portion of the sleep-stage data; and
   determine, using the ML model and the second data, a second set of sleep-stage classifications corresponding to a second portion of the sleep-stage data.

7. The computing device of claim 1, wherein the radar data comprises: i) first information representing range values associated with a first user or a second user located in a first region of the environment around the sleep-monitoring device, wherein each range value represents a physical distance between the sleep-monitoring device and the first user or the second user; ii) second information representing respirations per minute (RPM) values associated with the first user or second user; iii) third information representing confidence values associated with the RPM values; and iv) fourth information representing motion levels of the first user or the second user in a second region of the environment adjacent the first region, wherein the memory to store computer-executable instructions that, if executed, further cause the one or more processors to:
   determine, using the radar data, presence of the first user and the second user both located in the first region;
   identify, based on the first information, the third information, and the fourth information, a first portion of the second information that is associated with the first user; and
   identify, based on the first information, the third information, and the fourth information, a second portion of the second information that is associated with the second user, wherein the user identification data comprises the first portion and the second portion.

8. The computing device of claim 1, wherein the radar data comprises: i) first information representing one or more frequency components of data representing breathing associated with the user; ii) second information representing statistics of motion levels associated with the user; and iii) third information representing range values, each range value representing a physical distance between the user and the sleep-monitoring device; and wherein the memory to store computer-executable instructions that, if executed, further cause the one or more processors to:
   determine, using a machine learning (ML) model and the first information, the second information, and the third information corresponding to a first time period, a first probability score of activity representing the user falling asleep; and
   determine, using the ML model and the first information, the second information, and the third information corresponding to a second time period, a second probability score of activity representing the user falling asleep;
   determine, using at least the first probability score and the second probability score, a first time corresponding to the first event; and discard a portion of the sleep-stage data having a timestamp before the first time, wherein the modified sleep-stage data does not comprise the portion.

9. A method of operating a device, the method comprising:
   receiving radar data from a sleep-monitoring device, wherein the radar data comprises data representing breathing associated with a user located in an environment around the sleep-monitoring device;
   determining, using the radar data, first data associated with sleep of the user;
   determining, using the radar data, second data associated with presence of the user;
   determining, using the radar data, third data associated with an identity of the user;
   determining, using the i) first data, ii) the second data, and iii) the third data, a first event corresponding to the sleep associated with the user;
   determining, using the i) first data, ii) the second data, and iii) the third data, a second event corresponding to the sleep associated with the user, the second event occurring after the first event;
   reconciling sleep-stage classifications of the first data with the second, and the third data, and the first and the second events, to obtain modified first data; and
   generating, using the modified first data, a hypnogram of the sleep associated with the user.

10. The method of claim 9, further comprising:
   determining, using the second data, a first time at which presence of the user is detected;
   discarding a first portion of the first data having a timestamp before the first time;
   determining, using the third data, a second time at which the user is detected, wherein the second time represents a last time at which presence of the user is detected and wherein the user is done sleeping;
   discarding a second portion of the first data having a timestamp after the second time;
   identifying, using the second data and the third data, a time period in which no user is detected, or a second user is detected, the time period corresponding to a third portion of the first data; and
   changing any of a plurality of asleep classifications in the third portion of the first data to an awake classification, wherein the modified first data comprises the third portion and does not comprise the first portion and the second portion.

11. The method of claim 9, further comprising:
   determining, using the first data, a first time corresponding to a third event that represents detection of the user being asleep for at least a first time period;
   determining, using the second data, a second time corresponding to a fourth event that represents detection of a presence of any user;
   determining, using the third data, a third time corresponding to a fifth event that represents detection of the presence of the user;
   determining, using the radar data, fourth data associated with the user, wherein the fourth data represent probabilities of the user falling asleep;
   determining, using the fourth data in a second time period, a fourth time corresponding to the first event; and
   discarding a portion of the first data having a timestamp before the fourth time, wherein the modified first data does not comprise the portion.

12. The method of claim 9, further comprising:
determining, using the first data, a first time corresponding to a third event that represents detection of the user being last asleep for at least a first time period;
determining, using the second data, a second time corresponding to a fourth event that represents detection of a last presence of any user;
determining, using the third data, a third time corresponding to a fifth event that represents detection of the last presence of the user;
determining, using the radar data, fourth data associated with the user, wherein the fourth data represent probabilities of the user waking up;
determining, using the fourth data in a second time period, a fourth time corresponding to the second event; and
discarding a first portion of the first data having a timestamp after the fourth time, wherein the modified first data does not comprise the first portion.

13. The method of claim 9, further comprising:
identifying, using the second data and the third data, a time period in which no user is detected, or a second user is detected, the time period corresponding to a portion of the first data; and
changing any of a plurality of asleep classifications in the portion of the first data to an awake classification.

14. The method of claim 9, wherein the radar data comprises fourth data representing breathing associated with the user during a first time period and fifth data representing breathing associated with the user during a second time period, wherein each of the first time period and the second time period is less than a total amount of time of a sleep session of the user, wherein the method further comprises
determining, using a machine learning (ML) model and the fourth data, a first set of sleep-stage classifications corresponding to a first portion of the first data; and
determining, using the ML model, a second set of sleep-stage classifications corresponding to a second portion of the first data.

15. The method of claim 9, wherein the radar data comprises: i) first information representing one or more frequency components of data representing breathing associated with the user; ii) second information representing statistics of motion levels associated with the user; and iii) third information representing range values, each range value representing a physical distance between the user and the sleep-monitoring device; and wherein the method further comprises:
determining, using a machine learning (ML) model and the first information, the second information, and the third information corresponding to a first time period, a first probability score of activity representing the user falling asleep;
determining, using the ML model and the first information, the second information, and the third information corresponding to a second time period, a second probability score of sleep activity of activity representing the user falling asleep;
determining, using at least the first probability score and the second probability score, a first time corresponding to the first event; and
discarding a portion of the first data having a timestamp before the first time, wherein the modified first data does not comprise the portion.

16. The method of claim 9, wherein the radar data comprises: i) first information representing range values associated with a first user or a second user located in a first region of the environment around the sleep-monitoring device, wherein each range value represents a physical distance between the sleep-monitoring device and the first user or the second user; ii) second information representing respirations per minute (RPM) values associated with the first user or second user; iii) third information representing confidence values associated with the RPM values; and iv) fourth information representing motion levels of the first user or the second user in a second region of the environment adjacent the first region, wherein the method further comprises:
determining, using the radar data, presence of the first user and the second user both located in the first region;
identifying, based on the first information, the third information, and the fourth information, a first portion of the second information that is associated with the first user; and
identifying, based on the first information, the third information, and the fourth information, a second portion of the second information that is associated with the second user, wherein the third data comprises the first portion and the second portion.

17. A sleep-monitoring device comprising:
a radar unit; and
a computing unit coupled to the radar unit, wherein the computing unit is to:
receive radar data from the radar unit, wherein the radar data comprises data representing breathing associated with a user located in an environment around the sleep-monitoring device;
determine, using the radar data, sleep-stage data associated with the user;
determine, using the radar data, presence data associated with the user;
determine, using the radar data, user identification data associated with the user;
determine, using the i) sleep-stage data, ii) the presence data, and iii) the user identification data, a first event corresponding to sleep associated with the user;
determine, using the i) sleep-stage data, ii) the presence data, and iii) the user identification data, a second event corresponding to the sleep associated with the user, the second event occurring after the first event;
reconcile sleep-stage classifications of the sleep-stage data with the presence data, the user identification data, the first event, and the second event, to obtain modified sleep-stage data; and
and
generate, using the modified sleep-stage data, a hypnogram of the sleep associated with the user.

18. The sleep-monitoring device of claim 17, wherein the computing unit is further to:
determine, using the presence data, a first time at which presence of the user is detected;
discard a first portion of the sleep-stage data having a timestamp before the first time;
determine, using the user identification data, a second time at which presence of the user is detected, wherein the second time represents a last time at which presence of the user is detected and wherein the user is done sleeping;
discard a second portion of the sleep-stage data having a timestamp after the second time;
identify, using the presence data and the user identification data, a time period in which no user is detected, or a second user is detected, the time period corresponding to a third portion of the sleep-stage data; and change any of a plurality of asleep classifications in the third portion to an awake classification, and wherein the modified sleep-stage data comprises the third portion and does not comprise the first portion and the second portion.

19. The sleep-monitoring device of claim 17, wherein the computing unit is further to:
- determine, using the sleep-stage data, a first time corresponding to a third event that represents detection of the user being asleep for at least a first time period;
- determine, using the presence data, a second time corresponding to a fourth event that represents detection of a presence of any user;
- determine, using the user identification data, a third time corresponding to a fifth event that represents detection of the presence of the user;
- determine, using the radar data, intent-to-sleep data associated with the user, wherein the intent-to-sleep data represent probabilities of the user falling asleep;
- determine, using the intent-to-sleep data in a second time period, a fourth time corresponding to the first event; and
- discard a portion of the sleep-stage data having a timestamp before the fourth time, wherein the modified sleep-stage data does not comprise the portion.

20. The sleep-monitoring device of claim 17, wherein the computing unit is further to:
- determining, using the sleep-stage data, a first time corresponding to a third event that represents detection of the user being last asleep;
- determining, using the presence data, a second time corresponding to a fourth event the represents detection of a last presence of any user;
- determining, using the user identification data, a third time corresponding to a fifth event that represents detection of the last presence of the user;
- determining, using the radar data, intent-to-sleep data associated with the user, wherein the intent-to-sleep data represent probabilities of the user waking up;
- determining, using the intent-to-sleep data in a second time period, a fourth time corresponding to the second event; and
- discarding a first portion of the sleep-stage data having a timestamp after the fourth time, wherein the modified sleep-stage data does not comprise the first portion.

* * * * *